(12) United States Patent
Parichehrehteroujeni et al.

(10) Patent No.: US 12,262,266 B2
(45) Date of Patent: Mar. 25, 2025

(54) DUAL ACTIVE PROTOCOL STACK HANDOVER REPORTS

(71) Applicant: Telefonaktiebolaget LM Ericsson (publ), Stockholm (SE)

(72) Inventors: Ali Parichehrehteroujeni, Linköping (SE); Pradeepa Ramachandra, Linköping (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 17/772,601

(22) PCT Filed: Oct. 20, 2020

(86) PCT No.: PCT/SE2020/051007
§ 371 (c)(1),
(2) Date: Apr. 28, 2022

(87) PCT Pub. No.: WO2021/086249
PCT Pub. Date: May 6, 2021

(65) Prior Publication Data
US 2022/0386204 A1 Dec. 1, 2022

Related U.S. Application Data

(60) Provisional application No. 62/929,168, filed on Nov. 1, 2019.

(51) Int. Cl.
*H04W 36/00* (2009.01)
*H04W 24/08* (2009.01)
(Continued)

(52) U.S. Cl.
CPC ....... *H04W 36/0079* (2018.08); *H04W 24/08* (2013.01); *H04W 36/18* (2013.01); *H04W 74/0833* (2013.01)

(58) Field of Classification Search
CPC . H04W 36/0079; H04W 24/08; H04W 36/18; H04W 74/0833
See application file for complete search history.

(56) References Cited

U.S. PATENT DOCUMENTS

2011/0124340 A1* 5/2011 Puttonen ........... H04W 36/0085
455/437
2013/0316713 A1* 11/2013 Xu ...................... H04W 36/324
455/438

(Continued)

OTHER PUBLICATIONS

Author Unknown, "Technical Specification Group Radio Access Network; Evolved Universal Terrestrial Radio Access (E-UTRA); Requirements for support of radio resource management (Release 15)," Technical Specification. 36.133, Version 15.8.0, Sep. 2019, 3GPP Organizational Partners, 3,464 pages.

(Continued)

*Primary Examiner* — Ajay Cattungal
(74) *Attorney, Agent, or Firm* — Withrow & Terranova, PLLC

(57) ABSTRACT

The present disclosure relates generally to communications, and more particularly to methods, computer program products, wireless devices and related nodes for Dual Active Protocol Stack (DAPS) handover reports. In one example embodiment, a method is performed by a wireless device. A DAPS handover is performed. Also, a type of handover report is determined. Furthermore, a handover report of the determined type is compiled and optionally stored. Still further, the handover report is transmitted to a network node operating as an access node.

20 Claims, 31 Drawing Sheets

Simplified wireless communication system

(51) Int. Cl.
*H04W 36/18* (2009.01)
*H04W 74/0833* (2024.01)

(56) References Cited

U.S. PATENT DOCUMENTS

| | | | |
|---|---|---|---|
| 2014/0378138 A1 | 12/2014 | Chang et al. | |
| 2015/0195762 A1 | 7/2015 | Watanabe et al. | |
| 2015/0207672 A1 | 7/2015 | Xu et al. | |
| 2015/0334607 A1 | 11/2015 | Singh et al. | |
| 2020/0022035 A1* | 1/2020 | Kadiri | H04W 36/0072 |
| 2020/0288359 A1* | 9/2020 | Kim | H04W 36/026 |
| 2021/0051539 A1* | 2/2021 | Zhang | H04W 36/02 |
| 2022/0078675 A1* | 3/2022 | Xie | H04W 36/0064 |
| 2022/0159524 A1* | 5/2022 | Jung | H04W 36/185 |

OTHER PUBLICATIONS

Author Unknown, "Technical Specification Group Radio Access Network; Evolved Universal Terrestrial Radio Access (E-UTRA); Study on latency reduction techniques for LTE (Release 14)," Technical Report 36.881, Version 14.0.0, Jun. 2016, 3GPP Organizational Partners, 99 pages.

Author Unknown, "Technical Specification Group Radio Access Network; Evolved Universal Terrestrial Radio Access (E-UTRA); Physical layer procedures (Release 15)," Technical Specification 36.213, Version 15.7.0, Sep. 2019, 3GPP Organizational Partners, 551 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.7.0, Sep. 2019, 3GPP Organizational Partners, 365 bages.

Author Unknown, "Technical Specification Group Radio Access Network; Evolved Universal Terrestrial Radio Access (E-UTRA); User Equipment (UE) procedures in idle mode (Release 15)," Technical Specification 36.304, Version 15.4.0, Jun. 2019, 3GPP Organizational Partners, 55 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.7.0, Sep. 2019, 3GPP Organizational Partners, 962 pages.

Author Unknown, "Technical Specification Group Radio Access Network; Evolved Universal Terrestrial Radio Access Network (E-Utran); X2 application protocol (X2AP) (Release 15)," Technical Specification 36.423, Version 15.7.0, Sep. 2019, 3GPP Organizational Partners, 422 pages.

Author Unknown, "Technical Specification Group Radio Access Network; NR; Requirements for support of radio resource management (Release 16)," Technical Specification 38.133, Version 16.1.0, Sep. 2019, 3GPP Organizational Partners, 1043 pages.

Author Unknown, "Technical Specification Group Radio Access Network; NR; Physical layer procedures for control (Release 15)," Technical Specification 38.213, Version 15.7.0, Sep. 2019, 3GPP Organizational Partners, 109 pages.

Author Unknown, "Technical Specification Group Radio Access Network; NR; NR and NG-RAN Overall Description; Stage 2 (Release 15)," Technical Specification 38.300, Version 15.7.0, Sep. 2019, 3GPP Organizational Partners, 99 pages.

Author Unknown, "Technical Specification Group Radio Access Network; NR; User Equipment (UE) procedures In Idle mode and RRC Inactive state (Release 15)," Technical Specification 38.304, Version 15.5.0, Sep. 2019, 3GPP Organizational Partners, 29 pages.

Author Unknown, "Technical Specification Group Radio Access Network; NR; Radio Resource Control (RRC) protocol specification (Release 15)," Technical Specification 38.331, Version 15.7.0, Sep. 2019, 3GPP Organizational Partners, 526 pages.

Vivo, "R2-1912349: Summary of Email Discussion on CP for DAPS," 3GPP TSG-RAN WG2 Meeting #107bis, Oct. 14-18, 2019, Chongqing, China, 37 pages.

International Search Report and Written Opinion for International Patent Application No. PCT/SE2020/051007, mailed Jan. 14, 2021, 11 pages.

* cited by examiner

*Simplified wireless communication system*

*Handover in LTE*

*Rel-14 LTE Make Before Break (MBB)*

*DAPS Handover for LTE*

Dual Active Protocol Stack (DAPS) on the UE side

L3 filtering of physical layer "out-of-sync" and "in-sync" indications

Ramifications of Self-Configuration/Self-Optimization functionality (from 3GPP TS 36.300 figure 22.1-1)

DUAL ACTIVE PROTOCOL STACK HANDOVER REPORTS

This application is a 35 U.S.C. § 371 national phase filing of International Application No. PCT/SE2020/051007, filed Oct. 20, 2020, which claims the benefit of provisional patent application Ser. No. 62/929,168, filed Nov. 1, 2019, the disclosures of which are incorporated herein by reference in their entireties.

TECHNICAL FIELD

The present disclosure relates generally to communications, and more particularly to methods, computer program products, wireless devices and related nodes for Dual Active Protocol Stack (DAPS) handover reports.

BACKGROUND

Generally, all terms used herein, i.e. throughout this disclosure, are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates a simplified wireless communication system. As depicted, a UE or other wireless device 102, which communicates with one or multiple access nodes 103-104, which in turn is connected to a network node 106. The access nodes 103-104 are part of the radio access network 100.

For wireless communication systems pursuant to 3GPP Evolved Packet System, EPS (also referred to as Long Term Evolution, LTE, or 4G) standard specifications, such as specified in 3GPP TS 36.300 and related specifications, the access nodes 103-104 corresponds typically to an Evolved NodeB (eNB) and the network node 106 corresponds typically to either a Mobility Management Entity (MME) and/or a Serving Gateway (SGW). The eNB is part of the radio access network 100, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 and related specifications, on the other hand, the access nodes 103-104 correspond typically to an 5G NodeB (gNB) and the network node 106 corresponds typically to either a Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

Mobility in RRC_CONNECTED in LTE and NR

Mobility in RRC_CONNECTED state is also known as handover. The purpose of handover is to move the UE, due to e.g. mobility, from a source access node using a source radio connection (also known as source cell connection), to a target access node, using a target radio connection (also known as target cell connection). The source radio connection is associated with a source cell controlled by the source access node. The target radio connection is associated with a target cell controlled by the target access node. So in other words, during a handover, the UE moves from the source cell to a target cell. Sometimes the source access node or the source cell is referred to as the "source", and the target access node or the target cell is sometimes referred to as the "target".

In some cases, the source access node and target access node are different nodes, such as different eNBs or gNBs. These cases are also referred to as inter-node handover, inter-eNB handover or inter-gNB handover. In other cases, the source access node and target access node are the same node, such as the same eNB and gNB. These cases are also referred to as intra-node handover, intra-eNB handover or intra-gNB handover and covers the case then source and target cells are controlled by the same access node. In yet other cases, handover is performed within the same cell (and thus also within the same access node controlling that cell)—these cases are also referred to as intra-cell handover.

It should therefore be understood that the source access node and target access node refers to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE (in LTE an RRConnectionReconfiguration message with a field called mobilityControlInfo and in NR an RRCReconfiguration message with a reconfigurationWithSync field).

These reconfigurations are actually prepared by the target access node upon a request from the source access node (over X2 or S1 interface in case of EUTRA-EPC or Xn or NG interface in case of NG-RAN-5GC) and takes into account the existing RRC configuration and UE capabilities as provided in the request from the source access node and its own capabilities and resource situation in the intended target cell and target access node. The reconfiguration parameters provided by the target access node contains, for example, information needed by the UE to access the target access node, e.g., random access configuration, a new C-RNTI assigned by the target access node and security parameters enabling the UE to calculate new security keys associated to the target access node so the UE can send a Handover Complete message (in LTE an RRConnectionReconfiguratioComplete message and in NR an RRCReconfigurationComplete message) on SRB1 encrypted and integrity protected based on new security keys upon accessing the target access node.

FIG. 2 illustrates the signaling flow between UE, source access node (also known as source gNB, source eNB or source cell) and target access node (also known as target gNB, target eNB or target cell) during a handover procedure, using LTE as example.

User Plane Handling During Handover

Depending on the required QoS, either a seamless or a lossless handover is performed as appropriate for each user plane radio bearer, as explained in the following subsections.

Seamless Handover

Seamless handover is applied for user plane radio bearers mapped on RLC Unacknowledged Mode (UM). These types of data are typically reasonably tolerant of losses but less tolerant of delay (e.g. voice services). Seamless handover is therefore designed to minimize complexity and delay but may result in loss of some PDCP SDUs.

At handover, for radio bearers to which seamless handover applies, the PDCP entities including the header compression contexts are reset, and the COUNT values are set to zero. As a new key is anyway generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/Xn interface to the target access node. PDCP SDUs for which the transmission has already started but that have not been successfully received will be lost. This minimizes the complexity because no context (i.e. configuration information) has to be transferred between the source access node and the target access node at handover.

Lossless Handover

Based on the SN that is added to PDCP Data PDUs it is possible to ensure in-sequence delivery during handover, and even provide a fully lossless handover functionality, performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol (TCP).

Lossless handover is applied for user plane radio bearers that are mapped on RLC Acknowledged Mode (AM). When RLC AM is used, PDCP SDUs that have been transmitted but not yet been acknowledged by the RLC layer are stored in a retransmission buffer in the PDCP layer.

In order to ensure lossless handover in the downlink (DL), the source access node forwards the DL PDCP SDUs stored in the retransmission buffer as well as fresh DL PDCP SDUs received from the gateway to the target access node for (re-) transmission. The source access node receives an indication from the core network gateway (SGW in LTE/EPC, UPF in LTE/5GC and NR) that indicates the last packet sent to the source access node (a so called "end marker" packet). The source access node also forwards this indication to the target access node 104 so that the target access node knows when it can start transmission of packets received directly from the gateway.

In order to ensure lossless handover in the uplink (UL), the UE retransmits the UL PDPC SDUs that are stored in the PDCP retransmission buffer in the target access node. The retransmission is triggered by the PDCP re-establishment that is performed upon reception of the handover command. The source access node, after decryption and decompression, will forward all PDCP SDUs received out of sequence to the target access node. Thus, the target access node 104 can reorder the PDCP SDUs received from the source access node 103 and the retransmitted PDCP SDUs received from the UE based on the PDCP SNs which are maintained during the handover, and deliver them to the gateway in the correct sequence.

An additional feature of lossless handover is so-called selective re-transmission. In some cases it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions a PDCP status report can be sent from the target access node to the UE and from the UE to the target access node. Whether to send a PDCP status report after handover is configured independently for each radio bearer and for each direction.

Rel-14 Make-Before-Break Handover

Handover interruption time is typically defined as the time from the UE stops transmission/reception with the source access node until the target access node resumes transmission/reception with the UE.

In LTE pre-Rel-14, according to 3GPP TR 36.881, the handover interruption time is at least 45 ms. In LTE and NR, different solutions to decrease the handover interruption time have since then been discussed. Improvements are driven for example by new service requirements on low latency (e.g. aerial, industrial automation, industrial control) for which low interruption time shall be guaranteed.

As an example of one such improvement, Make-Before-Break (MBB) was introduced in LTE Rel-14 in purpose to shorten handover interruption time as close to 0 ms as possible. FIG. 3 illustrates Rel-14 LTE Make Before Break (MBB).

The MBB handover procedure as introduced in LTE Rel-14, refers to a handover mechanism where the UE connects to the target cell before disconnecting from the source cell unlike the standard handover procedure where the UE resets MAC and re-establishes RLC and PDCP upon receiving the Handover Command message (RRCConnectionReconfiguration message with mobilityControlInfo) in the source cell. The mobilityControlInfo in the RRCConnectionReconfiguration message includes a field makeBeforeBreak, to instruct the UE 102 to keep the connection to the source cell 103. From 3GPP TS 36.331:

--- makeBeforeBreak

Indicates that the UE shall continue uplink
transmission/downlink reception with
the source cell(s) before performing the first
transmission through PRACH to the target

| makeBeforeBreak |
|---|
| intra-frequency PCell, or performing initial PUSCH transmission to the target intra-frequency PCell while rach-Skip is configured. |

NOTE 1a:
It is up to UE implementation when to stop the uplink transmission/downlink reception with the source cell(s) to initiate re-tuning for connection to the target cell, as specified in TS 36.133 [16], if makeBeforeBreak is configured.

In the MBB solution, the connection to the source cell is maintained after the reception of Handover Command until the UE executes initial UL transmission in the target cell, i.e. MAC reset and RLC and PDCP re-establishment is delayed in the UE until the UE performs random-access in the target cell or, if MBB is combined with RACH-less handover (i.e. rach-Skip is present in the mobilityControlInfo), until the UE performs the initial PUSCH transmission. It is up to UE implementation (and UE capabilities) when to stop the UL transmission/DL reception with the source cell to initiate re-tuning for connection to the target cell.

At the point when the source eNB has stopped transmission/reception to/from the UE, the source eNB sends the SN STATUS TRANSFER message (step 8) to the target eNB to convey the uplink PDCP SN receiver status and the downlink PDCP SN transmitter status of the radio bearers for which PDCP status preservation applies.

MBB as specified in LTE Rel-14 (3GPP TS 36.300 and TS 36.331) has some known limitations: Even if MBB and other improvements, such as RACH-less handover are combined it is still not possible to reach ~0 ms handover interruption time. MBB in Rel-14 is only supported for intra-frequency handovers and assumes the UE is equipped with a single Rx/Tx chain. In an intra-frequency handover scenario, a single Rx UE is capable of receiving from both target and source cell simultaneously, however, a single Tx UE will not be able to transmit to both cells simultaneously. Thus, in MBB Rel-14, the UE will release the connection to the source cell before the first UL transmission. This occurs when the UE transmits the RACH preamble; or transmits the Handover Complete message (if RACH-less HO is configured).

Consequently, the UE releases the connection with the source cell before the connection with the target cell is ready for packet transmission/reception, which results in interruption time of ~5 ms.

Rel-16 Dual Active Protocol Stacks (DAPS) Handover

To address the shortcomings of Rel-14 MBB and achieve ~0 ms interruption time an enhanced version of Make-Before-Break (MBB), also known as Dual Active Protocol Stacks (DAPS) handover, is being specified for Rel-16 both for LTE and NR. During DAPS handover it is assumed that the UE is capable of simultaneously transmitting and receiving from the source and target cells. In practice, this may require that the UE is equipped with dual Tx/Rx chains. The dual Tx/Rx chains potentially also allows DAPS handover to be supported in other handover scenarios such as inter-frequency handover.

An example of a DAPS inter-node handover is illustrated in FIG. 4 for the case of LTE.

Some highlights in this solution are:
In step 405, upon receiving the "DAPS HO" indication in the Handover Command, the UE maintains the connection to the source access node while establishing the connection to the target access node. That is, the UE can send and receive DL/UL user plane data via the source access node between step 405-408 without any interruption. And after step 408, the UE has the target link available for UL/DL user plane data transmission similar to the regular HO procedure.

In step 406, the source access node sends an SN status transfer message to the target access node, indicating UL PDCP receiver status and the SN of the first forwarded DL PDCP SDU. The uplink PDCP SN receiver status includes at least the PDCP SN of the first missing UL SDU and may include a bit map of the receive status of the out of sequence UL SDUs that the UE needs to retransmit in the target cell, if there are any such SDUs. The SN Status Transfer message also contains the Hyper Frame Number (HFN) of the first missing UL SDU as well as the HFN DL status for COUNT preservation in the target access node.

Once the connection setup with the target access node is successful, i.e. after sending the Handover Complete message in step 408, the UE maintains two data links, one to the source access node and one to the target access node. After step 408, the UE transmits the UL user plane data on the target access node similar to the regular HO procedure using the target access node security keys and compression context. Thus, there is no need for simultaneous UL user data transmission to both nodes which avoids UE power splitting between two nodes and also simplifies UE implementation. In the case of intra-frequency handover, transmitting UL user plane data to one node at a time also reduces UL interference, which increases the chance of successful decoding at the network side.

The UE needs to maintain the security and compression context for both source access node and target access node until the source link is released. The UE can differentiate the security/compression context to be used for a PDCP PDU based on the cell which the PDU is transmitted on.

To avoid packet duplication, the UE may send a PDCP status report together with the Handover Complete message in step 408, indicating the last received PDCP SN. Based on the PDCP status report, the target access node can avoid sending duplicate PDCP packets (i.e. PDCP PDUs with identical sequence numbers) to the UE, i.e. PDCP packets which were already received by the UE in the source cell.

The release of the source cell in step 413 can e.g. be triggered by an explicit message from the target access node (not shown in the figure) or by some other event such as the expiry of a release timer.

As an alternative to source access node starting packet data forwarding after step 405 (i.e. after sending the Handover Command to the UE, also known as "early packet forwarding"), the target access node may indicate to the source access node when to start packet data forwarding. For instance, the packet data forwarding may start at a later stage when the link to the target cell has been established, e.g. after the UE has performed random access in the target cell or when the UE has sent the RRC Connection Reconfiguration Complete message to the target access node (also known as "late packet forwarding"). By starting the packet data forwarding in the source access node at a later stage, the number of duplicated PDCP SDUs received by the UE from the target cell will potentially be less and by that the DL latency will be somewhat reduced. However, starting the packet data forwarding at a later stage is also a trade-off between robustness and reduced latency if, e.g., the connection between the UE and the source access node is lost before the connection to the target access node is established. In such case there will be a short interruption in the DL data transfer to the UE.

FIG. 5 illustrates the protocol stack at the UE side at Dual Active Protocol Stack (DAPS) handover. Each user plane radio bearer has an associated PDCP entity which in turn has two associated RLC entities—one for the source cell and one for the target cell. The PDCP entity uses different security keys and ROHC contexts for the source and target cell while the SN allocation (for UL transmission) and re-ordering/duplication detection (for DL reception) is common.

Note that in case of NR, there is an additional protocol layer called SDAP on top of PDCP which is responsible for mapping QoS flows to bearers. This layer is not shown in FIG. 5 and will not be discussed further in this document.

Radio Link Monitoring (RLM) in LTE and NR

Radio Link Monitoring (RLM) is a procedure in RRC_CONNECTED to keep track of the radio link condition to support determination of whether Radio Link Failure (RLF) should be declared and to enable that appropriate steps can be taken if Radio Link Failure (RLF) is declared.

The details on radio link monitoring for LTE are further specified in 3GPP TS 36.133 section 7.11 and in 3GPP TS 36.213 section 4.2.1. The details on radio link monitoring for NR are further specified in 3GPP TS 38.133 section 8.1 and in 3GPP TS 38.213 section 5. The main principles for radio link monitoring are similar for LTE and NR. As part of this radio link monitoring, the physical layer in the UE performs a quality measurement on the radio link on a defined reference signal and provides "out-of-sync" and "in-sync" indications to the RRC layer.

As a criterion for providing the "out-of-sync" indication, a threshold $Q_{out}$ is defined. When the quality is below this threshold, the downlink radio link cannot be reliably received and this corresponds by default to 10% block error rate of a hypothetical PDCCH transmission.

As a criterion for providing the "in-sync" indication, a threshold $Q_{in}$ is defined. When the quality is above this threshold, downlink radio link quality can be significantly more reliably received than at $Q_{out}$ and corresponds by default to a 2% block error rate of a hypothetical PDCCH transmission.

The details on how the thresholds $Q_{out}$ and $Q_{in}$ are defined are further specified in TS 36.133 and TS 38.133, for LTE and NR, respectively.

In LTE, when in non-DRX mode, the physical layer evaluates the thresholds $Q_{out}$ and $Q_{in}$ for each radio frame. It indicates "out-of-sync" to the RRC layer when the radio link quality is worse than the threshold $Q_{out}$ and "in-sync" when the radio link quality is better than the threshold $Q_{in}$. In LTE, when in DRX mode operation, the physical layer in the UE shall at least once every DRX period assess the radio link quality.

In NR, the physical layer in the UE assesses once per indication period the radio link quality. When in non-DRX mode operation, the UE determines the indication period as the maximum between the shortest of the periodicity for radio link monitoring resources and 10 msec. When in DRX mode operation, the UE determines the indication period as the maximum between the shortest periodicity for radio link monitoring resources and the DRX period.

The "out-of-sync" and "in-sync" indications from the physical layer are further processed by the RRC layer (this processing is also known as "L3 filtering") as illustrated in FIG. 6. Upon a certain number of (known as the parameter/counter N310) consecutive "out-of-sync" indications generated by the radio link monitoring in the physical layer, the RRC layer starts a timer (usually known as timer T310). If the physical layer then provides a certain number of (known as the parameter N311) consecutive "in-sync" indications while this timer is running, the UE has recovered from a sync problem and stops the timer T310.

When the timer T310 expires, a radio link failure (RLF) condition is declared and the UE performs cell selection and RRC connection re-establishment. During cell selection, the UE finds a suitable cell which fulfils the criteria S in TS 36.304 (for LTE cells) or in TS 38.304 (for NR cells). According to those specifications, the cell selection criterion S is fulfilled when Srxlev>0 AND Squal>0. How Srxlev and Squal are defined is further specified in those specifications.

During handover the UE does not perform radio link monitoring in the source cell. When the handover command is received by the UE, it starts timer T304. The timer T304 is stopped after successful handover (i.e. when the UE has transmitted handover complete to the target access node). If the timer T304 expires, the UE determines that the handover has failed and initiates cell selection and RRC connection re-establishment.

Self-Organising Networks (SON) in 3GPP

A Self-Organizing Network (SON) is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks).

In 3GPP, the processes within the SON area are classified into Self-configuration process and Self-optimization process. Self-configuration process is the process where newly deployed nodes are configured by automatic installation procedures to get the necessary basic configuration for system operation.

This process works in pre-operational state. Pre-operational state is understood as the state from when the eNB is powered up and has backbone connectivity until the RF transmitter is switched on.

As illustrated in FIG. 7, functions handled in the pre-operational state like:

Basic Setup; and

Initial Radio Configuration.

are covered by the Self Configuration process.

Self-optimization process is defined as the process where UE and access node measurements and performance measurements are used to auto-tune the network.

This process works in operational state. Operational state is understood as the state where the RF interface is additionally switched on.

As described in FIG. 7, functions handled in the operational state like: Optimization/Adaptation are covered by the Self Optimization process In LTE, support for Self-Configuration and Self-Optimisation is specified, as described in 3GPP TS 36.300 section 22.2, including features such as Dynamic configuration, Automatic Neighbour Relation (ANR), Mobility load balancing, Mobility Robustness Optimization (MRO), RACH optimization and support for energy saving.

In NR, support for Self-Configuration and Self-Optimisation is specified as well, starting with Self-Configuration features such as Dynamic configuration, Automatic Neighbour Relation (ANR) in Rel-15, as described in 3GPP TS 38.300 section 15. In NR Rel-16, more SON features are being specified for, including Self-Optimisation features such as Mobility Robustness Optimization (MRO).

Mobility Robustness Optimization (MRO) in 3GPP

Seamless handovers are a key feature of 3GPP technologies. Successful handovers ensure that the UE moves around in the coverage area of different cells without causing too much interruptions in the data transmission. However, there will be scenarios when the network fails to handover the UE to the 'correct' neighbor cell in time and in such scenarios the UE will declare the radio link failure (RLF) or Handover Failure (HOF).

Upon HOF and RLF, the UE may take autonomous actions i.e. trying to select a cell and initiate reestablishment procedure so that we make sure the UE is trying to get back as soon as it can, so that it can be reachable again. The RLF will cause a poor user experience as the RLF is declared by the UE only when it realizes that there is no reliable communication channel (radio link) available between itself and the network. Also, reestablishing the connection requires signaling with the newly selected cell (random access procedure, RRC Reestablishment Request, RRC Reestablishment RRC Reestablishment Complete, RRC Reconfiguration and RRC Reconfiguration Complete) and adds some latency, until the UE can exchange data with the network again.

According to the specifications (3GPP TS 36.331), the possible causes for the radio link failure could be one of the following:

1) Expiry of the radio link monitoring related timer T310;
2) Expiry of the measurement reporting associated timer T312 (not receiving the handover command from the network within this timer's duration despite sending the measurement report when T310 was running);
3) Upon reaching the maximum number of RLC retransmissions;
4) Upon receiving random access problem indication from the MAC entity;

As RLF leads to reestablishment which degrades performance and user experience, it is in the interest of the network to understand the reasons for RLF and try to optimize mobility related parameters (e.g. trigger conditions of measurement reports) to avoid later RLFs. Before the standardization of MRO related report handling in the network, only the UE was aware of some information associated to how did the radio quality looked like at the time of RLF, what is the actual reason for declaring RLF etc. For the network to identify the reason for the RLF, the network needs more information, both from the UE and also from the neighboring base stations. As part of the MRO solution in LTE, the RLF reporting procedure was introduced in the RRC specification in Rel-9 RAN2 work. That has impacted the RRC specifications (TS 36.331) in the sense that it was standardized that the UE would log relevant information at the moment of an RLF and later report to a target cell the UE succeeds to connect (e.g. after reestablishment). That has also impacted or otherwise affected the inter-gNodeB interface, i.e., X2AP specifications (3GPP TS 36.423), as an eNodeB receiving an RLF report could forward to the eNodeB where the failure has been originated.

For the RLF report generated by the UE, its contents have been enhanced with more details in the subsequent releases. The measurements included in the measurement report based on the latest LTE RRC specification are:

1) Measurement quantities (RSRP, RSRQ) of the last serving cell (PCell).
2) Measurement quantities of the neighbor cells in different frequencies of different RATs (EUTRA, UTRA, GERAN, CDMA2000).
3) Measurement quantity (RSSI) associated to WLAN Aps.
4) Measurement quantity (RSSI) associated to Bluetooth beacons.
5) Location information, if available (including location coordinates and velocity)
6) Globally unique identity of the last serving cell, if available, otherwise the PCI and the carrier frequency of the last serving cell.
7) Tracking area code of the PCell.
8) Time elapsed since the last reception of the 'Handover command' message.
9) C-RNTI used in the previous serving cell.
10) Whether or not the UE was configured with a DRB having QCI value of 1.

The detection and logging of the RLF related parameters is captured in section 5.3.11.3 of LTE RRC specification 3GPP TS 36.331 (yellow highlighted text refers to RLF detection part and the green highlighted text refers to RLF reporting aspects).

---

5.3.11.3 Detection of radio link failure

The UE shall:

1> upon T310 expiry; or
1> upon T312 expiry; or
1> upon random access problem indication from MCG MAC while neither T300, T301, T304 nor T311 is running; or
1> upon indication from MCG RLC, which is allowed to be send on PCell, that the maximum number of retransmissions has been reached for an SRB or DRB:
2> consider radio link failure to be detected for the MCG i.e. RLF;
2> except for NB-IoT, store the following radio link failure information in the VarRLF-Report by setting its fields as follows:
3> clear the information included in VarRLF-Report, if any;
3> set the plmn-IdentityList to include the list of EPLMNs stored by the UE (i.e. includes the RPLMN);
3> set the measResultLastServCell to include the RSRP and RSRQ, if available, of the PCell based on measurements collected up to the moment the UE detected radio link failure;
3> set the measResultNeighCells to include the best measured cells, other than the PCell, ordered such that the best cell is listed first, and based on measurements collected up to the moment the UE detected radio link failure, and set its fields as follows;

-continued

4> if the UE was configured to perform measurements for one or more
         EUTRA frequencies, include the measResultListEUTRA;
      4> if the UE was configured to perform measurement reporting for one or
         more neighbouring UTRA frequencies, include the
         measResultListUTRA;
      4> if the UE was configured to perform measurement reporting for one or
         more neighbouring GERAN frequencies, include the
         measResultListGERAN;
      4> if the UE was configured to perform measurement reporting for one or
         more neighbouring CDMA2000 frequencies, include the
         measResultsCDMA2000;
      4> for each neighbour cell included, include the optional fields that are
         available;
NOTE 1:      The measured quantities are filtered by the L3 filter as configured
      in the mobility measurement configuration. The measurements are based
      on the time domain measurement resource restriction, if configured.
      Blacklisted cells are not required to be reported.
    3> if available, set the logMeasResultListWLAN to include the WLAN
      measurement results, in order of decreasing RSSI for WLAN APs;
    3> if available, set the logMeasResultListBT to include the Bluetooth
      measurement results, in order of decreasing RSSI for Bluetooth beacons;
    3> if detailed location information is available, set the content of the
      locationInfo as follows:
      4> include the locationCoordinates;
      4> include the horizontalVelocity, if available;
    3> set the failedPCellID to the global cell identity, if available, and otherwise
      to the physical cell identity and carrier frequency of the PCell where
      radio link failure is detected;
    3> set the tac-FailedPCell to the tracking area code, if available, of the
      PCell where radio link failure is detected;
    3> if an RRCConnectionReconfiguration message including the
      mobilityControlInfo was received before the connection failure:
      4> if the last RRCConnectionReconfiguration message including the
         mobilityControlInfo concerned an intra E-UTRA handover:
         a   5>   include the previousPCellId and set it to the global cell
            identity of the PCell where the last RRCConnectionReconfiguration
            message including mobilityControlInfo was received;
         b   5>   set the timeConnFailure to the elapsed time since reception
            of the last RRCConnectionReconfiguration message including the
            mobilityControlInfo;
      4> if the last RRCConnectionReconfiguration message including the
         mobilityControlInfo concerned a handover to E-UTRA from UTRA
         and if the UE supports Radio Link Failure Report for Inter-RAT
         MRO:
         c   5>   include thepreviousUTRA-CellId and set it to the physical
            cell identity, the carrier frequency and the global cell identity, if
            available, of the UTRA Cell in which the last
            RRCConnectionReconfiguration message including
            mobilityControlInfo was received;
         d   5>   set the timeConnFailure to the elapsed time since reception
            of the last RRCConnectionReconfiguration message including the
            mobilityControlInfo;
    3> if the UE supports QCI1 indication in Radio Link Failure Report and has
      a DRB for which QCI is 1:
      4> include the drb-EstablishedWithQCI-P,
    3> set the connectionFailureType to rlf,
    3> set the c-RNTI to the C-RNTI used in the PCell;
    3> set the rlf-Cause to the trigger for detecting radio link failure;
  2> if AS security has not been activated:
    3> if the UE is a NB-IoT UE:
      4> if the UE supports RRC connection re-establishment for the Control
         Plane CIoT EPS optimisation:
         e   5> initiate the RRC connection re-establishment procedure as
         specified in 5.3.7;
      4> else:
        f   5> perform the actions upon leaving RRC_CONNECTED as
        specified in 5.3.12, with release cause 'RRC connection failure';
    3> else:
      4> perform the actions upon leaving RRC_CONNECTED as specified in
         5.3.12, with release cause 'other';
  2> else:
    3> initiate the connection re-establishment procedure as specified in 5.3.7;
In case of DC, the UE shall:
1> upon T313 expiry; or
1> upon random access problem indication from SCG MAC; or
1> upon indication from SCG RLC, which is allowed to be sent on PSCell, that
  the maximum number of retransmissions has been reached for an SCG or split
  DRB:

-continued

```
   2> consider radio link failure to be detected for the SCG i.e. SCG-RLF;
   2> initiate the SCG failure information procedure as specified in 5.6.13 to
      report SCG radio link failure;
In case of CA PDCP duplication, the UE shall:
   1> upon indication from an RLC entity, which is restricted to be sent on SCell
      only, that the maximum number of retransmissions has been reached:
      2> consider radio link failure to be detected for the RLC entity;
      2> initiate the failure information procedure as specified in 5.6.21 to report
         PDCP duplication failure;
The UE may discard the radio link failure information, i.e. release the UE variable
VarRLF-Report, 48 hours after the radio link failure is detected, upon power off or
upon detach.
*************************************************************************
***************************************************
```

After the RLF is declared, the RLF report is logged and, once the UE selects a cell and succeeds with a reestablishment, it includes an indication that it has an RLF report available in the RRC Reestablishment Complete message, to make the target cell aware of that availability. Then, upon receiving an UEInformationRequest message with a flag "rlf-ReportReq-r9" the UE shall include the RLF report (stored in a UE variable VarRLF-Report, as described above) in an UEInformationResponse message and send to the network.

Based on the RLF report from the UE and the knowledge about which cell did the UE reestablished itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late or handover to wrong cell classes. These handover failure classes are explained in brief below.

1) Whether the handover failure occurred due to the 'too-late handover' cases
   a. The original serving cell can classify a handover failure to be 'too late handover' when the original serving cell fails to send the handover command to the UE associated to a handover towards a particular target cell and if the UE reestablishes itself in this target cell post RLF.
   b. An example corrective action from the original serving cell could be to initiate the handover procedure towards this target cell a bit earlier by decreasing the CIO (cell individual offset) towards the target cell that controls when the IE sends the event triggered measurement report that leads to taking the handover decision.

2) Whether the handover failure occurred due to the 'too-early handover' cases
   a. The original serving cell can classify a handover failure to be 'too early handover' when the original serving cell is successful in sending the handover command to the UE associated to a handover however the UE fails to perform the random access towards this target cell.
   b. An example corrective action from the original serving cell could be to initiate the handover procedure towards this target cell a bit later by increasing the CIO (cell individual offset) towards the target cell that controls when the IE sends the event triggered measurement report that leads to taking the handover decision.

3) Whether the handover failure occurred due to the 'handover-to-wrong-cell' cases
   a. The original serving cell can classify a handover failure to be 'handover-to-wrong-cell' when the original serving cell intends to perform the handover for this UE towards a particular target cell but the UE declares the RLF and reestablishes itself in a third cell.
   b. A corrective action from the original serving cell could be to initiate the measurement reporting procedure that leads to handover towards the target cell a bit later by decreasing the CIO (cell individual offset) towards the target cell or via initiating the handover towards the cell in which the UE reestablished a bit earlier by increasing the CIO towards the reestablishment cell.

Two different types of inter-node messages have been standardized in LTE for that purpose, the Radio link failure indication and the handover report (in 3GPP TS 36.423).

The Radio link failure indication procedure is used to transfer information regarding RRC re-establishment attempts or received RLF reports between eNBs. This message is sent from the eNB in which the UE performs reestablishment to the eNB which was the previous serving cell of the UE. The contents of the RLF indication message is given below.

There currently exist certain challenge(s). For example, during 3GPP standardization of Rel-16 mobility enhancements for LTE and NR, for the dual active protocol stack (DAPS) handover, it has been agreed in 3GPP RAN2 that if the handover fails, e.g. when timer T304 expires, and the UE has not yet completed the random access procedure, and if the source radio link is available, the UE reports handover failure to the source access node (e.g. using an RRC message) and continues data transmission and reception in the source cell. This is also known as fallback to source cell. If the source radio link is not available at DAPS handover failure or if the failure occurs after the completion of the random access procedure, the UE performs re-establishment. The detailed criterion for when source radio link is available has not been agreed in 3GPP yet. One suggestion for the criterion for when the source radio link is available is that the radio link monitoring (RLM) of the source radio link has not yet triggered a radio link failure condition. It has been agreed that the radio link monitoring on the source radio link needs to continue for some time during a DAPS handover. This is different from legacy handover where RLM on source radio link stops when the UE receives the handover command.

During 3GPP standardization of Rel-16 mobility enhancements for LTE and NR, for the dual active protocol stack (DAPS) handover, it has been agreed in 3GPP RAN2 that if the handover fails, e.g. when timer T304 expires, and the UE has not yet completed the random access procedure, and if the source radio link is available, the UE reports handover failure to the source access node (e.g. using an RRC message) and continues data transmission and reception in the source cell. This is also known as fallback to source cell. If the source radio link is not available at DAPS handover failure or if the failure occurs after the completion of the random access procedure, the UE performs re-establishment. The detailed criterion for when source radio link is available has not been agreed in 3GPP yet. One suggestion for the criterion for when the source radio link is available is that the radio link monitoring (RLM) of the source radio link has not yet triggered a radio link failure condition. It has been agreed that the radio link monitoring on the source radio link needs to continue for some time during a DAPS handover. This is different from legacy handover where RLM on source radio link stops when the UE receives the handover command.

Typically during handover, the source radio link is deteriorating fast as the UE typically is at the edge of the source cell. There have been suggestions that, if the source radio link fails during a DAPS handover (for example, when the radio link monitoring of the source radio link in the UE triggers a radio link failure condition or if the RLC layer in the UE detects a retransmission problem towards the source access node), the UE reports this as a "failure" to the target access node. However, when the source radio link fails, it is not necessarily a failed handover, especially when the UE succeeds to connect in the target cell. And, since during a DAPS handover the UE is connected to both source and target during a time period, a failed source radio link may not necessarily cause any data loss.

SUMMARY

It is in view of the above considerations and others that the various aspects of the present disclosure and their embodiments have been made.

The present disclosure recognizes the fact that, currently and according to 3GPP TS 38.331 v15.7.0 (2019-09), no report will be produced/compiled by the UE and sent to the network to assist the network in detection of underlying issues when DAPS handover is successful while the UE is suffering from underlying issues (e.g., RLM related issues or reaching the maximum number of RLC re-transmission). Hence, currently the network would be oblivious of such issues and no appropriate action can be taken to provide a more robust connectivity during DAPS handover.

Therefore, a problem or challenge is, during a handover, in particular a DAPS handover, what type of handover report (failed handover report [i.e., RLF report, when handover fails], successful handover report [in general], or DAPS handover report [when DAPS handover is successful but there are underlying issues]) the UE should transmit to the network. Thus, depending on the type of the report the content of the report may differ. Hence a related problem or challenge is what information the UE includes in such a handover report. Certain aspects of the present disclosure and their embodiments may provide solutions to the above or other challenges. For example, in certain embodiments, methods in a wireless device (such as, for example, a UE) after a handover, such as a DAPS handover, is provided for determining a type of handover report (successful handover report or failed DAPS handover report) to be sent to the network. In a particular embodiment, this determination is based on conditions during and/or after the handover, such as handover failure, fallback to source cell and source radio link failure, Additionally or alternatively, methods are provided for determining information to be included in the selected report and for transmitting the report to an access node in the network.

This disclosure also presents methods in an access node, such as the source access node, target access node or a third access node, respectively, for requesting and receiving such a handover report after a handover, such as a DAPS handover.

Certain embodiments may provide one or more of the following technical advantage(s). For example, certain embodiments may allow the network to have UE assistance information related to the DAPS handover performance in terms of any underlaying issues e.g., RLM related issues at source cell or triggering of BFR at source cell while performing DAPS handover to the target cell. This information would be valuable both for the source and target nodes to optimize the beam level configurations (e.g., RLM and BFD-BFR resources) as well as handover related parameters (e.g., Cell Individual Offset) or the optimization of the RACH resources at target cell (allocation of dedicated preambles or configured beams for RACH access at HO time). Accordingly, the above or other challenges have been addressed by the appended independent claims. Advantageous embodiments are defined in the appended dependent claims.

In a first of its aspects, the present disclosure presents a method performed by a wireless device. the method comprises: performing a Dual Active Protocol Stack (DAPS) handover; determining a type of a handover report; compiling a handover report of the determined type; and transmitting the handover report to an access node.

In some embodiments, the method may further comprise determining that there is a handover failure condition, wherein the handover report is transmitted after a handover failure condition is triggered.

In some embodiments, the type of the handover report is determined based on whether at least one failure condition is fulfilled during and/or after the handover.

In some embodiments, the at least one failure condition comprises at least one of a handover failure, a fallback to a source cell, a source radio link failure determined based on radio link monitoring, and a retransmission problem toward the source access node in a RLC layer.

In some embodiments, the type of the handover report is a failed handover report if at least one failure condition is fulfilled, wherein the handover report includes information indicating the at least one failure condition or a type of failure associated with the handover.

In some embodiments, the type of the handover report is a successful handover report when no failure condition is fulfilled, wherein the successful handover report indicates a failed radio link of a source cell after a switching of an uplink data transmission towards a target cell.

In some embodiments, compiling the handover report of the determined type comprises determining information to be included in the handover report.

In some embodiments, the information includes whether there was a failure of the source radio link during the handover and/or when the failure occurred during the handover. In some embodiments, the information comprises at least one of: a RSRP of a source cell, a RSRQ of the source cell, a SINR of the source cell, a RSRP of a target cell and/or at least one neighboring cell, a RSRQ of the target cell and/or the at least one neighboring cell, a SINR of the target cell and/or the at least one neighboring cell, a reason for a failure of a radio link towards the source cell, an indication of whether a radio link monitoring timer or a counter were triggered during the handover, an indication of whether the RLC retransmission counter is greater than zero, an indication of a failed RACH towards the target cell, an indication of whether a beam through which the wireless device accesses a target access node is a most optimal beam at a time of performing RACH, an indication of beams used for RACH access, and an indication of a beam quality measurement of beams used for RACH.

In some embodiments, transmitting the handover report to the access node comprises transmitting the handover report to at least one of a source access node, a target access node, or another access node such as a third access node.

In some embodiments, the method further comprises determining based on at least one criterion to fallback to a source cell, wherein the at least one criterion is associated with an availability of a source radio link.

In some embodiments, the method further comprises performing a fallback to a source cell, and wherein the handover report is included in a fallback indication message.

In some embodiments, the method further comprises: performing a fallback to a source cell, transmitting a fallback indication message comprising an indication that the handover report is available, receiving a request for the handover report, and transmitting the handover report in response to receiving the request.

In some embodiments, the method further comprises: determining that a handover failure has occurred, determining that fallback to the source cell is not to be performed, performing cell selection and initiating a re-establishment procedure in a selected cell, and transmitting the handover report to a third access node associated with the selected cell.

In a second of its aspects, the present disclosure presents a method performed by a network node operating as a source access node. The method comprises:
determining to perform a Dual Active Protocol Stack (DAPS) handover of a wireless device to a target cell, transmitting a handover command message to the wireless device, the handover command message indicating the handover to the target cell, and receiving a handover report from the wireless device.

In some embodiments, the method may further comprise performing at least one of: optimization of at least one allocated resource for a subsequent handover based on the handover report; and tuning a handover triggering parameter.

In some embodiments, the method further comprises: receiving a handover fallback indication from the wireless device, the handover fallback indication including an indication of an availability of the handover report; and transmitting a request for the handover report from the wireless device.

In some embodiments, the request for the handover report is included in a UEInformationRequest, and wherein the handover report is received in a radio resource control message from the wireless device.

In some embodiments, the handover report indicates whether at least one failure condition was fulfilled during and/or after the handover.

In some embodiments, the at least one failure condition comprises at least one of: a handover failure, a fallback to a source cell, a source radio link failure determined based on radio link monitoring, and a retransmission problem toward the source access node in a RLC layer.

In some embodiments, the handover report is a failed handover report when at least one failure condition is fulfilled, and wherein the handover report includes information indicating the at least one failure condition or a type of failure associated with the handover.

In some embodiments, the handover report is a successful handover report when no failure condition is fulfilled, wherein the successful handover report indicates a failed radio link of a source cell after a switching of an uplink data transmission towards a target cell.

In some embodiments, the handover report comprises information indicating whether there was a failure of the source radio link during the handover and/or when a failure occurred during the handover.

In some embodiments, the handover report comprises at least one of: a RSRP of a source cell, a RSRQ of the source cell, a SINR of the source cell, a RSRP of a target cell and/or at least one neighboring cell, a RSRQ of the target cell and/or the at least one neighboring cell, a SINR of the target cell and/or the at least one neighboring cell, a reason for a failure of a radio link towards the source cell, an indication of whether a radio link monitoring timer or a counter were triggered during the handover, an indication of whether the RLC retransmission counter is greater than zero, an indication of a failed RACH towards the target cell, an indication of whether a beam through which the wireless device accesses a target access node is a most optimal beam at a time of performing RACH, an indication of beams used for RACH access, and an indication of a beam quality measurement of beams used for RACH.

In some embodiments, the handover report is received from the wireless device in a handover complete message.

In a third of its aspects, the present disclosure presents a method performed by a network node operating as a target access node. The method comprises: receiving a handover request message from a source access node, the handover request message indicating a handover of a wireless device, wherein the handover comprises a Dual Active Protocol Stack (DAPS) handover; transmitting a handover request acknowledge message to the source access node; and receiving a handover report from the wireless device.

In some embodiments, the method further comprises performing an admission control procedure and determining, based on the admission control procedure, to accept the handover request.

In some embodiments, receiving the handover report from the wireless device comprises: receiving a handover complete message from the wireless device, the handover complete message indicating an availability of a handover report, and transmitting a request to fetch the handover report from the wireless device.

In some embodiments, the method further comprises performing at least one of: optimization of at least one allocated resource for a subsequent handover based on the handover report; and tuning a handover triggering parameter.

In some embodiments, the method further comprises transmitting the handover report to the source access node.

In some embodiments, the handover request acknowledge message includes a handover command to be included in a handover command message transmitted to the wireless device by the source access node.

In some embodiments, the method further comprises: receiving a handover fallback indication of the wireless device, the handover fallback indication including an indication of an availability of the handover report; and transmitting a request for the handover report from the wireless device.

In some embodiments, the request for the handover report is included in a UEInformationRequest, wherein the handover report is received in a radio resource control message from the wireless device.

In some embodiments, the handover report indicates whether at least one failure condition was fulfilled during and/or after the handover.

In some embodiments, the at least one failure condition comprises at least one of: a handover failure, a fallback to a source cell, a source radio link failure determined based on radio link monitoring, and a retransmission problem toward the source access node in a RLC layer.

In some embodiments, the handover report is a failed handover report when at least one failure condition is fulfilled, wherein the handover report includes information indicating the at least one failure condition or a type of failure associated with the handover.

In some embodiments, the handover report is a successful handover report when no failure condition is fulfilled, wherein the successful handover report indicates a failed radio link of a source cell after a switching of an uplink data transmission towards a target cell.

In some embodiments, the handover report comprises information indicating whether there was a failure of the source radio link during the handover and/or when a failure occurred during the handover.

In some embodiments, the handover report comprises at least one of: a RSRP of a source cell, a RSRQ of the source cell, a SINR of the source cell, a RSRP of a target cell and/or at least one neighboring cell, a RSRQ of the target cell and/or the at least one neighboring cell, a SINR of the target cell and/or the at least one neighboring cell, a reason for a failure of a radio link towards the source cell, an indication of whether a radio link monitoring timer or a counter were triggered during the handover, an indication of whether the RLC retransmission counter is greater than zero, an indication of a failed RACH towards the target cell, an indication of whether a beam through which the wireless device accesses a target access node is a most optimal beam at a time of performing RACH, an indication of beams used for RACH access, and an indication of a beam quality measurement of beams used for RACH.

In some embodiments, the handover report is received from the wireless device in a handover complete message.

In a fourth of its aspects, the present disclosure presents a computer program comprising instructions which when executed on a computer perform any of the methods of first, second or third aspects.

In a fifth of its aspects, the present disclosure presents a carrier comprising the computer program of the fourths aspect, wherein the carrier is one of an electronic signal, optical signal, radio signal or non-transitory computer readable storage medium.

In a sixth of its aspects, the present disclosure presents a wireless device for improving network efficiency, the wireless device comprising processing circuitry configured to perform the method of the first aspect; and power supply circuitry configured to supply power to the wireless device.

In a seventh of its aspects, the present disclosure presents a base station for improving network efficiency, the base station comprising processing circuitry configured to perform the method of the second or third aspects; and power supply circuitry configured to supply power to the wireless device.

In an eighth of its aspects, the present disclosure presents wireless device for improving network efficiency, the wireless device being configured to: perform a DAPS handover; determine a type of a handover report; compile a handover report of the determined type; and transmit the handover report to an access node. In some embodiments, the wireless device is configured to perform the method of the first aspect.

In an ninth of its aspects, the present disclosure presents a network node for improving network efficiency, the network node operating as a source access node and being configured to: determine to perform a DAPS handover of a wireless device to a target cell, transmit a handover command message to the wireless device, the handover command message indicating the handover to the target cell, and receive a handover report from the wireless device. In some embodiments, the network node is configured to perform the method of the second aspect.

In an tenth of its aspects, the present disclosure presents a network node for improving network efficiency, the network node operating as a target access node and being configured to: receive a handover request message from a source access node, the handover request message indicating a handover of a wireless device, wherein the handover comprises a DAPS handover; transmit a handover request acknowledge message to the source access node; and receive a handover report from the wireless device. In some embodiments, the network node is configured to perform the method of the third aspect.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements throughout the description. That is, some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
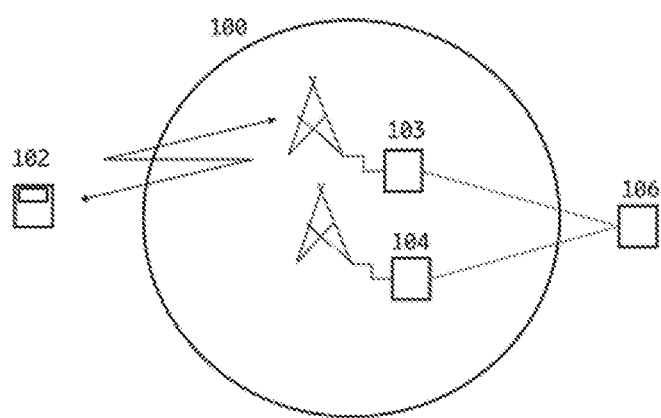
FIG. 1 illustrates a simplified wireless communication system.
Figure 2:
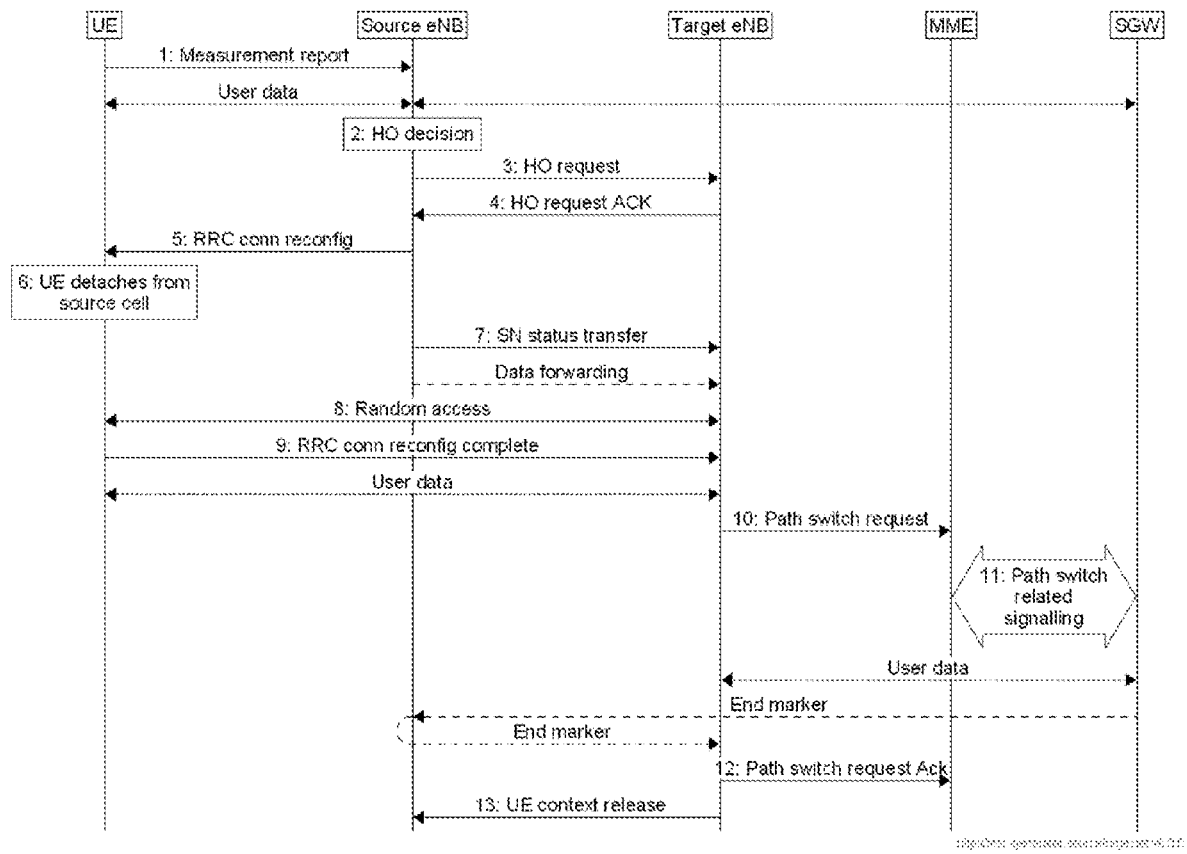
FIG. 2 illustrates a signaling diagram of a handover in LTE.
Figure 3:
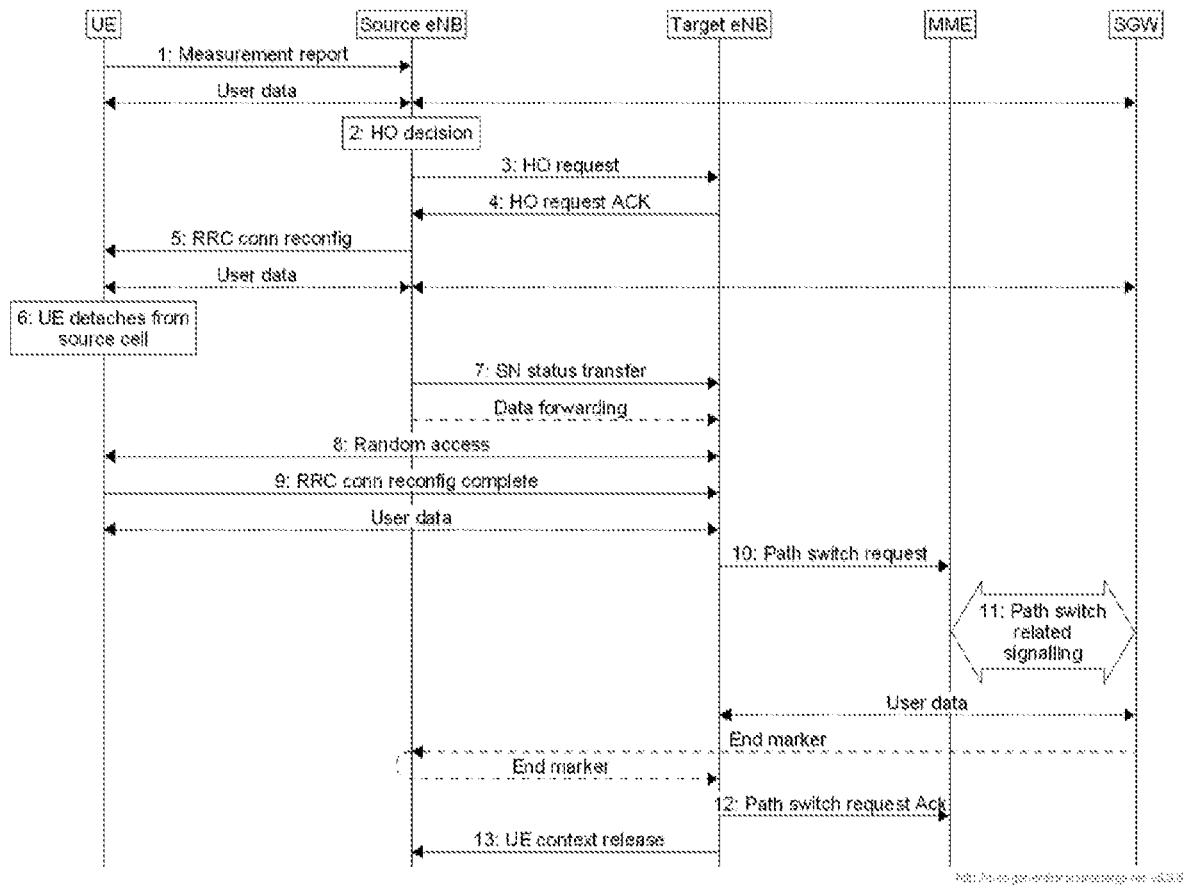
FIG. 3 illustrates a signaling diagram of a Rel-14 LTE Make Before Break (MBB)
Figure 4:
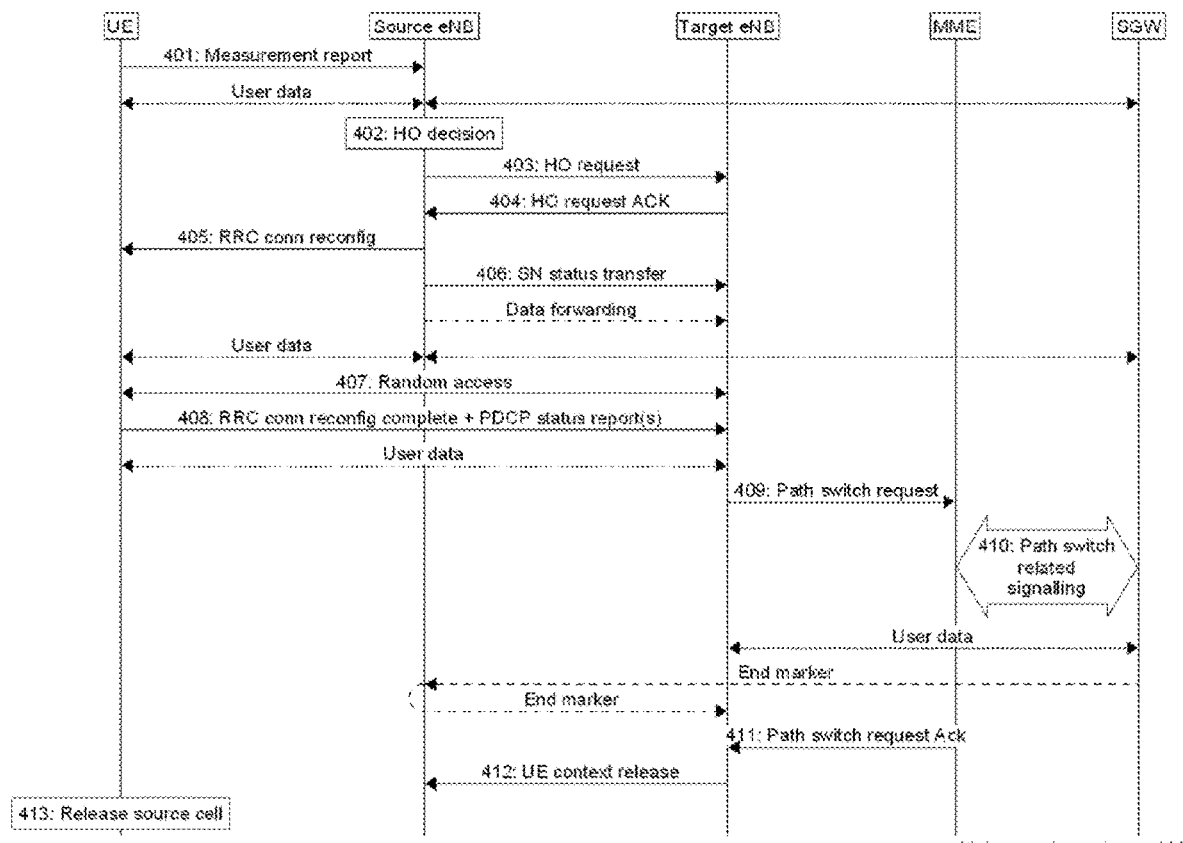
FIG. 4 illustrates a signaling diagram of a DAPS handover for LTE.
Figure 5:
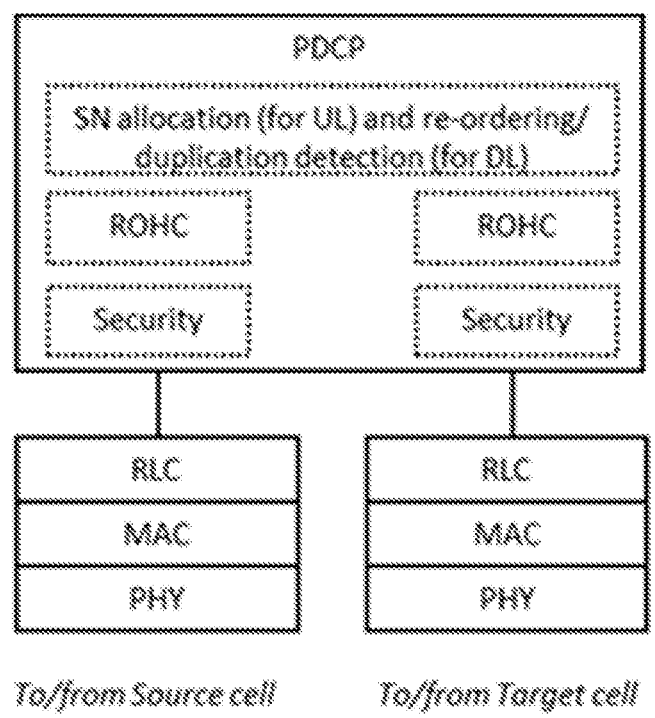
FIG. 5 illustrates a Dual Active Protocol Stack (DAPS) on the UE side.
Figure 6:
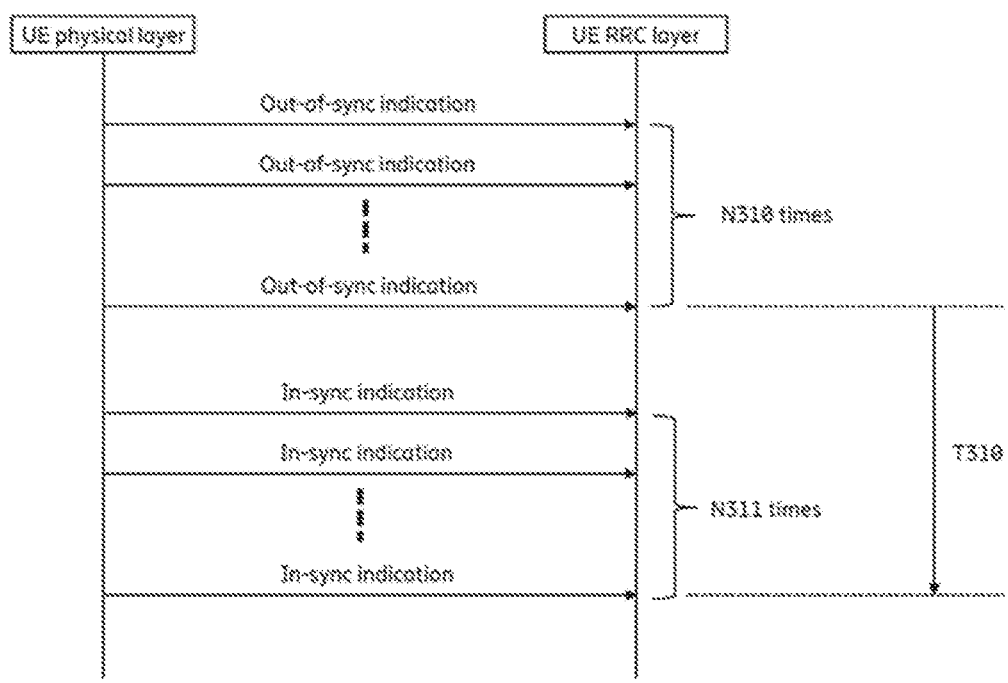
FIG. 6 illustrates a L3 filtering of physical layer "out-of-sync" and "in-sync" indications.
Figure 7:
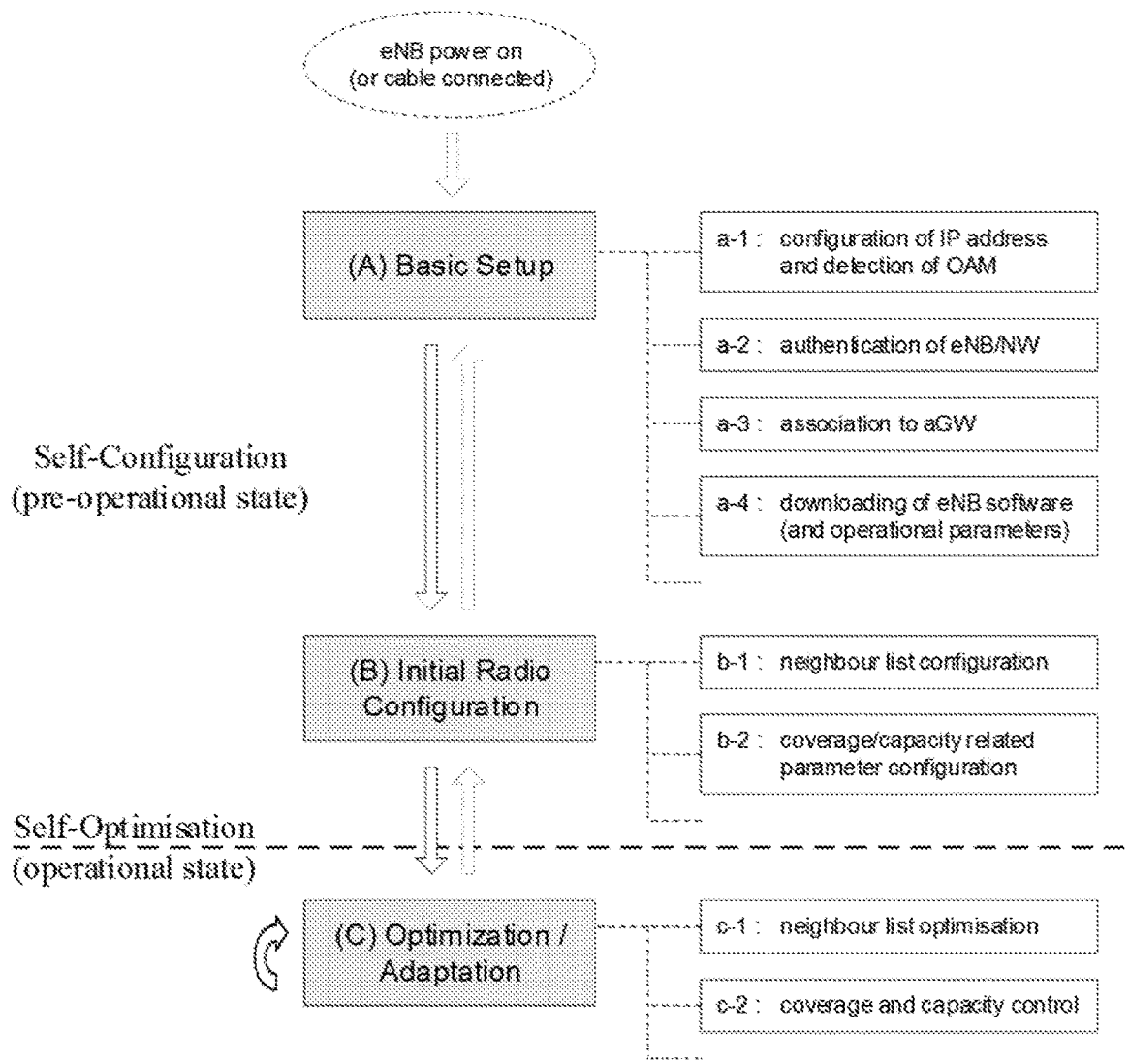
FIG. 7 illustrates ramifications of Self-Configuration/Self-Optimization functionality.
Figure 8:
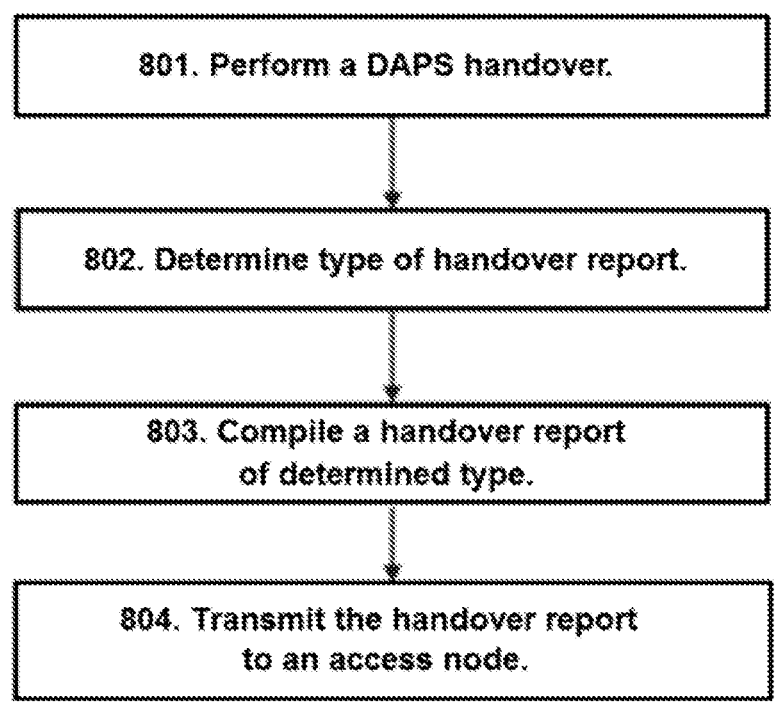
FIG. 8 illustrates a method performed by a wireless device such as a UE.

FIG. 8 illustrates a method by a wireless device such as a UE, according to certain embodiments.

At step 801, the UE 102 performs dual active protocol stack (DAPS) handover.

At step 802, the UE 102 determines the type of handover report. The determination may be based on conditions during and/or after the handover, such as handover failure, fallback to source cell and source radio link failure.

At step 803, the UE 102 determines information to be included in the selected handover report. It then compiles and optionally stores the handover report. The determination may be based on conditions such as whether there was a failure of the source radio link during the DAPS handover and when this failure occurred during the handover.

At step 804, the UE 102 transmits the handover report to an access node. Depending of the outcome of the handover, the handover report may be transmitted to the source access node 103, the target access node 104 or a third access node 105.

Figure 9:
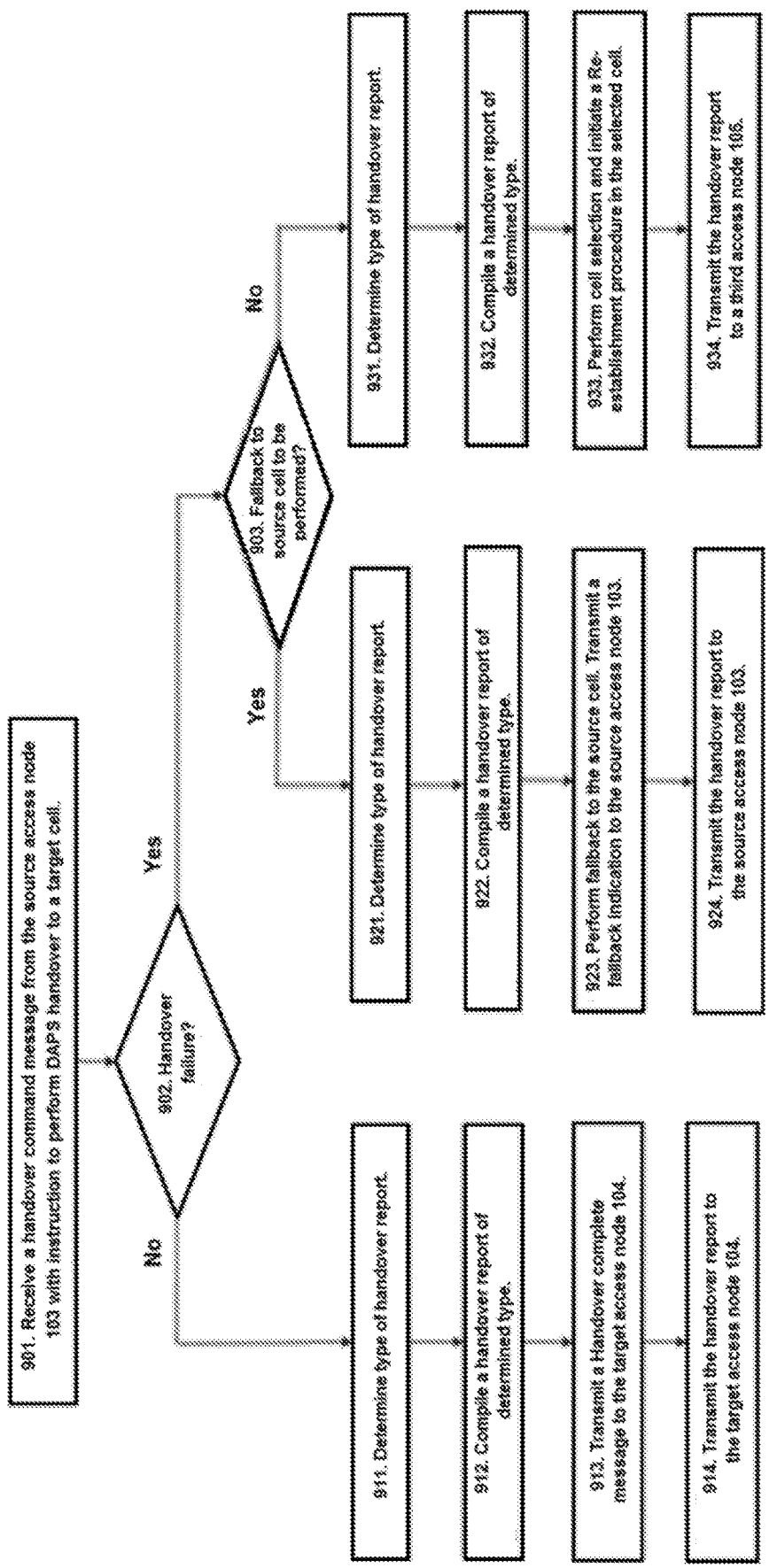
FIG. 9 illustrates another example method performed by a wireless device such as a UE.

FIG. 9 illustrates another example method by a wireless device such as a UE 102, according to a particular embodiment. Specifically, the steps discussed above with regard to FIG. 8 are now described in more detail, according to a particular embodiment.

At step 901, the UE 102 receives a handover command message (such as an RRC Connection Reconfiguration message in LTE or an RRC Reconfiguration message in NR) from the source access node 103. The message includes an instruction to perform DAPS handover to a target cell. The UE starts timer T304, tunes to the target cell frequency and establishes the dual active protocol stack (DAPS) for the source and target cells to prepare for dual cell data transmission and reception.

At step 902, the UE 102 checks if there is a handover failure condition. As one example of handover failure condition, is that the timer T304 expires before the UE successfully transmitted the handover complete message to the target access node 104.

At step 903, if there is a handover failure condition according to step 902, the UE 102 determines whether fallback to source cell is to be performed. As criterion for this, the availability of the source radio link may be used and also whether the handover failure occurred before or after the completion of the random access procedure. One example of the criterion for when the source radio link is available is that the radio link monitoring (RLM) of the source radio link has not yet triggered a radio link failure condition. For example, if the handover failure occurred before completion of the random access procedure and if the source radio link is also available, the UE performs fallback, otherwise not. In another example, the UE treats that the source cell fallback can be performed as long as the UE has not had maximum RLC retransmissions towards the source node despite having UL data in the past 'X' ms time duration (this example is mainly for those scenarios when the UE is not expected to perform source RLM after receiving the DAPS HO command from the source node).

At step 911, if there is no handover failure condition according to step 902, the UE 102 determines the type of handover report. In one alternative, a failure condition of the source radio link is used for the determination. One example of a failure condition of the source radio link is that the radio link monitoring of the source radio link in the UE triggers a radio link failure condition. Another example of a failure condition of the source radio link is that the RLC layer in the UE detects a retransmission problem towards the source access node). Another example of a failure condition is the beam failure recovery procedure towards the source node that is not completed at the time of completing the DAPS HO.

In one example, if there was no failure of the source radio link, the method in this invention determine the type of handover report is a successful handover report. In another example, if there was a failure of the source radio link (or reaching the maximum number of RLC retransmission) before the UE switched its uplink data transmission, the method in this invention determines the type of handover report is a failed DAPS handover report (a new report compared to the existing UE reporting procedures). In yet another example, if there was a failure of the source radio link after the UE switched its uplink data transmission, the type of handover report is a failed DAPS handover report. Note that the content of failed DAPS handover report will indicate the failure observed in DAPS handover (e.g., radio link failure or reaching the maximum number of RLF retransmission at source cell before/after establishing uplink to the target cell).

In another alternative, if there was a failure of the source radio link after the UE switched its uplink data transmission, the type of handover report is a successful handover report with a new cause value indicating that the reason for the transmission of successful handover report is the failed radio link of the source cell after the switching of the uplink data transmission towards the target cell). It should be noted that all these reports are named as the handover report in the FIG. 9.

At step 912, the UE 102 compiles and optionally also stores the handover report. The contents of such a handover report may vary depending on the trigger of such a handover report.

If there was no failure of the source radio link, then the contents of the handover report can include amongst other things the RSRP/RSRQ/SINR of the source and the target cells as well as other neighbouring cells (both cell level and beam level) of the DAPS HO, indications regarding whether the radio link monitoring timer (T310) or the counter (N310/N311) were triggered or not during the DAPS handover procedure, whether the RLC retransmission counter is greater than zero, whether the beam through which the UE access the target node is the most optimal beam at the time of performing RACH or not in terms of RSRP values etc.

If there was failure of the source radio link, then the contents of the handover report can include amongst other things the RSRP/RSRQ/SINR of the source and target cells at the time of the failure of the source radio link (both cell level and beam level), the reason for the failure of the radio link towards the source cell (failed BFR, expiry of the radio link monitoring related timer (T310), reaching the maximum RLC retransmissions towards the source cell etc.), time difference between the time of such a failure and the first possible successful reception of data from the target node after the DAPS HO etc.

At step 913, the UE 102 transmits a handover complete message (such as an RRC Connection Reconfiguration Complete message in LTE or an RRC Reconfiguration Complete message in NR)

At step 914, the UE transmits the handover report to the target access node 104. In one alternative, the handover report is included in the handover complete message in step 913. In another alternative, the UE 102 may include an indication in the handover complete message that the handover report is available and stored in the UE. In this alternative, the UE receives a request to transmit the handover report, such as an UEInformationRequest message received from the target access node 104, and includes the handover report in an UEInformationResponse transmitted to the target access node 104. This indication can be either the successful handover report or the newly termed failed DAPS handover report. Further in some embodiments, the failed DAPS handover report indication can be split into failed source prior to UL transmission in target and failed source after UL transmission in target. In such an embodiment, the UE chooses amongst the successful handover report, failed source prior to UL transmission in target and failed source after UL transmission in target as an indication to the target node in the handover complete message.

At step 921, if fallback to source cell is to be performed according to step 903, the UE 102 determines the type of handover report. In one alternative, the type of handover report is always a failed DAPS handover report.

Step 922, the UE 102 compiles and stores the handover report. The contents of the report could include amongst other things the RSRP/RSRQ/SINR of the source and target cells as well as other neighbouring cells at the time of the failure of the source radio link (both cell level and beam level), the failed RACH report associated to the RACH access towards the target node etc. The said failed RACH report includes the same measurements as that of the RACH report i.e., the chronological order of the beams used for RACH access, whether the contention was detected in each of those RACH attempts, beam quality measurement of the selected beams which the RACH attempts are performed through, etc.

At step 923, the UE 102 performs fallback to source cell. As part of this, the UE 102 transmits a fallback indication to the source access node 103. This indication is typically new type of RRC message.

At step 924, the UE transmits the handover report to the source access node 103. In one alternative, the handover report is included in the fallback indication message in step 923. In another alternative, the UE 102 may include an indication in the fallback indication message that the handover report is available and stored in the UE. This indication may be the same as a successful handover report or it can be a new failed DAPS handover report indication. In this alternative, the UE receives a request to transmit the handover report, such as an UEInformationRequest message received from the source access node 103. This request can be a successful handover report request or a new request indication for a failed DAPS handover report. Then UE includes the handover report in an UEInformationResponse transmitted to the source access node 103.

At step 931, if fallback to source cell is not to be performed according to step 903, the UE 102 determines the type of handover report. In one alternative, the type of handover report is always a failed DAPS handover report. In another alternative, the type of handover report is always the RLF report as the UE does not have access to source or the target cells.

At step 932, the UE 102 compiles and stores the handover report. The content of the handover report will be (similar to the radio link failure report, e.g., RLF Report) including amongst other things the RSRP/RSRQ/SINR of the source and target cells as well as other neighbouring cells at the time of the failure of the source radio link (both cell level and beam level), the failed RACH report associated to the RACH access towards the target node etc. The said failed RACH report includes the same measurements as that of the RACH report i.e., the chronological order of the beams used for RACH access, whether the contention was detected in each of those RACH attempts, beam quality measurement of the selected beams which the RACH attempts are performed through, etc. In addition, there may be an indication of the DAPS handover failure that indicates the failure happened when UE performed a DAPS handover (This can be useful for the cases when source cell removes the UE context and network would ne be aware of the type of the failure when receiving the handover report indicating a radio link failure caused at DAPS handover).

At step 933, the UE 102 performs cell selection and initiates a Re-establishment procedure in the selected cell. As part of this, it transmits an RRC Re-establishment request message to the access node controlling the selected cell, here denoted as the third access node 105.

At step 934, the UE transmits the handover report to the third access node 105. In one alternative, the handover report is included in the Re-establishment procedure in step 933, such as in the RRC Re-establishment Request message sent to the third access node. In another alternative, the UE 102 may include an indication in the particular message that the handover report is available and stored in the UE. In this alternative, the UE receives a request to transmit the handover report, such as an UEInformationRequest message received from the third access node 105, and includes the handover report in an UEInformationResponse transmitted to the third access node 105.

Figure 10:
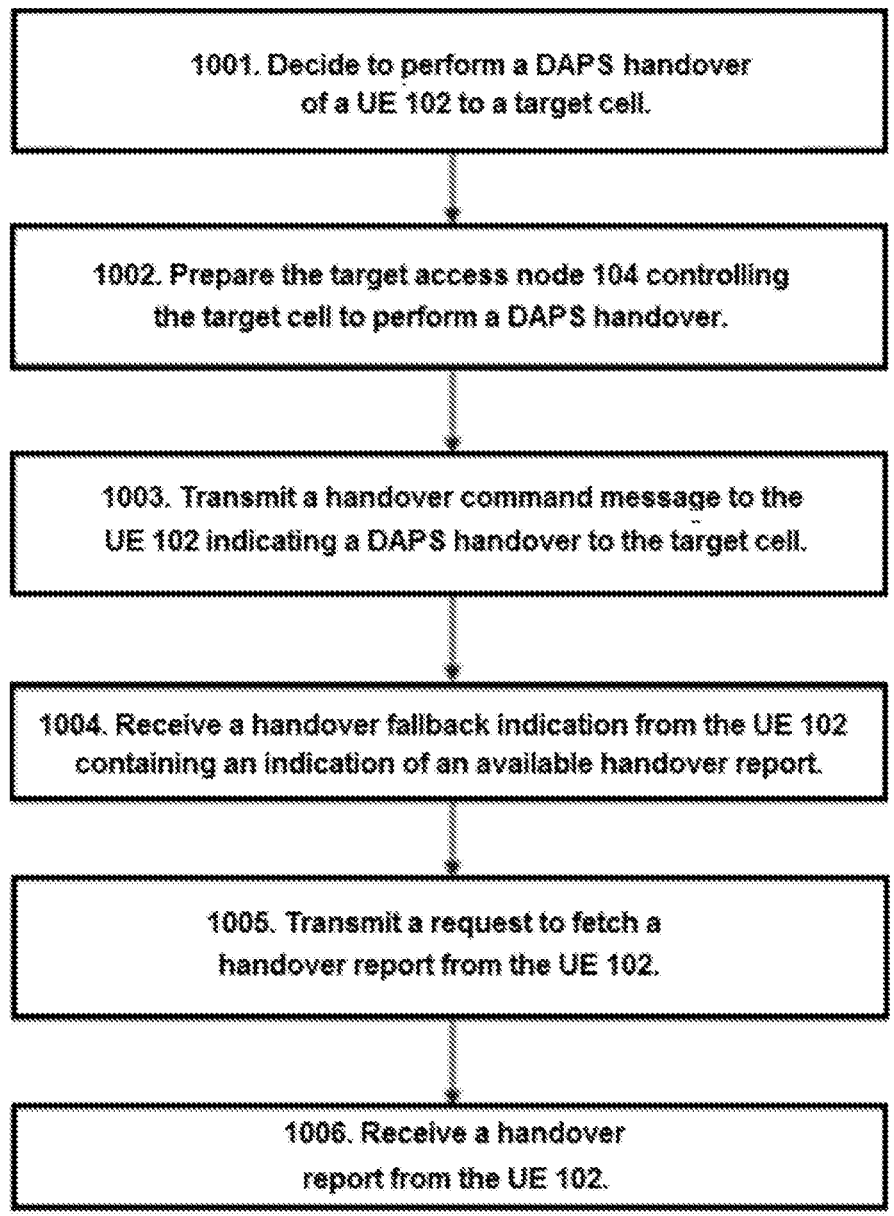
FIG. 10 illustrates a method performed by a network node operating as a source node.

FIG. 10 illustrate a method by a network node operating as a source access node, according to certain embodiments.

At step 1001, the source access node 103 decides or otherwise determines to perform the DAPS handover either based on some measurement report sent by the UE 102 or via some other available information.

At step 1002, the source access node 103 sends a Handover Request message to the target access node 104 for a DAPS handover. As a reply, the source node 103 also receives Handover Request Response message from the target access node 104 which includes the handover command to be sent to the UE 102.

At step 1003, the source access node 103 forwards the Handover Command message to the UE 102 for a DAPS handover.

At step 1004, the source access node 103 receives a DAPS handover fallback indication from the UE 102. Such a fallback may also contain an indication of the availability of the handover report associated to the DAPS handover.

At step 1005, the source access node 103 sends an indication, e.g., UEInformationRequest, to the UE 102 indicating the UE to send the handover report associated to the DAPS handover.

At step 1006, the source access node 103 receives the RRC message containing the handover report associated to the DAPS handover, e.g., UEInformationResponse, from the UE 102.

Figure 11:
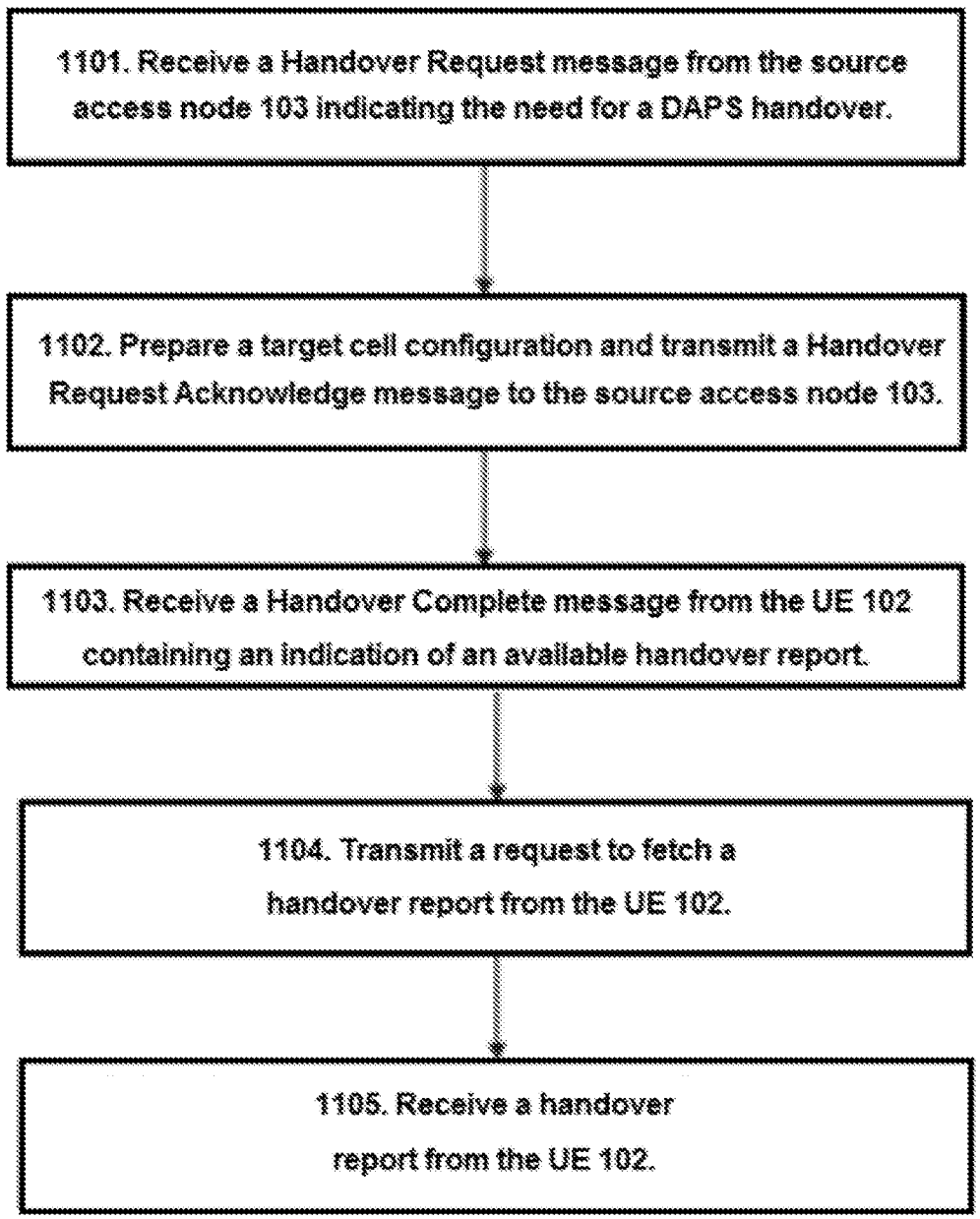
FIG. 11 illustrates an example method by a network node operating as a target access node.

FIG. 11 illustrates an example method by a network node operating as a target access node 104, according to certain embodiments.

At step 1101, the target access node 104 receives a Handover request message from the source access node 103 indicating the need for a DAPS handover. Target access node 104 may perform admission control procedure to decide whether to accept or reject the handover request.

At step 1102, the target access node 104 if accept the handover request prepare the target cell configuration and transmits the handover Request Acknowledgement message to the source access node 103.

At step 1103, the target access node 104 after completion of a DAPS handover by a UE, receives a Handover Complete message from the UE 102 that may contains an indication of a handover report. This Handover Report may be a successful Handover Report (containing some issues at source or target cell) or a DAPS Handover Report (containing some issues in particular related to the DAPS handover procedure).

At step 1104, the target access node 104 (after completion of a DAPS handover by a UE) receives a Handover Complete message indicating availability of a handover report (either successful Handover Report or a DAPS Handover report) and may initiate a signaling, e.g., UE Information Request procedure to fetch the logged information related to the performed DAPS handover by the UE.

At step 1104, the target access node 104 (after completion of a DAPS handover by a UE) may initiate retrieval of, i.e. receive, the handover report including the logged information related to the performed DAPS handover by the UE.

Note that the target access node 104 may use the content of the successful handover report or DAPS handover report to optimize the allocated resources for the next handovers.

In yet another embodiment, the target access node 104 may forward the content of the DAPS handover report to the source access node 103 for further optimization of RLM/BFD-BFR resources or tuning the handover triggering parameters e.g. Cell Individual Offset (CIO).

In case of handover failure, and when fallback to source cannot be performed (such as when the source radio link is not available), the UE 102 selects a cell and performs a Re-establishment procedure in the selected cell, as also described above. The access node controlling the cell selected by the UE 102 is here named as the third access node 105. Depending on which cell the UE selected at cell selection, third access node may be the source access node 103 (in case the UE selected the source cell), the target access node 104 (in case the UE selected the target cell), or a different access node (in case the UE selected a cell which is neither the source nor target cell).

Figure 12:
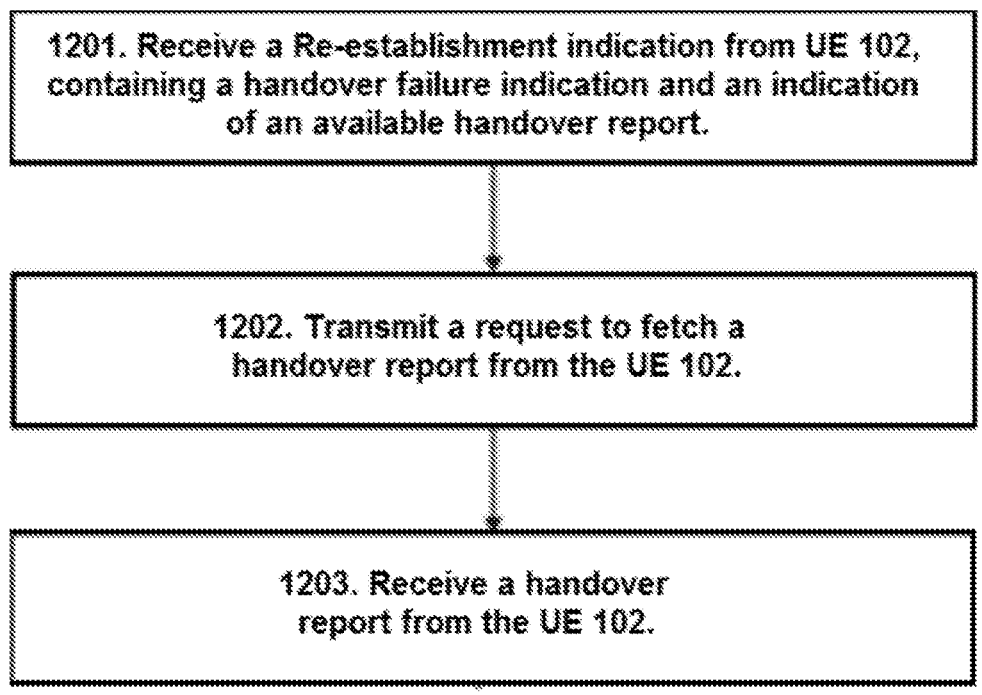
FIG. 12 illustrates an example method performed by the third access node.

FIG. 12 illustrates an example method performed by the third access node 105, according to certain embodiments.

At step 1201, the third access node 105 may receive a re-establishment request from the UE 102, containing a handover failure indication and an indication of an available handover report. The handover report can explicitly indicate the failure occurred DAPS handover or it can be the same indication as radio link failure report.

At step 1202, this access node 105 (after completion failure of a DAPS handover by a UE) receives a Re-establishment request message indicating availability of a handover report (either successful Handover Report or a DAPS Handover report) and may initiate a signaling, e.g., UE Information Request procedure to fetch the logged information related to the performed DAPS handover by the UE.

At step 1203, this access node 105 after completion failure of a DAPS handover by a UE, may initiate retrieval of, i.e. receive, the handover report including the logged information related to the performed DAPS handover by the UE.

Note that the third access node 105 may forward the content of the DAPS handover report to the source/target access node 103/104 for further optimization of RLM/BFD-BFR resources or tuning the handover triggering parameters e.g. Cell Individual Offset (CIO).

According to yet another embodiment, the criteria used by the UE 102 for transmission of a handover report is configured by the network, such as by the source access node 103. For example, whether the UE 102 should include the handover report itself in an RRC message (such as handover complete), or store the handover report, but indicate the availability of a stored handover report in such an RRC message. In one example, this criteria is specific for the DAPS handover report, and may be transmitted in the handover command message or system information as a enumeration with two values such as IncludeDapsHoReport, IndicateDapsHoReport.

Figure 13:
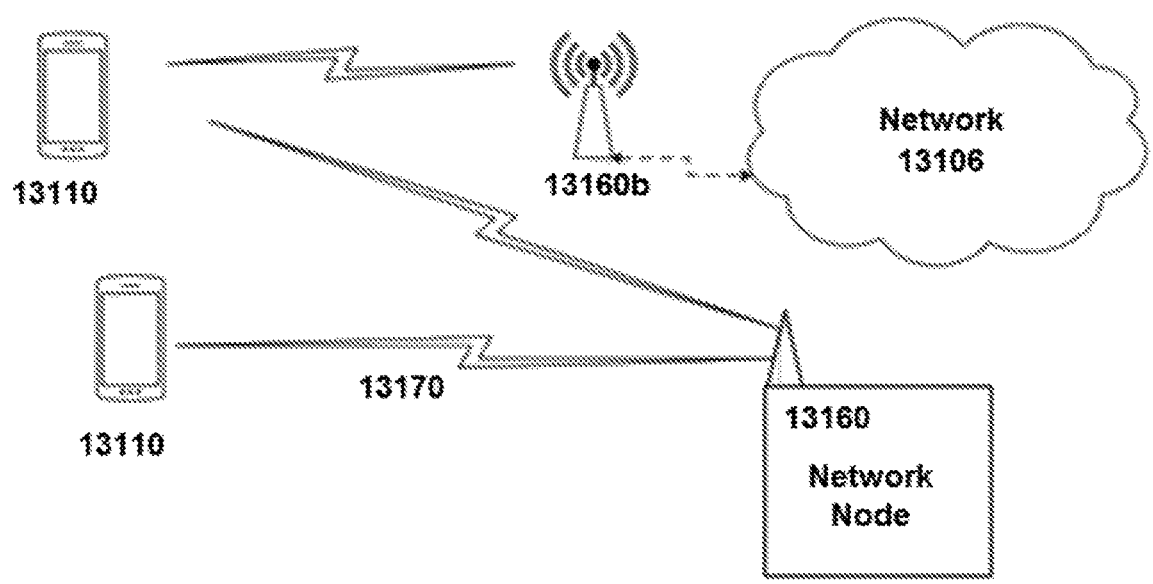
FIG. 13 illustrates a wireless network.

FIG. 13 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 13106, network nodes 13160 and 13160*b*, and wireless devices 13110, 13110*b*, and 13110*c*. In practice, a wireless network may further include any additional elements suitable to support communication between wireless devices or between a wireless device and another communication device, such as a landline telephone, a service provider, or any other network node or end device. Of the illustrated components, network node 13160 and wireless device 13110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 13106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 13160 and wireless device 13110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 14:
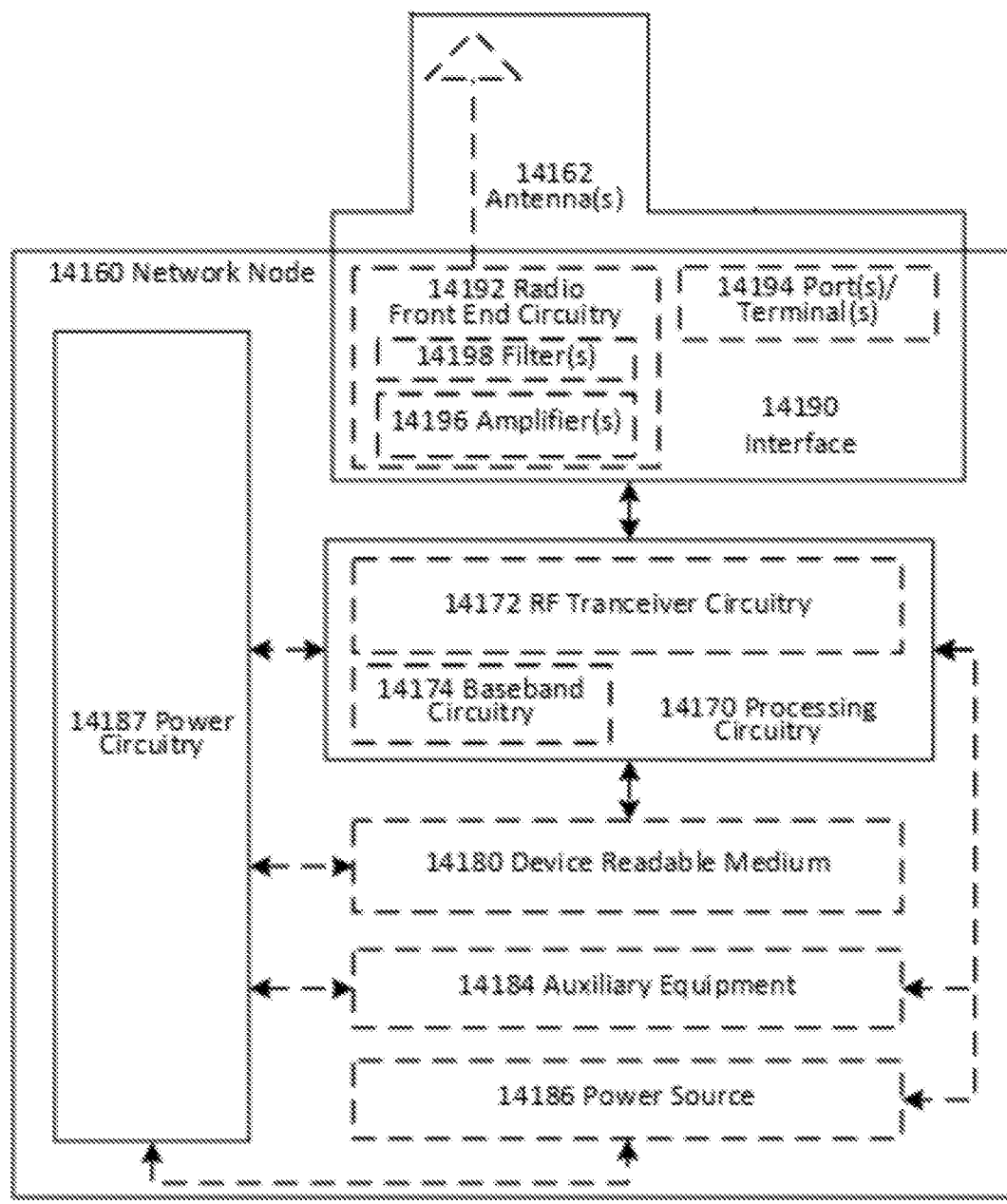
FIG. 14 illustrates an example network node.

FIG. 14 illustrates an example network node 14160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 14160 includes processing circuitry 14170, device readable medium 14180, interface 14190, auxiliary equipment 14184, power source 14186, power circuitry 14187, and antenna 14162. Although network node 14160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 14160 are depicted as single boxes located within a larger box, or nested within multiple boxes, in practice, a network node may comprise multiple different physical components that make up a single illustrated component (e.g., device readable medium 14180 may comprise multiple separate hard drives as well as multiple RAM modules).

Similarly, network node 14160 may be composed of multiple physically separate components (e.g., a NodeB component and a RNC component, or a BTS component and a BSC component, etc.), which may each have their own respective components. In certain scenarios in which network node 14160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 14160 may be configured to support multiple radio access technologies (RATs). In such embodiments, some components may be duplicated (e.g., separate device readable medium 14180 for the different RATs) and some components may be reused (e.g., the same antenna 14162 may be shared by the RATs). Network node 14160 may also include multiple sets of the various illustrated components for different wireless technologies integrated into network node 14160, such as, for example, GSM, WCDMA, LTE, NR, WiFi, or Bluetooth wireless technologies. These wireless technologies may be integrated into the same or different chip or set of chips and other components within network node 14160.

Processing circuitry 14170 is configured to perform any determining, calculating, or similar operations (e.g., certain obtaining operations) described herein as being provided by a network node. These operations performed by processing circuitry 14170 may include processing information obtained by processing circuitry 14170 by, for example, converting the obtained information into other information, comparing the obtained information or converted information to information stored in the network node, and/or performing one or more operations based on the obtained information or converted information, and as a result of said processing making a determination.

Processing circuitry 14170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 14160 components, such as device readable medium 14180, network node 14160 functionality. For example, processing circuitry 14170 may execute instructions stored in device readable medium 14180 or in memory within processing circuitry 14170. Such functionality may include providing any of the various wireless features, functions, or benefits discussed herein. In some embodiments, processing circuitry 14170 may include a system on a chip (SOC).

In some embodiments, processing circuitry 14170 may include one or more of radio frequency (RF) transceiver circuitry 14172 and baseband processing circuitry 14174. In some embodiments, radio frequency (RF) transceiver circuitry 14172 and baseband processing circuitry 14174 may be on separate chips (or sets of chips), boards, or units, such as radio units and digital units. In alternative embodiments, part or all of RF transceiver circuitry 14172 and baseband processing circuitry 14174 may be on the same chip or set of chips, boards, or units.

In certain embodiments, some or all of the functionality described herein as being provided by a network node, base station, eNB or other such network device may be performed by processing circuitry 14170 executing instructions stored on device readable medium 14180 or memory within processing circuitry 14170. In alternative embodiments, some or all of the functionality may be provided by processing circuitry 14170 without executing instructions stored on a separate or discrete device readable medium, such as in a hard-wired manner. In any of those embodiments, whether executing instructions stored on a device readable storage medium or not, processing circuitry 14170 can be configured to perform the described functionality. The benefits provided by such functionality are not limited to processing circuitry 14170 alone or to other components of network node 14160 but are enjoyed by network node 14160 as a whole, and/or by end users and the wireless network generally.

Device readable medium 14180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 14170. Device readable medium 14180 may store any suitable instructions, data or information, including a computer program, software, an application including one or more of logic, rules, code, tables, etc. and/or other instructions capable of being executed by processing circuitry 14170 and, utilized by network node 14160. Device readable medium 14180 may be used to store any calculations made by processing circuitry 14170 and/or any data received via interface 14190. In some embodiments, processing circuitry 14170 and device readable medium 14180 may be considered to be integrated.

Interface 14190 is used in the wired or wireless communication of signalling and/or data between network node 14160, network 14106, and/or wireless devices 14110. As illustrated, interface 14190 comprises port(s)/terminal(s) 14194 to send and receive data, for example to and from network 14106 over a wired connection. Interface 14190 also includes radio front end circuitry 14192 that may be coupled to, or in certain embodiments a part of, antenna 14162. Radio front end circuitry 14192 comprises filters 14198 and amplifiers 14196. Radio front end circuitry 14192 may be connected to antenna 14162 and processing circuitry 14170. Radio front end circuitry may be configured to condition signals communicated between antenna 14162 and processing circuitry 14170. Radio front end circuitry 14192 may receive digital data that is to be sent out to other network nodes or wireless devices via a wireless connection. Radio front end circuitry 14192 may convert the digital data into a radio signal having the appropriate channel and bandwidth parameters using a combination of filters 14198 and/or amplifiers 14196. The radio signal may then be transmitted via antenna 14162. Similarly, when receiving data, antenna 14162 may collect radio signals which are then converted into digital data by radio front end circuitry 14192. The digital data may be passed to processing circuitry 14170. In other embodiments, the interface may comprise different components and/or different combinations of components.

In certain alternative embodiments, network node 14160 may not include separate radio front end circuitry 14192, instead, processing circuitry 14170 may comprise radio front end circuitry and may be connected to antenna 14162 without separate radio front end circuitry 14192. Similarly, in some embodiments, all or some of RF transceiver circuitry 14172 may be considered a part of interface 14190. In still other embodiments, interface 14190 may include one or more ports or terminals 14194, radio front end circuitry 14192, and RF transceiver circuitry 14172, as part of a radio unit (not shown), and interface 14190 may communicate with baseband processing circuitry 14174, which is part of a digital unit (not shown).

Antenna 14162 may include one or more antennas, or antenna arrays, configured to send and/or receive wireless signals. Antenna 14162 may be coupled to radio front end circuitry 14190 and may be any type of antenna capable of transmitting and receiving data and/or signals wirelessly. In some embodiments, antenna 14162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 14162 may be separate from network node 14160 and may be connectable to network node 14160 through an interface or port.

Antenna 14162, interface 14190, and/or processing circuitry 14170 may be configured to perform any receiving operations and/or certain obtaining operations described herein as being performed by a network node. Any information, data and/or signals may be received from a wireless device, another network node and/or any other network equipment. Similarly, antenna 14162, interface 14190, and/or processing circuitry 14170 may be configured to perform any transmitting operations described herein as being performed by a network node. Any information, data and/or signals may be transmitted to a wireless device, another network node and/or any other network equipment.

Power circuitry 14187 may comprise, or be coupled to, power management circuitry and is configured to supply the components of network node 14160 with power for performing the functionality described herein. Power circuitry 14187 may receive power from power source 14186. Power source 14186 and/or power circuitry 14187 may be configured to provide power to the various components of network node 14160 in a form suitable for the respective components (e.g., at a voltage and current level needed for each respective component). Power source 14186 may either be included in, or external to, power circuitry 14187 and/or network node 14160. For example, network node 14160 may be connectable to an external power source (e.g., an electricity outlet) via an input circuitry or interface such as an electrical cable, whereby the external power source supplies power to power circuitry 14187. As a further example, power source 14186 may comprise a source of power in the form of a battery or battery pack which is connected to, or integrated in, power circuitry 14187. The battery may provide backup power should the external power source fail. Other types of power sources, such as photovoltaic devices, may also be used.

Alternative embodiments of network node 14160 may include additional components beyond those shown in FIG. 14 that may be responsible for providing certain aspects of the network node's functionality, including any of the functionality described herein and/or any functionality necessary to support the subject matter described herein. For example, network node 14160 may include user interface equipment to allow input of information into network node 14160 and to allow output of information from network node 14160. This may allow a user to perform diagnostic, maintenance, repair, and other administrative functions for network node 14160.

Figure 15:
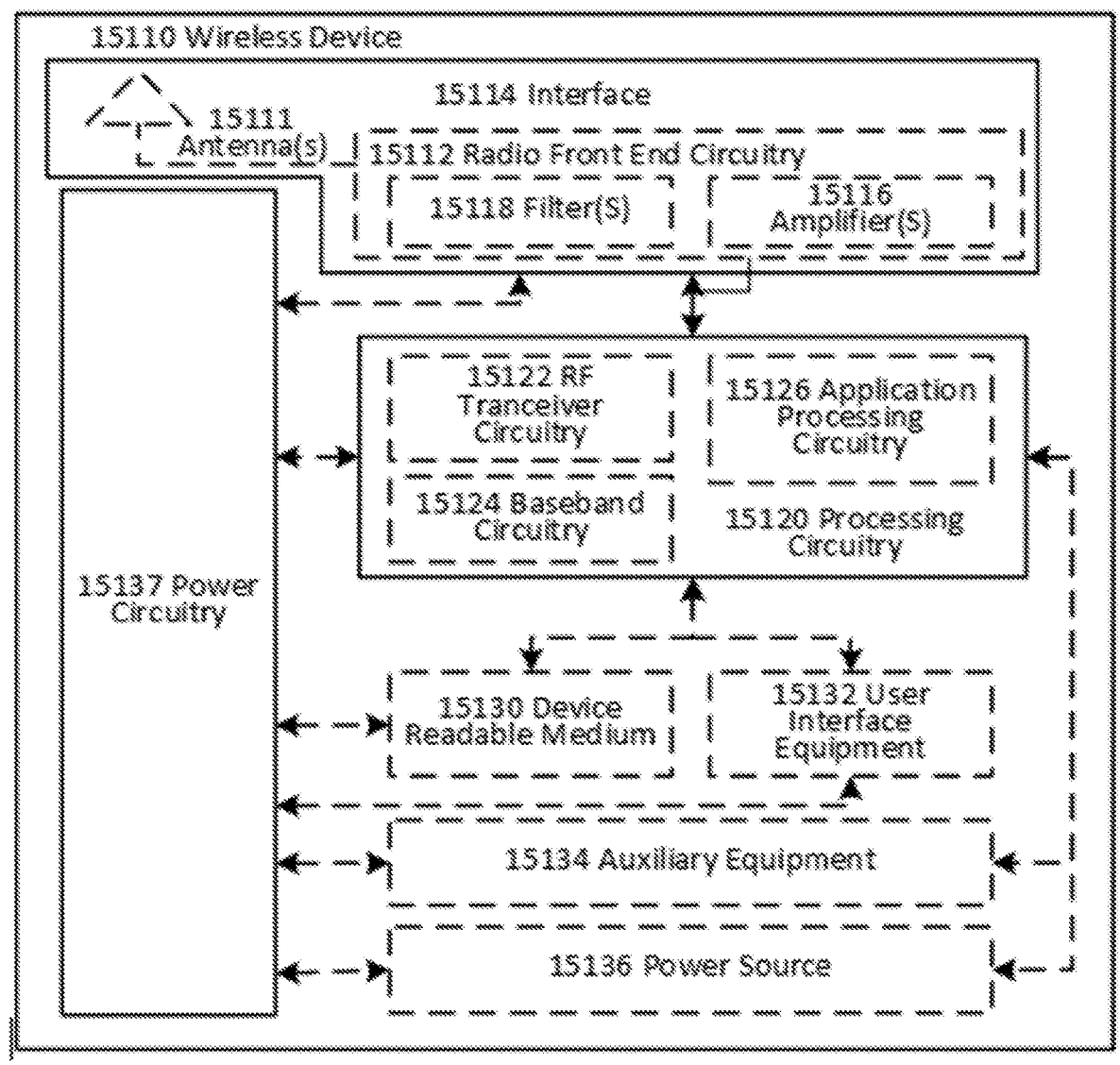
FIG. 15 illustrates an example wireless device.

FIG. 15 illustrates an example wireless device 15110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 15110 includes antenna 15111, interface 15114, processing circuitry 15120, device readable medium 15130, user interface equipment 15132, auxiliary equipment 15134, power source 15136 and power circuitry 15137. Wireless device 15110 may include multiple sets of one or more of the illustrated components for different wireless technologies supported by wireless device 15110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 15110.

Antenna 15111 may include one or more antennas or antenna arrays, configured to send and/or receive wireless signals, and is connected to interface 15114. In certain alternative embodiments, antenna 15111 may be separate from wireless device 15110 and be connectable to wireless device 15110 through an interface or port. Antenna 15111, interface 15114, and/or processing circuitry 15120 may be configured to perform any receiving or transmitting operations described herein as being performed by a wireless device. Any information, data and/or signals may be received from a network node and/or another wireless device. In some embodiments, radio front end circuitry and/or antenna 15111 may be considered an interface.

As illustrated, interface 15114 comprises radio front end circuitry 15112 and antenna 15111. Radio front end circuitry 15112 comprise one or more filters 15118 and amplifiers 15116. Radio front end circuitry 15114 is connected to antenna 15111 and processing circuitry 15120 and is configured to condition signals communicated between antenna 15111 and processing circuitry 15120. Radio front end circuitry 15112 may be coupled to or a part of antenna 15111. In some embodiments, wireless device 15110 may not include separate radio front end circuitry 15112; rather, processing circuitry 15120 may comprise radio front end circuitry and may be connected to antenna 15111. Similarly, in some embodiments, some or all of RF transceiver circuitry 15122 may be considered a part of interface 15114.

Radio front end circuitry 15112 may receive digital data that is to be sent out to other network nodes or wireless devices via a wireless connection. Radio front end circuitry 15112 may convert the digital data into a radio signal having the appropriate channel and bandwidth parameters using a combination of filters 15118 and/or amplifiers 15116. The radio signal may then be transmitted via antenna 15111. Similarly, when receiving data, antenna 15111 may collect radio signals which are then converted into digital data by radio front end circuitry 15112. The digital data may be passed to processing circuitry 15120. In other embodiments, the interface may comprise different components and/or different combinations of components.

Processing circuitry 15120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 15110 components, such as device readable medium 15130, wireless device 15110 functionality. Such functionality may include providing any of the various wireless features or benefits discussed herein. For example, processing circuitry 15120 may execute instructions stored in device readable medium 15130 or in memory within processing circuitry 15120 to provide the functionality disclosed herein.

As illustrated, processing circuitry 15120 includes one or more of RF transceiver circuitry 15122, baseband processing circuitry 15124, and application processing circuitry 15126. In other embodiments, the processing circuitry may comprise different components and/or different combinations of components. In certain embodiments processing circuitry 15120 of wireless device 15110 may comprise a SOC. In some embodiments, RF transceiver circuitry 15122, baseband processing circuitry 15124, and application processing circuitry 15126 may be on separate chips or sets of chips. In alternative embodiments, part or all of baseband processing circuitry 15124 and application processing circuitry 15126 may be combined into one chip or set of chips, and RF transceiver circuitry 15122 may be on a separate chip or set of chips. In still alternative embodiments, part or all of RF transceiver circuitry 15122 and baseband processing circuitry 15124 may be on the same chip or set of chips, and application processing circuitry 15126 may be on a separate chip or set of chips. In yet other alternative embodiments, part or all of RF transceiver circuitry 15122, baseband processing circuitry 15124, and application processing circuitry 15126 may be combined in the same chip or set of chips. In some embodiments, RF transceiver circuitry 15122 may be a part of interface 15114. RF transceiver circuitry 15122 may condition RF signals for processing circuitry 15120.

In certain embodiments, some or all of the functionality described herein as being performed by a wireless device may be provided by processing circuitry 15120 executing instructions stored on device readable medium 15130, which in certain embodiments may be a computer-readable storage medium. In alternative embodiments, some or all of the functionality may be provided by processing circuitry 15120 without executing instructions stored on a separate or discrete device readable storage medium, such as in a hard-wired manner. In any of those particular embodiments, whether executing instructions stored on a device readable storage medium or not, processing circuitry 15120 can be configured to perform the described functionality. The benefits provided by such functionality are not limited to processing circuitry 15120 alone or to other components of wireless device 15110, but are enjoyed by wireless device 15110 as a whole, and/or by end users and the wireless network generally.

Processing circuitry 15120 may be configured to perform any determining, calculating, or similar operations (e.g., certain obtaining operations) described herein as being performed by a wireless device. These operations, as performed by processing circuitry 15120, may include processing information obtained by processing circuitry 15120 by, for example, converting the obtained information into other information, comparing the obtained information or converted information to information stored by wireless device 15110, and/or performing one or more operations based on the obtained information or converted information, and as a result of said processing making a determination.

Device readable medium 15130 may be operable to store a computer program, software, an application including one or more of logic, rules, code, tables, etc. and/or other instructions capable of being executed by processing circuitry 15120. Device readable medium 15130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 15120. In some embodiments, processing circuitry 15120 and device readable medium 15130 may be considered to be integrated.

User interface equipment 15132 may provide components that allow for a human user to interact with wireless device 15110. Such interaction may be of many forms, such as visual, audial, tactile, etc. User interface equipment 15132 may be operable to produce output to the user and to allow the user to provide input to wireless device 15110. The type of interaction may vary depending on the type of user interface equipment 15132 installed in wireless device 15110. For example, if wireless device 15110 is a smart phone, the interaction may be via a touch screen; if wireless device 15110 is a smart meter, the interaction may be through a screen that provides usage (e.g., the number of gallons used) or a speaker that provides an audible alert (e.g., if smoke is detected). User interface equipment 15132 may include input interfaces, devices and circuits, and output interfaces, devices and circuits. User interface equipment 15132 is configured to allow input of information into wireless device 15110 and is connected to processing circuitry 15120 to allow processing circuitry 15120 to process the input information. User interface equipment 15132 may include, for example, a microphone, a proximity or other sensor, keys/buttons, a touch display, one or more cameras, a USB port, or other input circuitry. User interface equipment 15132 is also configured to allow output of information from wireless device 15110, and to allow processing circuitry 15120 to output information from wireless device 15110. User interface equipment 15132 may include, for example, a speaker, a display, vibrating circuitry, a USB port, a headphone interface, or other output circuitry. Using one or more input and output interfaces, devices, and circuits, of user interface equipment 15132, wireless device 15110 may communicate with end users and/or the wireless network and allow them to benefit from the functionality described herein.

Auxiliary equipment 15134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 15134 may vary depending on the embodiment and/or scenario.

Power source 15136 may, in some embodiments, be in the form of a battery or battery pack. Other types of power sources, such as an external power source (e.g., an electricity outlet), photovoltaic devices or power cells, may also be used. wireless device 15110 may further comprise power circuitry 15137 for delivering power from power source 15136 to the various parts of wireless device 15110 which need power from power source 15136 to carry out any functionality described or indicated herein. Power circuitry 15137 may in certain embodiments comprise power management circuitry. Power circuitry 15137 may additionally or alternatively be operable to receive power from an external power source; in which case wireless device 15110 may be connectable to the external power source (such as an electricity outlet) via input circuitry or an interface such as an electrical power cable. Power circuitry 15137 may also in certain embodiments be operable to deliver power from an external power source to power source 15136. This may be, for example, for the charging of power source 15136. Power circuitry 15137 may perform any formatting, converting, or other modification to the power from power source 15136 to make the power suitable for the respective components of wireless device 15110 to which power is supplied.

Figure 16:
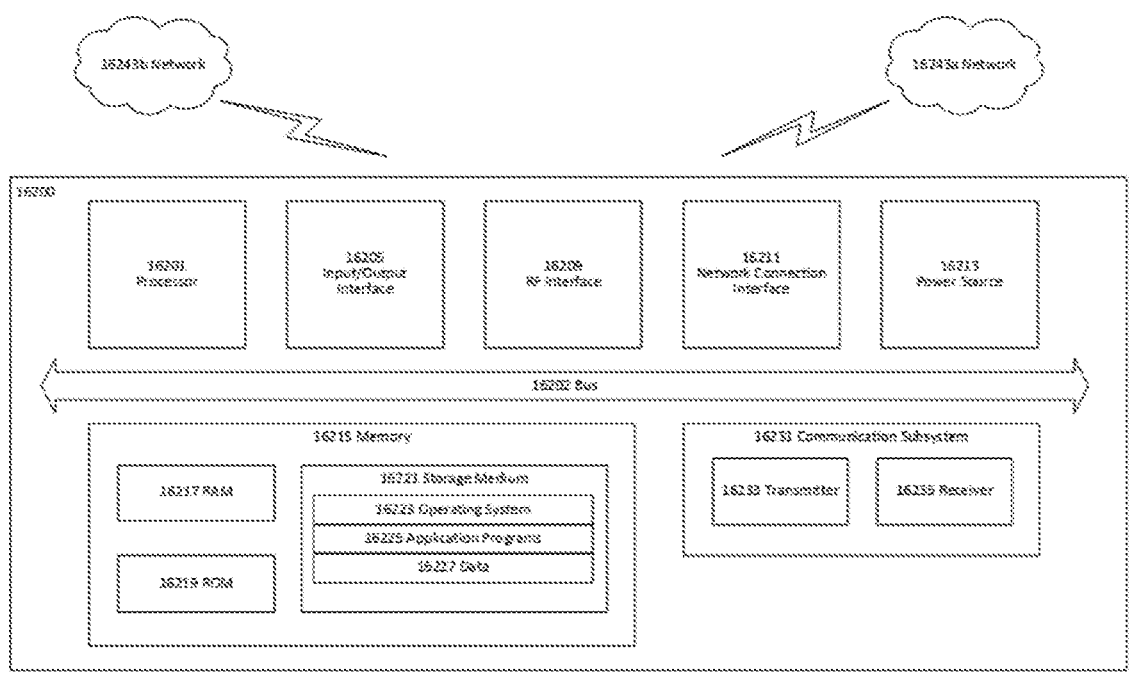
FIG. 16 illustrates a User Environment.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 162200 may be any UE identified by the $3^{rd}$ Generation Partnership Project (3GPP), including a NB-IoT UE, a machine type communication (MTC) UE, and/or an enhanced MTC (eMTC) UE. UE 16200, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 16200 includes processing circuitry 16201 that is operatively coupled to input/output interface 16205, radio frequency (RF) interface 16209, network connection interface 16211, memory 16215 including random access memory (RAM) 16217, read-only memory (ROM) 16219, and storage medium 16221 or the like, communication subsystem 16231, power source 16233, and/or any other component, or any combination thereof. Storage medium 16221 includes operating system 16223, application program 16225, and data 16227. In other embodiments, storage medium 16221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 16201 may be configured to process computer instructions and data. Processing circuitry 16201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 16201 may include two central processing units (CPUs). Data may be information in a form suitable for use by a computer.

In the depicted embodiment, input/output interface 16205 may be configured to provide a communication interface to an input device, output device, or input and output device. UE 16200 may be configured to use an output device via input/output interface 16205. An output device may use the same type of interface port as an input device. For example, a USB port may be used to provide input to and output from UE 16200. The output device may be a speaker, a sound card, a video card, a display, a monitor, a printer, an actuator, an emitter, a smartcard, another output device, or any combination thereof. UE 16200 may be configured to use an input device via input/output interface 16205 to allow a user to capture information into UE 16200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 16209 may be configured to provide a communication interface to RF components such as a transmitter, a receiver, and an antenna. Network connection interface 16211 may be configured to provide a communication interface to network 16243a. Network 16243a may encompass wired and/or wireless networks such as a local-area network (LAN), a wide-area network (WAN), a computer network, a wireless network, a telecommunications network, another like network or any combination thereof. For example, network 16243a may comprise a Wi-Fi network. Network connection interface 16211 may be configured to include a receiver and a transmitter interface used to communicate with one or more other devices over a communication network according to one or more communication protocols, such as Ethernet, TCP/IP, SONET, ATM, or the like. Network connection interface 16211 may implement receiver and transmitter functionality appropriate to the communication network links (e.g., optical, electrical, and the like). The transmitter and receiver functions may share circuit components, software or firmware, or alternatively may be implemented separately.

RAM 16217 may be configured to interface via bus 16202 to processing circuitry 16201 to provide storage or caching of data or computer instructions during the execution of software programs such as the operating system, application programs, and device drivers. ROM 16219 may be configured to provide computer instructions or data to processing circuitry 16201. For example, ROM 16219 may be configured to store invariant low-level system code or data for basic system functions such as basic input and output (I/O), startup, or reception of keystrokes from a keyboard that are stored in a non-volatile memory. Storage medium 16221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 16221 may be configured to include operating system 16223, application program 16225 such as a web browser application, a widget or gadget engine or another application, and data file 16227. Storage medium 16221 may store, for use by UE 16200, any of a variety of various operating systems or combinations of operating systems.

Storage medium 16221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 16221 may allow UE 16200 to access computer-executable instructions, application programs or the like, stored on transitory or non-transitory memory media, to off-load data, or to upload data. An article of manufacture, such as one utilizing a communication system may be tangibly embodied in storage medium 16221, which may comprise a device readable medium.

In FIG. 16, processing circuitry 16201 may be configured to communicate with network 16243*b* using communication subsystem 16231. Network 16243*a* and network 16243*b* may be the same network or networks or different network or networks. Communication subsystem 16231 may be configured to include one or more transceivers used to communicate with network 16243*b*. For example, communication subsystem 16231 may be configured to include one or more transceivers used to communicate with one or more remote transceivers of another device capable of wireless communication such as another WD, UE, or base station of a radio access network (RAN) according to one or more communication protocols, such as IEEE 802.162, CDMA, WCDMA, GSM, LTE, UTRAN, WiMax, or the like. Each transceiver may include transmitter 16233 and/or receiver 16235 to implement transmitter or receiver functionality, respectively, appropriate to the RAN links (e.g., frequency allocations and the like). Further, transmitter 16233 and receiver 16235 of each transceiver may share circuit components, software or firmware, or alternatively may be implemented separately.

In the illustrated embodiment, the communication functions of communication subsystem 16231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 16231 may include cellular communication, Wi-Fi communication, Bluetooth communication, and GPS communication. Network 16243*b* may encompass wired and/or wireless networks such as a local-area network (LAN), a wide-area network (WAN), a computer network, a wireless network, a telecommunications network, another like network or any combination thereof. For example, network 16243*b* may be a cellular network, a Wi-Fi network, and/or a near-field network. Power source 16213 may be configured to provide alternating current (AC) or direct current (DC) power to components of UE 16200.

The features, benefits and/or functions described herein may be implemented in one of the components of UE 16200 or partitioned across multiple components of UE 16200. Further, the features, benefits, and/or functions described herein may be implemented in any combination of hardware, software or firmware. In one example, communication subsystem 16231 may be configured to include any of the components described herein. Further, processing circuitry 16201 may be configured to communicate with any of such components over bus 16202. In another example, any of such components may be represented by program instructions stored in memory that when executed by processing circuitry 16201 perform the corresponding functions described herein. In another example, the functionality of any of such components may be partitioned between processing circuitry 16201 and communication subsystem 16231. In another example, the non-computationally intensive functions of any of such components may be implemented in software or firmware and the computationally intensive functions may be implemented in hardware.

Figure 17:
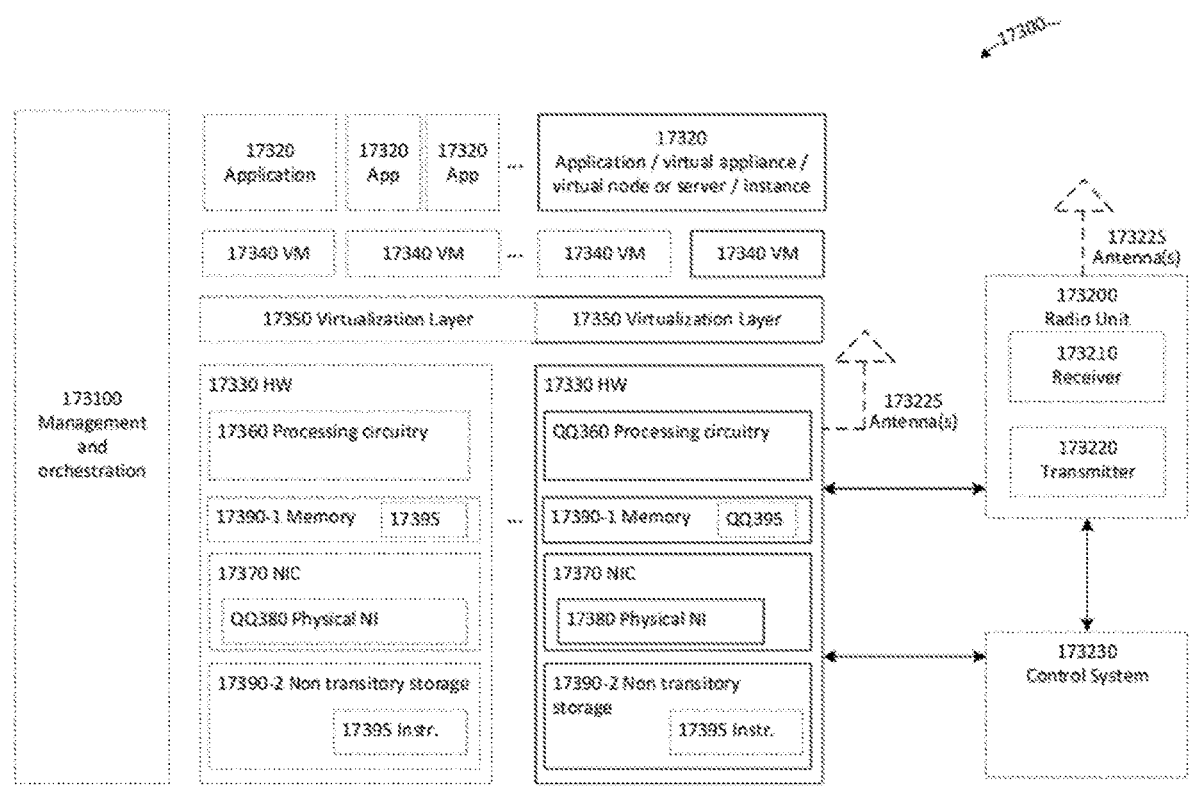
FIG. 17 illustrates a virtualization environment.

FIG. 17 is a schematic block diagram illustrating a virtualization environment 17300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 17300 hosted by one or more of hardware nodes 17330. Further, in embodiments in which the virtual node is not a radio access node or does not require radio connectivity (e.g., a core network node), then the network node may be entirely virtualized.

The functions may be implemented by one or more applications 17320 (which may alternatively be called software instances, virtual appliances, network functions, virtual nodes, virtual network functions, etc.) operative to implement some of the features, functions, and/or benefits of some of the embodiments disclosed herein. Applications 17320 are run in virtualization environment 17300 which provides hardware 17330 comprising processing circuitry 17360 and memory 17390. Memory 17390 contains instructions 17395 executable by processing circuitry 17360 whereby application 17320 is operative to provide one or more of the features, benefits, and/or functions disclosed herein.

Virtualization environment 17300, comprises general-purpose or special-purpose network hardware devices 17330 comprising a set of one or more processors or processing circuitry 17360, which may be commercial off-the-shelf (COTS) processors, dedicated Application Specific Integrated Circuits (ASICs), or any other type of processing circuitry including digital or analog hardware components or special purpose processors. Each hardware device may comprise memory 17390-1 which may be non-persistent memory for temporarily storing instructions 17395 or software executed by processing circuitry 17360. Each hardware device may comprise one or more network interface controllers (NICs) 17370, also known as network interface cards, which include physical network interface 17380. Each hardware device may also include non-transitory, persistent, machine-readable storage media 17390-2 having stored therein software 17395 and/or instructions executable by processing circuitry 17360. Software 17395 may include any type of software including software for instantiating one or more virtualization layers 17350 (also referred to as hypervisors), software to execute virtual machines 17340 as well as software allowing it to execute functions, features and/or benefits described in relation with some embodiments described herein.

Virtual machines 17340, comprise virtual processing, virtual memory, virtual networking or interface and virtual storage, and may be run by a corresponding virtualization layer 17350 or hypervisor. Different embodiments of the instance of virtual appliance 17320 may be implemented on one or more of virtual machines 17340, and the implementations may be made in different ways.

During operation, processing circuitry 17360 executes software 17395 to instantiate the hypervisor or virtualization layer 17350, which may sometimes be referred to as a virtual machine monitor (VMM). Virtualization layer 17350 may present a virtual operating platform that appears like networking hardware to virtual machine 17340.

As shown in FIG. 17, hardware 17330 may be a stand-alone network node with generic or specific components. Hardware 17330 may comprise antenna 173225 and may implement some functions via virtualization. Alternatively, hardware 17330 may be part of a larger cluster of hardware (e.g. such as in a data center or customer premise equipment (CPE)) where many hardware nodes work together and are managed via management and orchestration (MANO) 173100, which, among others, oversees lifecycle management of applications 17320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 17340 may be a software implementation of a physical machine that runs programs as if they were executing on a physical, non-virtualized machine. Each of virtual machines 17340, and that part of hardware 17330 that executes that virtual machine, be it hardware dedicated to that virtual machine and/or hardware shared by that virtual machine with others of the virtual machines 17340, forms a separate virtual network elements (VNE).

Still in the context of NFV, Virtual Network Function (VNF) is responsible for handling specific network functions that run in one or more virtual machines 17340 on top of hardware networking infrastructure 17330 and corresponds to application 17320 in FIG. 17.

In some embodiments, one or more radio units 173200 that each include one or more transmitters 173220 and one or more receivers 173210 may be coupled to one or more antennas 173225. Radio units 173200 may communicate directly with hardware nodes 17330 via one or more appropriate network interfaces and may be used in combination with the virtual components to provide a virtual node with radio capabilities, such as a radio access node or a base station.

In some embodiments, some signalling can be effected with the use of control system 173230 which may alternatively be used for communication between the hardware nodes 17330 and radio units 173200.

Figure 18:
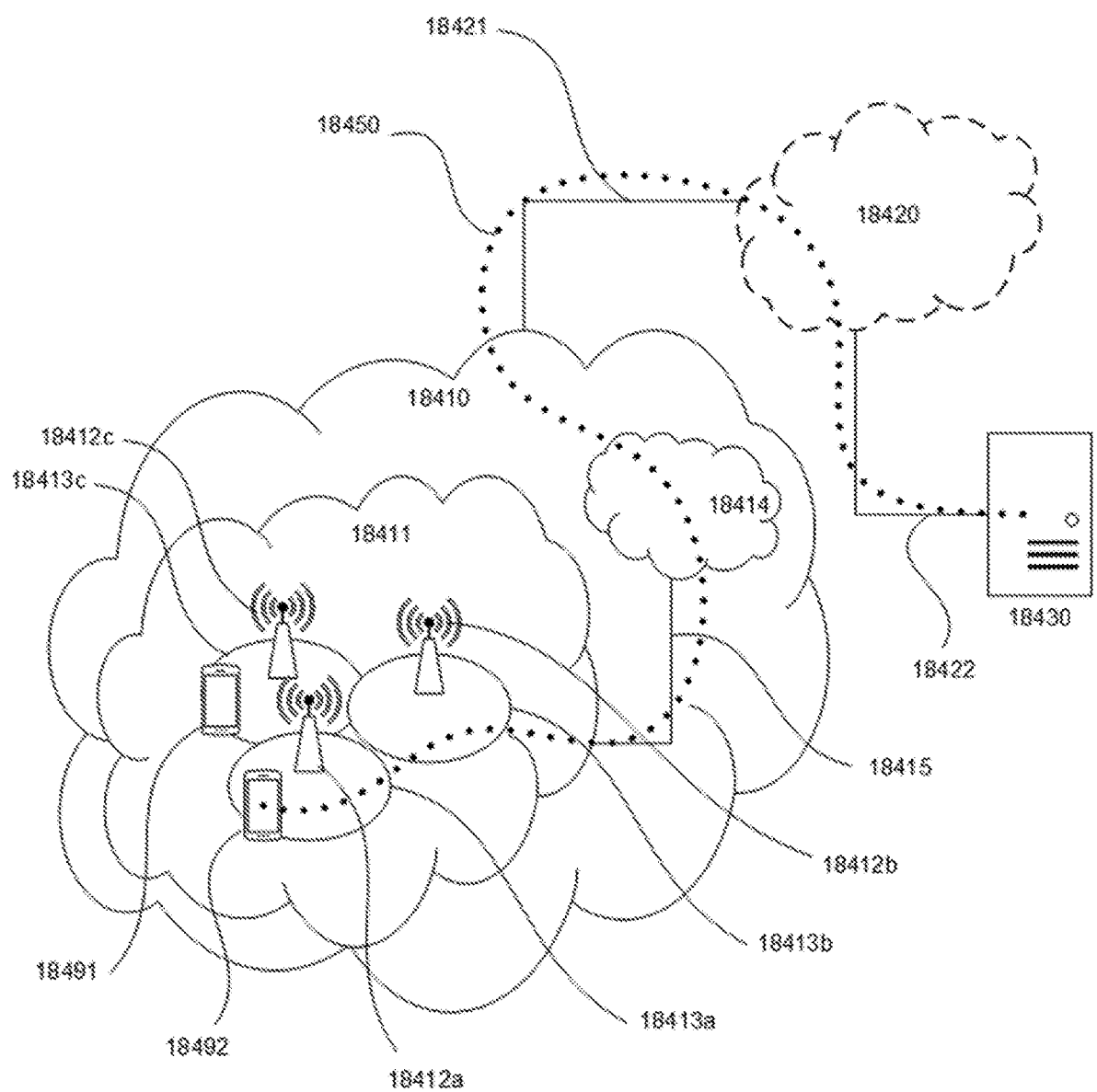
FIG. 18 illustrates a telecommunication network connected via an intermediate network to a host computer.

With reference to FIG. 18, in accordance with an embodiment, a communication system includes telecommunication network 18410, such as a 3GPP-type cellular network, which comprises access network 18411, such as a radio access network, and core network 18414. Access network 18411 comprises a plurality of base stations 18412a, 18412b, 18412c, such as NBs, eNBs, gNBs or other types of wireless access points, each defining a corresponding coverage area 18413a, 18413b, 18413c. Each base station 18412a, 18412b, 18412c is connectable to core network 18414 over a wired or wireless connection 18415. A first UE 18491 located in coverage area 18413c is configured to wirelessly connect to, or be paged by, the corresponding base station 18412c. A second UE 18492 in coverage area 18413a is wirelessly connectable to the corresponding base station 18412a. While a plurality of UEs 18491, 18492 are illustrated in this example, the disclosed embodiments are equally applicable to a situation where a sole UE is in the coverage area or where a sole UE is connecting to the corresponding base station 18412.

Telecommunication network 18410 is itself connected to host computer 18430, which may be embodied in the hardware and/or software of a standalone server, a cloud-implemented server, a distributed server or as processing resources in a server farm. Host computer 18430 may be under the ownership or control of a service provider, or may be operated by the service provider or on behalf of the service provider. Connections 18421 and 18422 between telecommunication network 18410 and host computer 18430 may extend directly from core network 18414 to host computer 18430 or may go via an optional intermediate network 18420. Intermediate network 18420 may be one of, or a combination of more than one of, a public, private or hosted network; intermediate network 18420, if any, may be a backbone network or the Internet; in particular, intermediate network 18420 may comprise two or more sub-networks (not shown).

The communication system of FIG. 18 as a whole enables connectivity between the connected UEs 18491, 18492 and host computer 18430. The connectivity may be described as an over-the-top (OTT) connection 18450. Host computer 18430 and the connected UEs 18491, 18492 are configured to communicate data and/or signaling via OTT connection 18450, using access network 18411, core network 18414, any intermediate network 18420 and possible further infrastructure (not shown) as intermediaries. OTT connection 18450 may be transparent in the sense that the participating communication devices through which OTT connection 18450 passes are unaware of routing of uplink and downlink communications. For example, base station 18412 may not or need not be informed about the past routing of an incoming downlink communication with data originating from host computer 18430 to be forwarded (e.g., handed over) to a connected UE 18491. Similarly, base station 18412 need not be aware of the future routing of an outgoing uplink communication originating from the UE 18491 towards the host computer 18430.

Example implementations, in accordance with an embodiment, of the UE, base station and host computer discussed in the preceding paragraphs will now be described with reference to FIG. 19. In communication system 19500, host computer 19510 comprises hardware 19515 including communication interface 19516 configured to set up and maintain a wired or wireless connection with an interface of a different communication device of communication system 19500. Host computer 19510 further comprises processing circuitry 19518, which may have storage and/or processing capabilities. In particular, processing circuitry 19518 may comprise one or more programmable processors, application-specific integrated circuits, field programmable gate arrays or combinations of these (not shown) adapted to execute instructions. Host computer 19510 further comprises software 19511, which is stored in or accessible by host computer 19510 and executable by processing circuitry 19518. Software 19511 includes host application 19512. Host application 19512 may be operable to provide a service to a remote user, such as UE 19530 connecting via OTT connection 19550 terminating at UE 19530 and host computer 19510. In providing the service to the remote user, host application 19512 may provide user data which is transmitted using OTT connection 19550.

Communication system 19500 further includes base station 19520 provided in a telecommunication system and comprising hardware 19525 enabling it to communicate with host computer 19510 and with UE 19530. Hardware 19525 may include communication interface 19526 for setting up and maintaining a wired or wireless connection with an interface of a different communication device of communication system 19500, as well as radio interface 19527 for setting up and maintaining at least wireless connection 19570 with UE 19530 located in a coverage area (not shown in FIG. 19) served by base station 19520. Communication interface 19526 may be configured to facilitate connection 19560 to host computer 19510. Connection 19560 may be direct or it may pass through a core network (not shown in FIG. 19) of the telecommunication system and/or through one or more intermediate networks outside the telecommunication system. In the embodiment shown, hardware 19525 of base station 19520 further includes processing circuitry 19528, which may comprise one or more programmable processors, application-specific integrated circuits, field programmable gate arrays or combinations of these (not shown) adapted to execute instructions. Base station 19520 further has software 19521 stored internally or accessible via an external connection.

Communication system 19500 further includes UE 19530 already referred to. Its hardware 19535 may include radio interface 19537 configured to set up and maintain wireless connection 19570 with a base station serving a coverage area in which UE 19530 is currently located. Hardware 19535 of UE 19530 further includes processing circuitry 19538, which may comprise one or more programmable processors, application-specific integrated circuits, field programmable gate arrays or combinations of these (not shown) adapted to execute instructions. UE 19530 further comprises software 19531, which is stored in or accessible by UE 19530 and executable by processing circuitry 19538. Software 19531 includes client application 19532. Client application 19532 may be operable to provide a service to a human or non-human user via UE 19530, with the support of host computer 19510. In host computer 19510, an executing host application 19512 may communicate with the executing client application 19532 via OTT connection 19550 terminating at UE 19530 and host computer 19510. In providing the service to the user, client application 19532 may receive request data from host application 19512 and provide user data in response to the request data. OTT connection 19550 may transfer both the request data and the user data. Client application 19532 may interact with the user to generate the user data that it provides.

Figure 19:
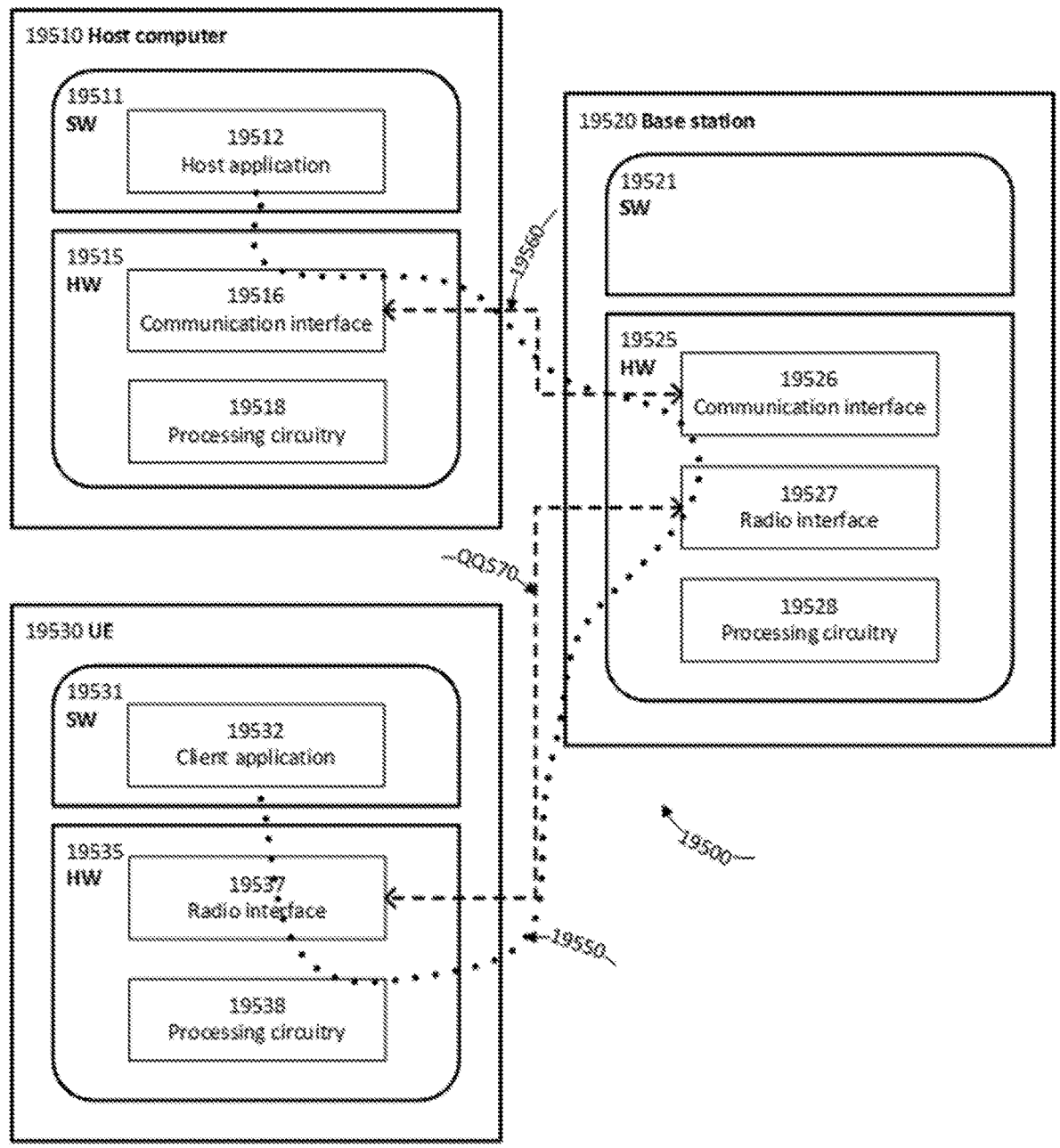
FIG. 19 illustrates a host computer communicating via a base station with a user equipment over a partially wireless connection.

It is noted that host computer 19510, base station 19520 and UE 19530 illustrated in FIG. 19 may be similar or identical to host computer 19430, one of base stations 19412*a*, 19412*b*, 19412*c* and one of UEs 19491, 19492 of FIG. 18, respectively. This is to say, the inner workings of these entities may be as shown in FIG. 19 and independently, the surrounding network topology may be that of FIG. 18.

In FIG. 19, OTT connection 19550 has been drawn abstractly to illustrate the communication between host computer 19510 and UE 19530 via base station 19520, without explicit reference to any intermediary devices and the precise routing of messages via these devices. Network infrastructure may determine the routing, which it may be configured to hide from UE 19530 or from the service provider operating host computer 19510, or both. While OTT connection 19550 is active, the network infrastructure may further take decisions by which it dynamically changes the routing (e.g., on the basis of load balancing consideration or reconfiguration of the network).

Wireless connection 19570 between UE 19530 and base station 19520 is in accordance with the teachings of the embodiments described throughout this disclosure. One or more of the various embodiments improve the performance of OTT services provided to UE 19530 using OTT connection 19550, in which wireless connection 19570 forms the last segment.

A measurement procedure may be provided for the purpose of monitoring data rate, latency and other factors on which the one or more embodiments improve. There may further be an optional network functionality for reconfiguring OTT connection 19550 between host computer 19510 and UE 19530, in response to variations in the measurement results. The measurement procedure and/or the network functionality for reconfiguring OTT connection 19550 may be implemented in software 19511 and hardware 19515 of host computer 19510 or in software 19531 and hardware 19535 of UE 19530, or both. In embodiments, sensors (not shown) may be deployed in or in association with communication devices through which OTT connection 19550 passes; the sensors may participate in the measurement procedure by supplying values of the monitored quantities exemplified above, or supplying values of other physical quantities from which software 19511, 19531 may compute or estimate the monitored quantities. The reconfiguring of OTT connection 19550 may include message format, retransmission settings, preferred routing etc.; the reconfiguring need not affect base station 19520, and it may be unknown or imperceptible to base station 19520. Such procedures and functionalities may be known and practiced in the art. In certain embodiments, measurements may involve proprietary UE signaling facilitating host computer 19510's measurements of throughput, propagation times, latency and the like. The measurements may be implemented in that software 19511 and 19531 causes messages to be transmitted, in particular empty or 'dummy' messages, using OTT connection 19550 while it monitors propagation times, errors etc.

Figure 20:
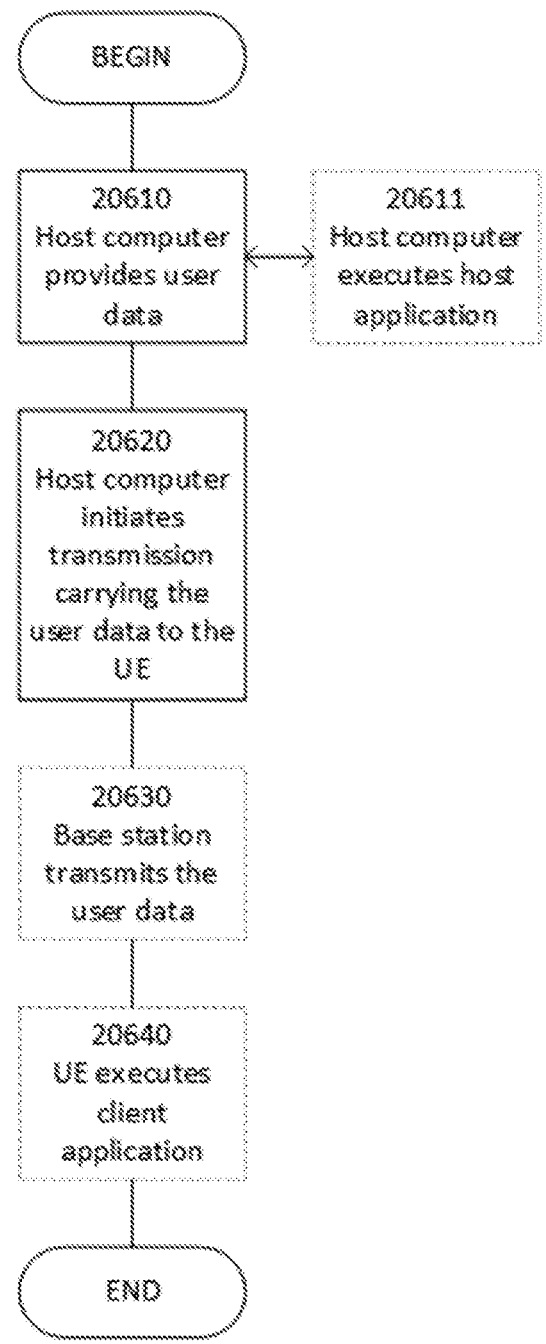
FIG. 20 is a flowchart illustrating a method implemented in a communication system.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 20610, the host computer provides user data. In substep 20611 (which may be optional) of step 20610, the host computer provides the user data by executing a host application. In step 20620, the host computer initiates a transmission carrying the user data to the UE. In step 20630 (which may be optional), the base station transmits to the UE the user data which was carried in the transmission that the host computer initiated, in accordance with the teachings of the embodiments described throughout this disclosure. In step 20640 (which may also be optional), the UE executes a client application associated with the host application executed by the host computer.

Figure 21:
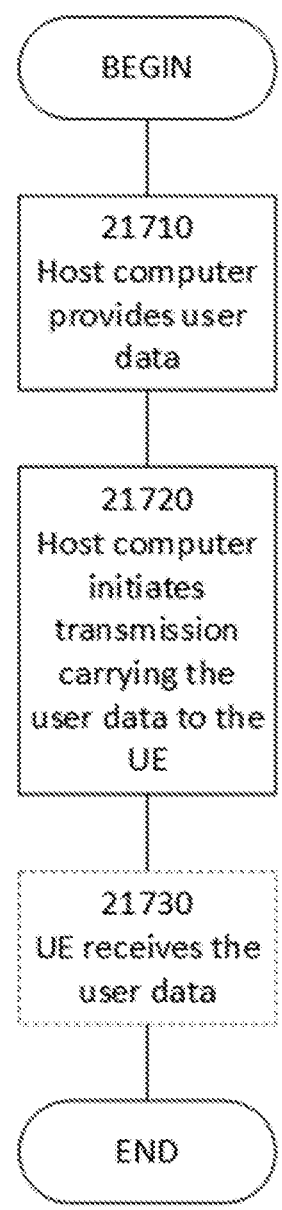
FIG. 21 is a flowchart illustrating a method implemented in a communication system.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 21710 of the method, the host computer provides user data. In an optional substep (not shown) the host computer provides the user data by executing a host application. In step 21720, the host computer initiates a transmission carrying the user data to the UE. The transmission may pass via the base station, in accordance with the teachings of the embodiments described throughout this disclosure. In step 21730 (which may be optional), the UE receives the user data carried in the transmission.

Figure 22:
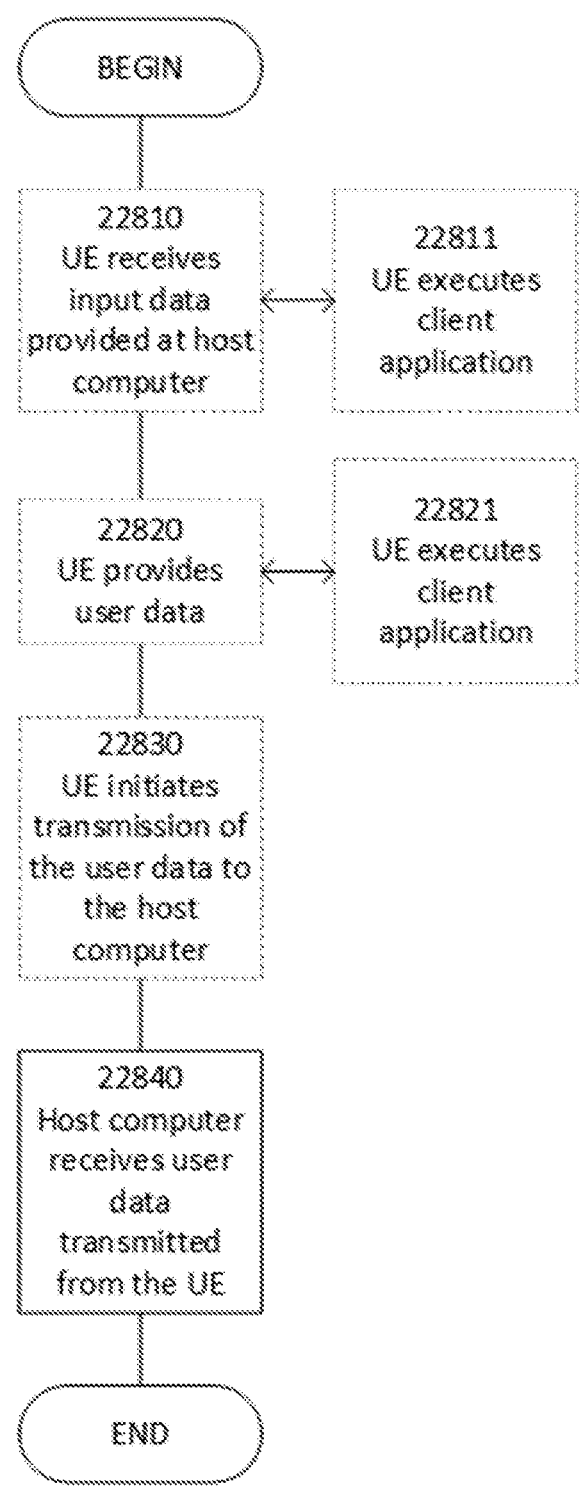
FIG. 22 is a flowchart illustrating a method implemented in a communication system.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIGURE J will be included in this section. In step 22810 (which may be optional), the UE receives input data provided by the host computer. Additionally or alternatively, in step 22820, the UE provides user data. In substep 22821 (which may be optional) of step 22820, the UE provides the user data by executing a client application. In substep 22811 (which may be optional) of step 22810, the UE executes a client application which provides the user data in reaction to the received input data provided by the host computer. In providing the user data, the executed client application may further consider user input received from the user. Regardless of the specific manner in which the user data was provided, the UE initiates, in sub step 22830 (which may be optional), transmission of the user data to the host computer. In step 22840 of the method, the host computer receives the user data transmitted from the UE, in accordance with the teachings of the embodiments described throughout this disclosure.

Figure 23:
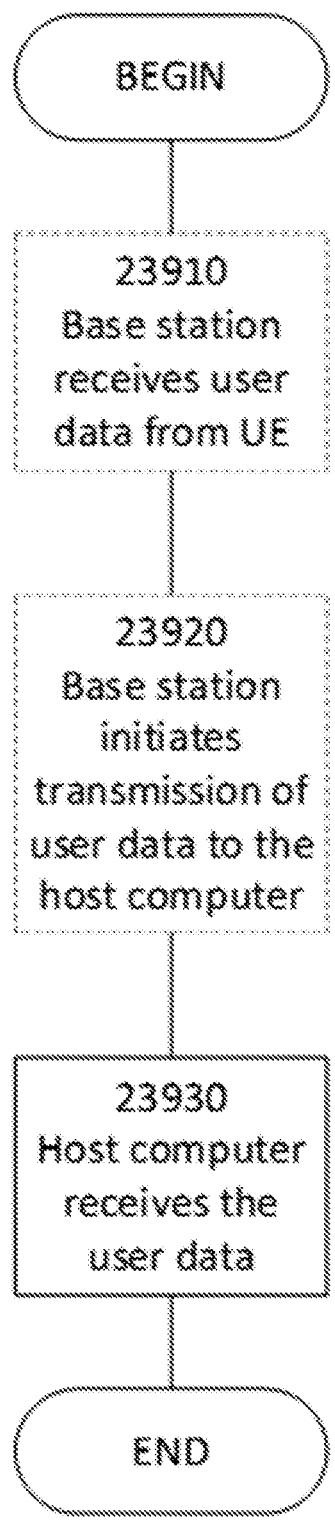
FIG. 23 is a flowchart illustrating a method implemented in a communication system.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 23910 (which may be optional), in accordance with the teachings of the embodiments described throughout this disclosure, the base station receives user data from the UE. In step 23920 (which may be optional), the base station initiates transmission of the received user data to the host computer. In step 23930 (which may be optional), the host computer receives the user data carried in the transmission initiated by the base station.

Figure 24:
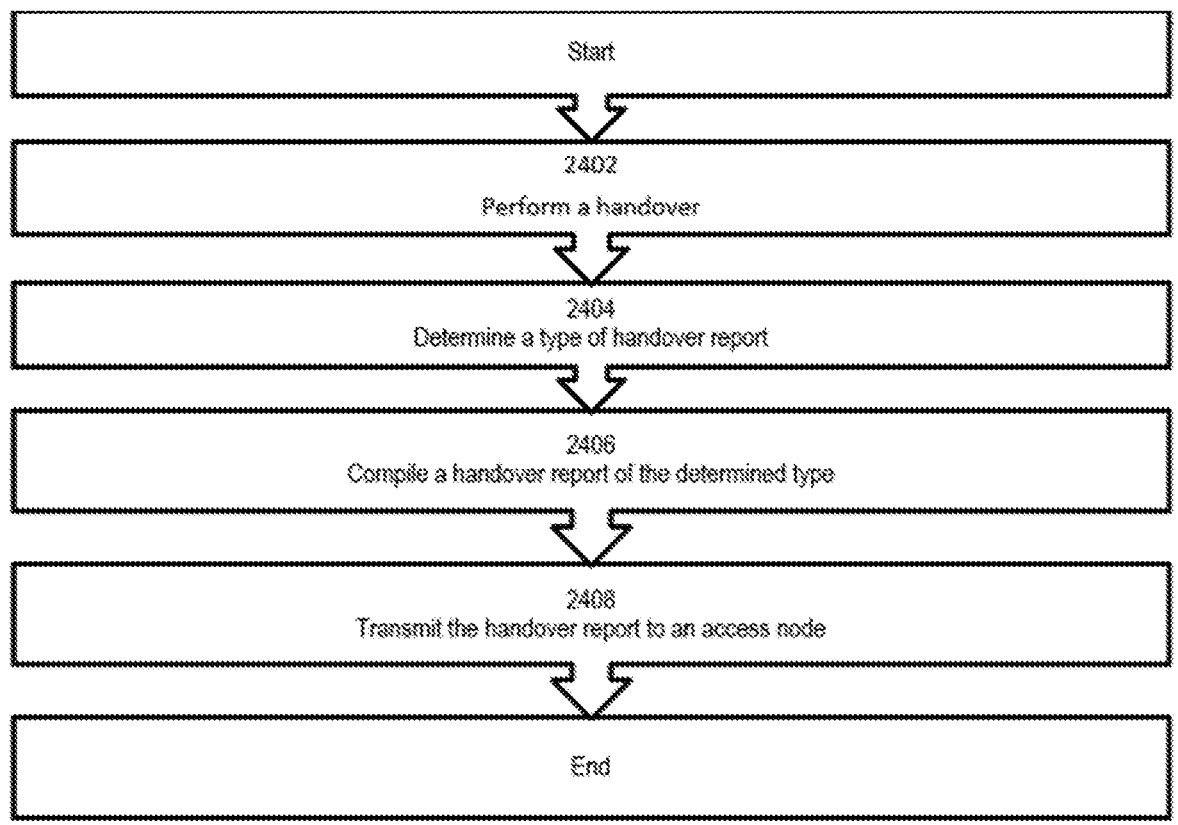
FIG. 24 depicts a method by a wireless device.

FIG. 24 depicts a method by a wireless device, according to certain embodiments. At step 2402, the wireless device performs a handover. In a particular embodiment, the handover is a DAPS handover. At step 2404, the wireless device determines a type of a handover report. At step 2406, the wireless device compiles a handover report of the determined type. At step 2408, the wireless device transmits the handover report to an access node.

Figure 25:
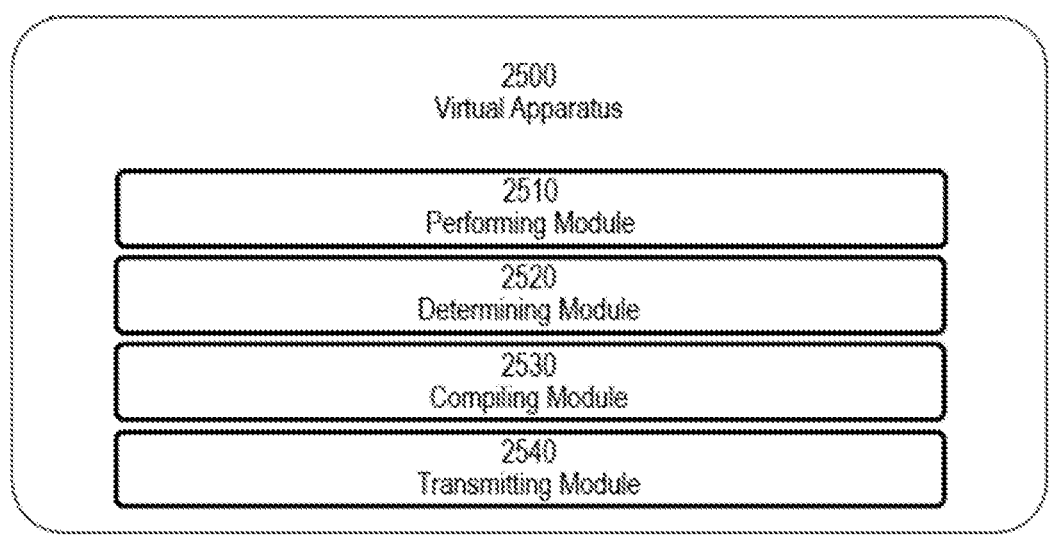
FIG. 25 illustrates a schematic block diagram of a virtual apparatus in a wireless network.

FIG. 25 illustrates a schematic block diagram of a virtual apparatus 2500 in a wireless network (for example, the wireless network shown in FIG. 13). The apparatus may be implemented in a wireless device or network node (e.g., wireless device 13110 or network node 13160 shown in FIG. 13). Apparatus 2500 is operable to carry out the example method described with reference to FIG. 24 and possibly any other processes or methods disclosed herein. It is also to be understood that the method of FIG. 24 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause performing module 2510, determining module 2520, compiling module 2530, transmitting module 2540, and any other suitable units of apparatus MOO to perform corresponding functions according one or more embodiments of the present disclosure.

According to certain embodiments, performing module 2510 may perform certain of the performing functions of the apparatus MOO. For example, performing module 2510 may perform a handover. In a particular embodiment, the handover is a DAPS handover.

According to certain embodiments, determining module 2520 may perform certain of the determining functions of the apparatus MOO. For example, determining module 2520 may determine a type of a handover report.

According to certain embodiments, compiling module 2530 may perform certain of the compiling functions of the apparatus MOO. For example, compiling module 2520 may compile a handover report of the determined type.

According to certain embodiments, transmitting module 2540 may perform certain of the transmitting functions of the apparatus MOO. For example, transmitting module 2540 may transmit the handover report to an access node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 26:
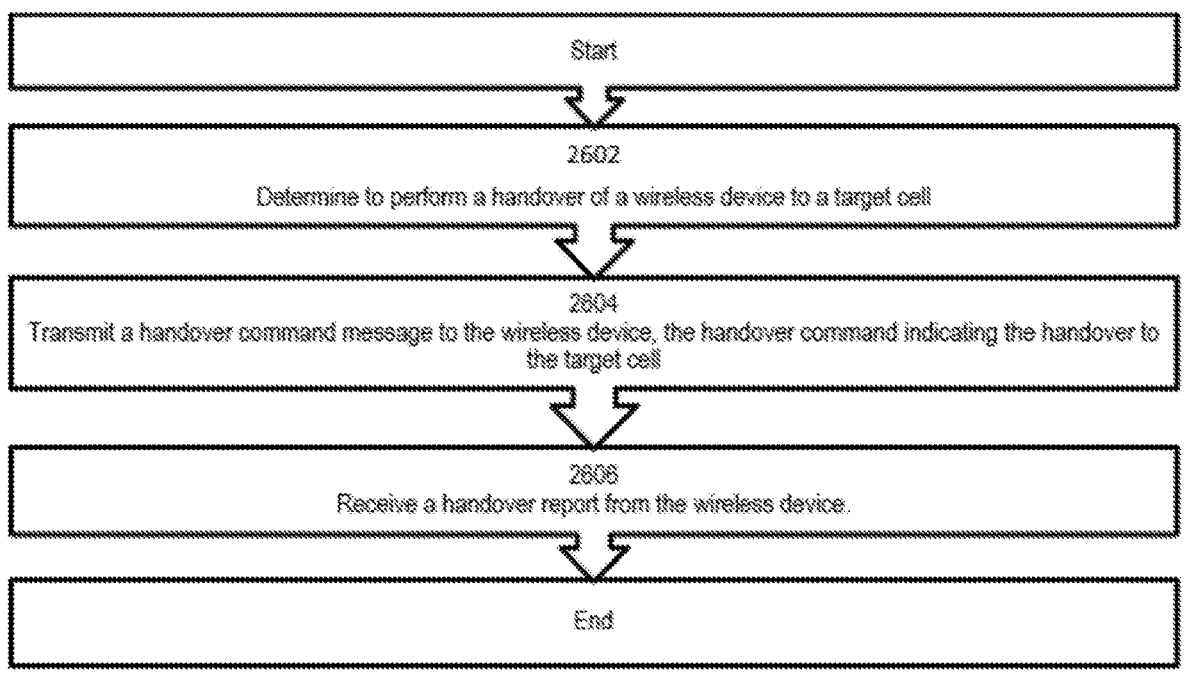
FIG. 26 depicts a method by a network node operating as a source access node.

FIG. 26 depicts a method by a network node operating as a source access node, according to certain embodiments. At step 2602, the network node determines to perform a handover of a wireless device to a target cell. In a particular embodiment, the handover is a DAPS handover. At step 2604, the network node transmits a handover command message to the wireless device, and the handover command message indicates the handover to the target cell. At step 2606, the network node receives a handover report from the wireless device.

Figure 27:
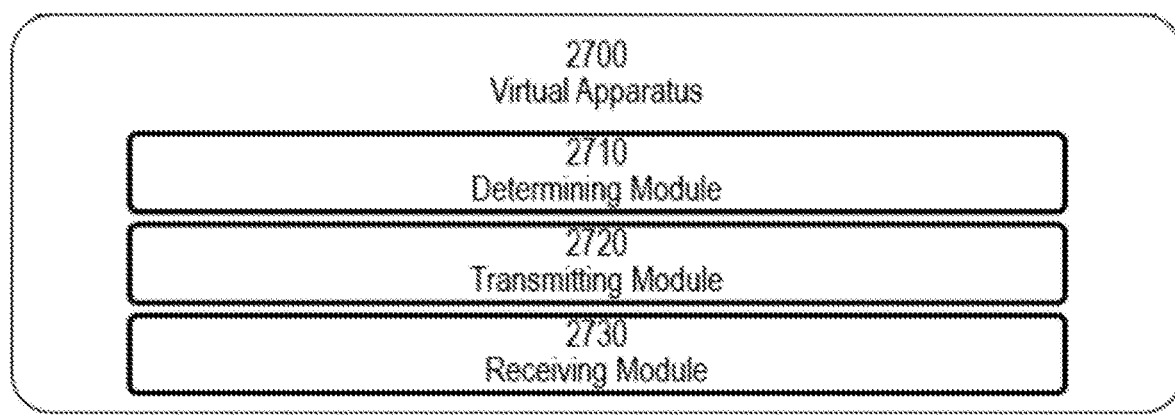
FIG. 27 illustrates a schematic block diagram of a virtual apparatus in a wireless network.

FIG. 27 illustrates a schematic block diagram of a virtual apparatus 2700 in a wireless network (for example, the wireless network shown in FIG. 13). The apparatus may be implemented in a wireless device or network node (e.g., wireless device 13110 or network node 13160 shown in FIG. 13). Apparatus 2700 is operable to carry out the example method described with reference to FIG. 26 and possibly any other processes or methods disclosed herein. It is also to be understood that the method of FIG. 26 is not necessarily carried out solely by apparatus 272700. At least some operations of the method can be performed by one or more other entities.

Virtual Apparatus 2700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 2710, transmitting module 2720, receiving module 2730, and any other suitable units of apparatus 2700 to perform corresponding functions according one or more embodiments of the present disclosure.

According to certain embodiments, determining module 2710 may perform certain of the determining functions of the apparatus 2700. For example, determining module 2710 may determine to perform a handover of a wireless device to a target cell. In a particular embodiment, the handover is a DAPS handover.

According to certain embodiments, transmitting module 2720 may perform certain of the transmitting functions of the apparatus 2700. For example, transmitting module 2720 may transmit a handover command message to the wireless device, and the handover command message indicates the handover to the target cell.

According to certain embodiments, receiving module 2730 may perform certain of the receiving functions of the apparatus 2700. For example, receiving module 2730 may receive a handover report from the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 28:
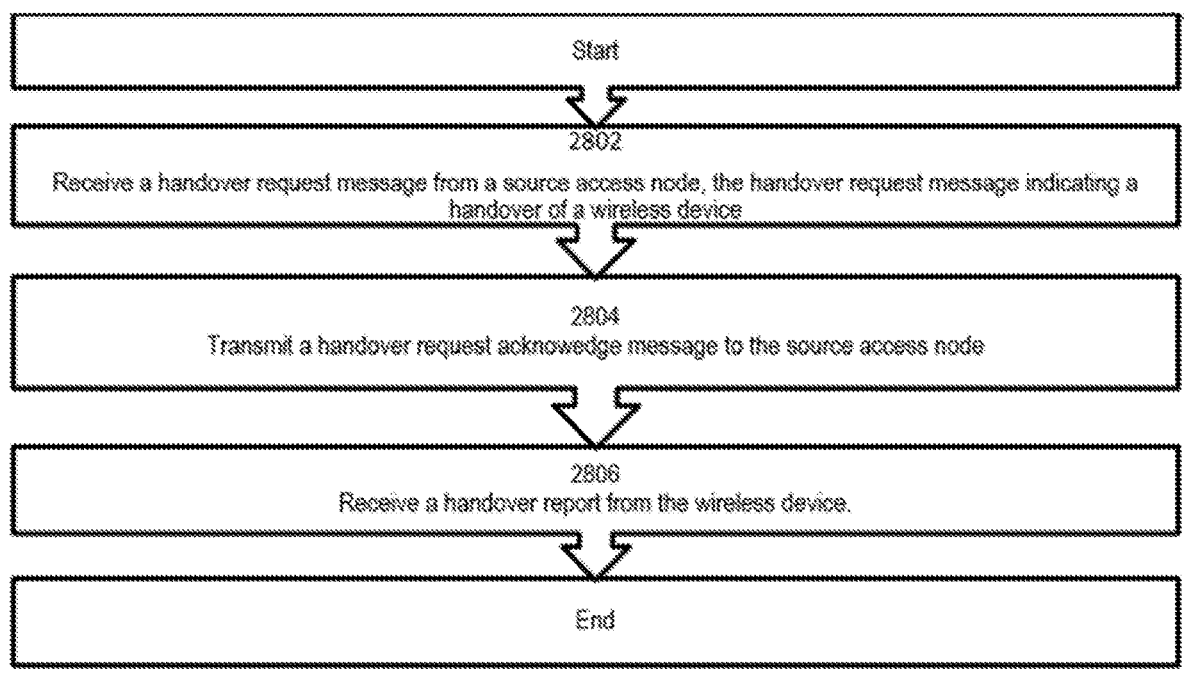
FIG. 28 depicts a method by a network node operating as a target access node.

FIG. 28 depicts a method by a network node operating as a target access node, according to certain embodiments. At step 2802, the network node receives a handover request message from a source access node. The handover request message indicates a handover of a wireless device. In a particular embodiment, the handover is a DAPS handover. At step 2804, the network node transmits a handover request acknowledge message to the source access node. At step 2806, the network node receives a handover report from the wireless device.

Figure 29:
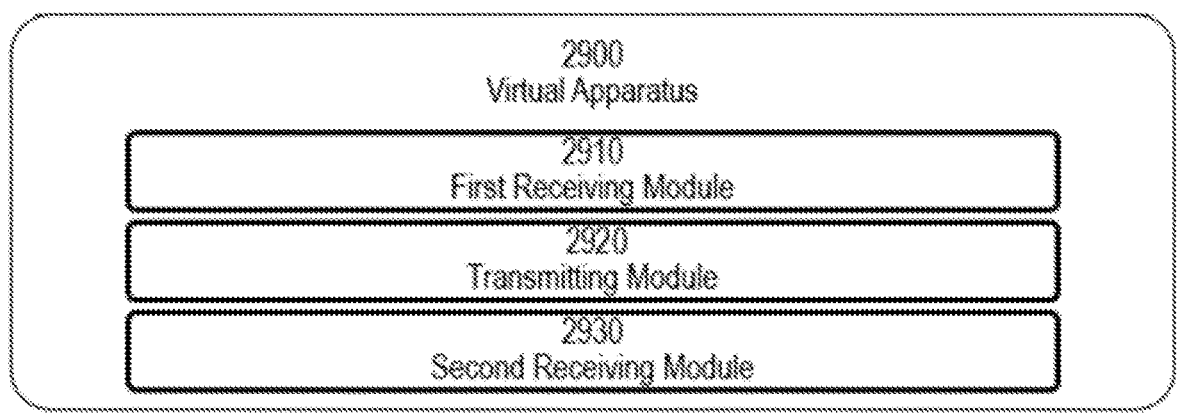
FIG. 29 illustrates a schematic block diagram of a virtual apparatus in a wireless network.

FIG. 29 illustrates a schematic block diagram of a virtual apparatus 2900 in a wireless network (for example, the wireless network shown in FIG. 13). The apparatus may be implemented in a wireless device or network node (e.g., wireless device 13110 or network node 13160 shown in FIG. 13). Apparatus 2900 is operable to carry out the example method described with reference to FIG. 28 and possibly any other processes or methods disclosed herein. It is also to be understood that the method of FIG. 28 is not necessarily carried out solely by apparatus 2900. At least some operations of the method can be performed by one or more other entities.

Virtual Apparatus 2900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 2910, transmitting module 2920, second receiving module R30, and any other suitable units of apparatus 2700 to perform corresponding functions according one or more embodiments of the present disclosure.

According to certain embodiments, first receiving module 2910 may perform certain of the receiving functions of the apparatus 2900. For example, first receiving module 2910 may receive a handover request message from a source access node. The handover request message indicates a handover of a wireless device. In a particular embodiment, the handover is a DAPS handover.

According to certain embodiments, transmitting module 2920 may perform certain of the transmitting functions of the apparatus 2900. For example, transmitting module 2920 may transmit a handover request acknowledge message to the source access node.

According to certain embodiments, second receiving module 2930 may perform certain of the receiving functions of the apparatus 2900. For example, second receiving module 2930 may receive a handover report from the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 30:
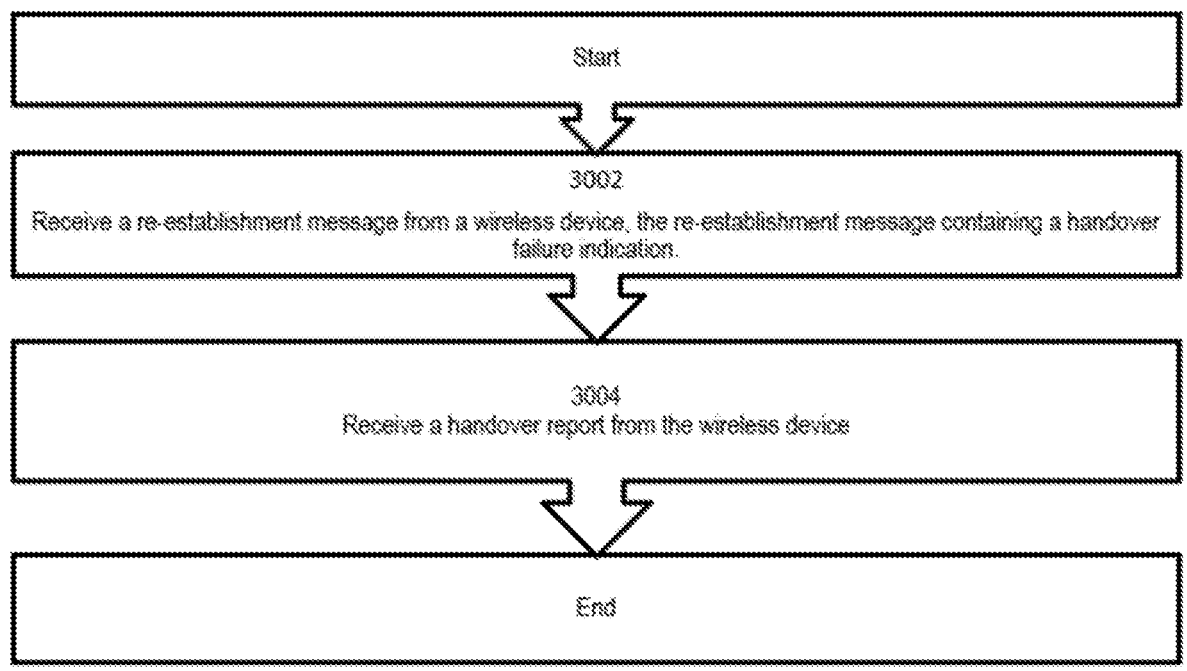
FIG. 30 depicts a method by a network node operating as an access node.

FIG. 30 depicts a method by a network node operating as an access node, according to certain embodiments. At step 3002, the network node receives a re-establishment message from a wireless device. the re-establishment message containing a handover failure indication. At step 3004, the network node receives a handover report from the wireless device. In a particular embodiment, the handover report is associated with a DAPS handover.

Figure 31:
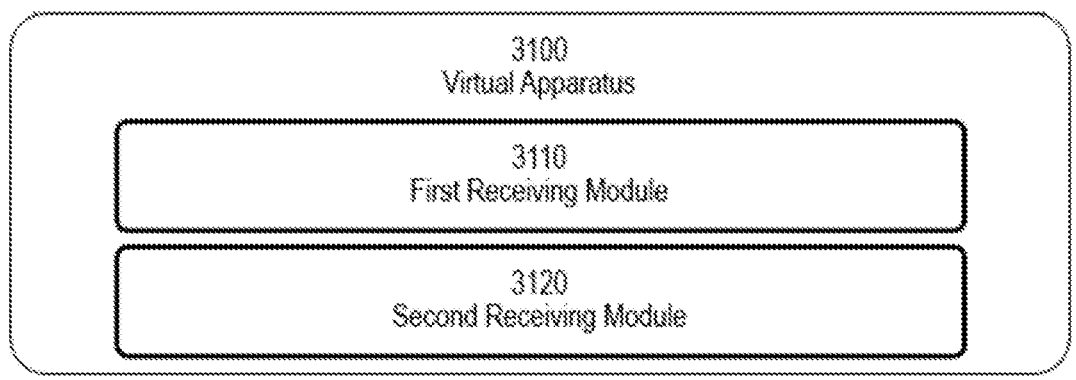
FIG. 31 illustrates a schematic block diagram of a virtual apparatus in a wireless network.

FIG. 31 illustrates a schematic block diagram of a virtual apparatus 3100 in a wireless network (for example, the wireless network shown in FIG. 13). The apparatus may be implemented in a wireless device or network node (e.g., wireless device 13110 or network node 13160 shown in FIG. 13). Apparatus 3100 is operable to carry out the example method described with reference to FIG. 30 and possibly any other processes or methods disclosed herein. It is also to be understood that the method of FIG. 30 is not necessarily carried out solely by apparatus 3100. At least some operations of the method can be performed by one or more other entities. Virtual Apparatus 3100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 3110, second receiving module 3120, and any other suitable units of apparatus 3100 to perform corresponding functions according one or more embodiments of the present disclosure.

According to certain embodiments, first receiving module 3110 may perform certain of the receiving functions of the apparatus 3100. For example, first receiving module 3110 may receive a re-establishment message from a wireless device. the re-establishment message containing a handover failure indication.

According to certain embodiments, second receiving module 3120 may perform certain of the receiving functions of the apparatus 3100. For example, second receiving module 3120 may receive a handover report from the wireless device. In a particular embodiment, the handover report is associated with a DAPS handover.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Embodiments

1. A method performed by a wireless device, the method comprising:
   performing a handover;
   determining a type of a handover report;
   compiling a handover report of the determined type; and
   transmitting the handover report to an access node.
2A. The method of any one of Embodiment 1, wherein the handover is a dual active protocol stack (DAPS) handover.
2B. The method of any one of Embodiments 1 or 2A, wherein the handover report is transmitted after a handover failure condition is triggered.
2C. The method of any one of Embodiments 1 and 2A to 2B wherein the access node comprises a source access node associated with a source cell, and the method further comprises performing a fallback to a source cell.
2D. The method of any one of Embodiments 1 and 2A to 2C, wherein the type of the handover report is determined based on whether at least one failure condition is fulfilled during and/or after the handover.
3. The method of Embodiment 2D, wherein the at least one failure condition comprises:
   at least one of a handover failure,
   a fallback to a source cell,
   a source radio link failure determined based on radio link monitoring, and
   a retransmission problem toward the source access node in a RLC layer.
4. The method of any one of Embodiments 2D to 3, wherein the type of the handover report is a failed handover report if at least one failure condition is fulfilled.
5. The method of Embodiment 4, wherein the handover report includes information indicating the at least one failure condition or a type of failure associated with the handover.
6. The method of any one of Embodiments 2D to 3, wherein the type of the handover report is a successful handover report when no failure condition is fulfilled.
7. The method of Embodiment 6, wherein the successful handover report indicates a failed radio link of a source cell after a switching of an uplink data transmission towards a target cell.
8. The method of any one of Embodiments 1 to 7, wherein compiling the handover report of the determined type comprises determining information to be included in the handover report.
9. The method of Embodiments 8, wherein the information includes whether there was a failure of the source radio link during the handover and/or when the failure occurred during the handover.
10. The method of Embodiment 8, wherein the information comprises at least one of:
   a RSRP of a source cell,
   a RSRQ of the source cell,
   a SINR of the source cell,
   a RSRP of a target cell and/or at least one neighboring cell,
   a RSRQ of the target cell and/or the at least one neighboring cell,
   a SINR of the target cell and/or the at least one neighboring cell,
   a reason for a failure of a radio link towards the source cell,
   an indication of whether a radio link monitoring timer or a counter were triggered during the handover, an indication of whether the RLC retransmission counter is greater than zero,
an indication of a failed RACH towards the target cell,
an indication of whether a beam through which the wireless device accesses a target access node is a most optimal beam at a time of performing RACH,
an indication of beams used for RACH access, and
an indication of a beam quality measurement of beams used for RACH.

11. The method of any one of Embodiments 1 to 10, further comprising storing the handover report.

12. The method of any one of Embodiments 1 to 11, wherein transmitting the handover report to the access node comprises transmitting the handover report to the access node in a handover complete message.

13. The method of any one of Embodiments 1 to 11, wherein transmitting the handover report to the access node comprises:
transmitting a handover complete message that comprises an indication that the handover report is available;
receiving a request from the access node for the handover report; and
transmitting the handover report to the access node in response to receiving the request.

14. The method of any one of Embodiments 1 to 13, wherein transmitting the handover report to the access node comprises transmitting the handover report to at least one of a source access node, a target access node, or another access node such as a third access node.

15. The method of any one of Embodiments 1 to 14, further comprising receiving a handover command message from a source access node, the handover command comprising an instruction to perform the handover to a target cell.

16. The method of Embodiment 15, further comprising starting a timer, tuning to a frequency associated with the target cell, and establishing dual active protocol stack (DAPS) for a source cell associated with the source access node and the target cell associated with a target access node.

17. The method of any one of Embodiments 1 to 16, further comprising determining that there is a handover failure condition.

18. The method of Embodiment 17, wherein determining that there is a handover failure condition comprises determining that a timer has expired before a handover complete message is transmitted to a target access node.

19. The method of any one of Embodiments 17 to 18, further comprising determining based on at least one criterion to fallback to a source cell.

20. The method of Embodiment 19, wherein the at least one criterion is associated with an availability of a source radio link.

21. The method of any one of Embodiments 1 to 20, further comprising performing a fallback to a source cell, and wherein the handover report is included in a fallback indication message.

22. The method of any one of Embodiments 1 to 20, further comprising:
performing a fallback to a source cell,
transmitting a fallback indication message comprising an indication that the handover report is available,
receiving a request for the handover report, and
transmitting the handover report in response to receiving the request.

23. The method of any one of Embodiments 1 to 20, further comprising:
determining that a handover failure has occurred,
determining that fallback to the source cell is not to be performed,
performing cell selection and initiating a re-establishment procedure in a selected cell, and
transmitting the handover report to a third access node associated with the selected cell.

24. The method of any one of Embodiments 1 to 23, wherein the wireless device is a user equipment.

25. A computer program comprising instructions which when executed on a computer perform any of the methods of embodiments 1 to 24.

26. A computer program product comprising computer program, the computer program comprising instructions which when executed on a computer perform any of the methods of embodiments 1 to 243.

27. A non-transitory computer readable medium storing instructions which when executed by a computer perform any of the methods of embodiments 1 to 24.

Group B1 Embodiments

27. A method performed by a network node operating as a source access node, the method comprising:
determining to perform a handover of a wireless device to a target cell,
transmitting a handover command message to the wireless device, the handover command message indicating the handover to the target cell, and
receiving a handover report from the wireless device.

28A. The method of Embodiment 27, wherein the handover comprises a dual active protocol stack (DAPS) handover.

28B. The method of any one of Embodiments 27 to 28A, further comprising performing at least one of:
optimization of at least one allocated resource for a subsequent handover based on the handover report; and
tuning a handover triggering parameter.

28C. The method of any one of Embodiments 27, 28A, and 28B, wherein determining to perform the handover is based on at least one measurement report received from the wireless device.

29. The method of any one of Embodiments 27 and 28A to 28C, further comprising preparing a target access node associated with the target cell to perform the handover.

30. The method of Embodiment 29, wherein preparing the target access node comprises:
transmitting a handover request message to the target access node;
receiving a response message from the target access node, the response message including a handover command to be included in the handover command message transmitted to the wireless device.

31. The method of any one of Embodiments 27 to 30, further comprising:
receiving a handover fallback indication from the wireless device, the handover fallback indication including an indication of an availability of the handover report; and
transmitting a request for the handover report from the wireless device.

32. The method of Embodiment 31, wherein the request for the handover report is included in a UEInformationRequest, and wherein the handover report is received in a radio resource control message from the wireless device.
33. The method of any one of Embodiments 27 to 32, wherein the handover report indicates whether at least one failure condition was fulfilled during and/or after the handover.
34. The method of Embodiment 33, wherein the at least one failure condition comprises:
at least one of a handover failure,
a fallback to a source cell,
a source radio link failure determined based on radio link monitoring, and
a retransmission problem toward the source access node in a RLC layer.
35. The method of any one of Embodiments 33 to 34, wherein the handover report is a failed handover report when at least one failure condition is fulfilled.
36. The method of Embodiment 35, wherein the handover report includes information indicating the at least one failure condition or a type of failure associated with the handover.
37. The method of any one of Embodiments 33 to 34, wherein the handover report is a successful handover report when no failure condition is fulfilled.
38. The method of Embodiment 37, wherein the successful handover report indicates a failed radio link of a source cell after a switching of an uplink data transmission towards a target cell.
39. The method of any one of Embodiments 27 to 38, wherein the handover report comprises information indicating whether there was a failure of the source radio link during the handover and/or when a failure occurred during the handover.
40. The method of any one Embodiments 27 to 39, wherein the handover report comprises at least one of:
a RSRP of a source cell,
a RSRQ of the source cell,
a SINK of the source cell,
a RSRP of a target cell and/or at least one neighboring cell,
a RSRQ of the target cell and/or the at least one neighboring cell,
a SINR of the target cell and/or the at least one neighboring cell,
a reason for a failure of a radio link towards the source cell,
an indication of whether a radio link monitoring timer or a counter were triggered during the handover,
an indication of whether the RLC retransmission counter is greater than zero,
an indication of a failed RACH towards the target cell,
an indication of whether a beam through which the wireless device accesses a target access node is a most optimal beam at a time of performing RACH,
an indication of beams used for RACH access, and
an indication of a beam quality measurement of beams used for RACH.
41. The method of any one of Embodiments 27 to 40, wherein the handover report is received from the wireless device in a handover complete message.
42. A computer program comprising instructions which when executed on a computer perform any of the methods of embodiments 27 to 41.
43. A computer program product comprising computer program, the computer program comprising instructions which when executed on a computer perform any of the methods of embodiments 27 to 41.
44. A non-transitory computer readable medium storing instructions which when executed by a computer perform any of the methods of embodiments 27 to 41.

Group B2 Embodiments

45. A method performed by a network node operating as a target access node, the method comprising:
receiving a handover request message from a source access node, the handover request message indicating a handover of a wireless device;
transmitting a handover request acknowledge message to the source access node;
receiving a handover report from the wireless device.
46A. The method of Embodiment 45, wherein the handover comprises a dual active protocol stack (DAPS) handover.
46B. The method of any one of Embodiments 45 to 46A, further comprising preparing a target cell configuration for the target cell associated with the target access node.
47. The method of any one of Embodiments 45 and to 46A to 46B, further comprising performing an admission control procedure and determining, based on the admission control procedure, to accept the handover request.
48. The method of any one of Embodiments 45 to 47, wherein receiving the handover report from the wireless device comprises:
receiving a handover complete message from the wireless device, the handover complete message indicating an availability of a handover report, and
transmitting a request to fetch the handover report from the wireless device.
49. The method of any one of Embodiments 45 to 48, further comprising performing at least one of:
optimization of at least one allocated resource for a subsequent handover based on the handover report; and
tuning a handover triggering parameter.
50. The method of any one of Embodiments 45 to 49, further comprising transmitting the handover report to the source access node.
51. The method of any one of Embodiments 45 to 51, wherein the handover request acknowledge message includes a handover command to be included in a handover command message transmitted to the wireless device by the source access node.
52. The method of any one of Embodiments 45 to 51, further comprising:
receiving a handover fallback indication of the wireless device, the handover fallback indication including an indication of an availability of the handover report; and
transmitting a request for the handover report from the wireless device.
53. The method of Embodiment 52, wherein the request for the handover report is included in a UEInformationRequest, and wherein the handover report is received in a radio resource control message from the wireless device.
54. The method of any one of Embodiments 45 to 53, wherein the handover report indicates whether at least one failure condition was fulfilled during and/or after the handover.

55. The method of Embodiment 54, wherein the at least one failure condition comprises:
at least one of a handover failure,
a fallback to a source cell,
a source radio link failure determined based on radio link monitoring, and
a retransmission problem toward the source access node in a RLC layer.
56. The method of any one of Embodiments 54 to 55, wherein the handover report is a failed handover report when at least one failure condition is fulfilled.
57. The method of Embodiment 56, wherein the handover report includes information indicating the at least one failure condition or a type of failure associated with the handover.
58. The method of any one of Embodiments 54 to 55, wherein the handover report is a successful handover report when no failure condition is fulfilled.
59. The method of Embodiment 58, wherein the successful handover report indicates a failed radio link of a source cell after a switching of an uplink data transmission towards a target cell.
60. The method of any one of Embodiments 45 to 59, wherein the handover report comprises information indicating whether there was a failure of the source radio link during the handover and/or when a failure occurred during the handover.
61. The method of any one Embodiments 45 to 60, wherein the handover report comprises at least one of:
a RSRP of a source cell,
a RSRQ of the source cell,
a SINR of the source cell,
a RSRP of a target cell and/or at least one neighboring cell,
a RSRQ of the target cell and/or the at least one neighboring cell,
a SINR of the target cell and/or the at least one neighboring cell,
a reason for a failure of a radio link towards the source cell,
an indication of whether a radio link monitoring timer or a counter were triggered during the handover,
an indication of whether the RLC retransmission counter is greater than zero,
an indication of a failed RACH towards the target cell,
an indication of whether a beam through which the wireless device accesses a target access node is a most optimal beam at a time of performing RACH,
an indication of beams used for RACH access, and
an indication of a beam quality measurement of beams used for RACH.
62. The method of any one of Embodiments 45 to 61, wherein the handover report is received from the wireless device in a handover complete message.
63. A computer program comprising instructions which when executed on a computer perform any of the methods of embodiments 45 to 62.
64. A computer program product comprising computer program, the computer program comprising instructions which when executed on a computer perform any of the methods of embodiments 45 to 62.
65. A non-transitory computer readable medium storing instructions which when executed by a computer perform any of the methods of embodiments 45 to 62.

Group B3 Embodiments

66. A method performed by a network node operating as an access node, the method comprising:
receiving a re-establishment message from a wireless device, the re-establishment message containing a handover failure indication; and
receiving a handover report from the wireless device.
67A. The method of Embodiment 66, wherein the handover failure indication is associated with a dual active protocol stack (DAPS) handover.
67B. The method of any one of Embodiments 66 to 67A, wherein the re-establishment message further comprises an indication of an availability of the handover report, the method further comprising transmitting a request for the handover report from the wireless device.
68. The method of Embodiment 67B, wherein the request for the handover report is included in a UEInformationRequest, and wherein the handover report is received in a radio resource control message from the wireless device.
69. The method of any one of Embodiments 66 to 68, wherein the handover report comprises a radio link failure indication.
70. The method of any one of Embodiments 66 to 69, wherein the handover report indicates a failed dual active protocol stack (DAPS) handover.
71. The method of any one of Embodiments 66 to 70, further comprising transmitting the handover report to at least one of a source access node associated with a source cell for the handover or a target access node associated with a target cell for the handover.
72. The method of any one of Embodiments 66 to 71, further comprising performing at least one of:
optimization of at least one allocated resource for a subsequent handover based on the handover report; and
tuning a handover triggering parameter.
73. The method of any one of Embodiments 66 to 72, wherein the handover report indicates whether at least one failure condition was fulfilled during and/or after the handover.
74. The method of Embodiment 73, wherein the at least one failure condition comprises:
at least one of a handover failure,
a fallback to a source cell,
a source radio link failure determined based on radio link monitoring, and
a retransmission problem toward the source access node in a RLC layer.
75. The method of any one of Embodiments 73 to 74, wherein the handover report is a failed handover report when at least one failure condition is fulfilled.
76. The method of Embodiment 75, wherein the handover report includes information indicating the at least one failure condition or a type of failure associated with the handover.
77. The method of any one of Embodiments 74 to 74, wherein the handover report is a successful handover report when no failure condition is fulfilled.
78. The method of Embodiment 77, wherein the successful handover report indicates a failed radio link of a source cell after a switching of an uplink data transmission towards a target cell.
79. The method of any one of Embodiments 66 to 78, wherein the handover report comprises information indicating whether there was a failure of the source radio link during the handover and/or when a failure occurred during the handover.

80. The method of any one Embodiments 66 to 79, wherein the handover report comprises at least one of:
a RSRP of a source cell,
a RSRQ of the source cell,
a SINR of the source cell,
a RSRP of a target cell and/or at least one neighboring cell,
a RSRQ of the target cell and/or the at least one neighboring cell,
a SINR of the target cell and/or the at least one neighboring cell,
a reason for a failure of a radio link towards the source cell,
an indication of whether a radio link monitoring timer or a counter were triggered during the handover,
an indication of whether the RLC retransmission counter is greater than zero,
an indication of a failed RACH towards the target cell,
an indication of whether a beam through which the wireless device accesses a target access node is a most optimal beam at a time of performing RACH,
an indication of beams used for RACH access, and
an indication of a beam quality measurement of beams used for RACH.

81. A computer program comprising instructions which when executed on a computer perform any of the methods of embodiments 66 to 80.

82. A computer program product comprising computer program, the computer program comprising instructions which when executed on a computer perform any of the methods of embodiments 66 to 80.

83. A non-transitory computer readable medium storing instructions which when executed by a computer perform any of the methods of embodiments 66 to 80.

Group C Embodiments

84. A wireless device for improving network efficiency, the wireless device comprising:
processing circuitry configured to perform any of the steps of any of the Group A embodiments; and
power supply circuitry configured to supply power to the wireless device.

85. A base station for improving network efficiency, the base station comprising:
processing circuitry configured to perform any of the steps of any of the Group B1, B2, and B3 embodiments;
power supply circuitry configured to supply power to the wireless device.

86. A user equipment (UE) for improving network efficiency, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

87. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B1, B2, and B3 embodiments.

88. The communication system of the pervious embodiment further including the base station.

89. The communication system of the previous 2 embodiments, further including the UE, wherein the UE is configured to communicate with the base station.

90. The communication system of the previous 3 embodiments, wherein:
the processing circuitry of the host computer is configured to execute a host application, thereby providing the user data; and
the UE comprises processing circuitry configured to execute a client application associated with the host application.

91. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B1, B2, and B3 embodiments.

92. The method of the previous embodiment, further comprising, at the base station, transmitting the user data.

93. The method of the previous 2 embodiments, wherein the user data is provided at the host computer by executing a host application, the method further comprising, at the UE, executing a client application associated with the host application.

94. A user equipment (UE) configured to communicate with a base station, the UE comprising a radio interface and processing circuitry configured to performs the of the previous 3 embodiments.

95. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

96. The communication system of the previous embodiment, wherein the cellular network further includes a base station configured to communicate with the UE.

97. The communication system of the previous 2 embodiments, wherein:
the processing circuitry of the host computer is configured to execute a host application, thereby providing the user data; and the UE's processing circuitry is configured to execute a client application associated with the host application.

98. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

99. The method of the previous embodiment, further comprising at the UE, receiving the user data from the base station.

100. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

101. The communication system of the previous embodiment, further including the UE.

102. The communication system of the previous 2 embodiments, further including the base station, wherein the base station comprises a radio interface configured to communicate with the UE and a communication interface configured to forward to the host computer the user data carried by a transmission from the UE to the base station.

103. The communication system of the previous 3 embodiments, wherein:
the processing circuitry of the host computer is configured to execute a host application; and
the UE's processing circuitry is configured to execute a client application associated with the host application, thereby providing the user data.

104. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

105. A method implemented in a communication system including a host computer, a base station and a user equipment (UE), the method comprising:
at the host computer, receiving user data transmitted to the base station from the UE, wherein the UE performs any of the steps of any of the Group A embodiments.

106. The method of the previous embodiment, further comprising, at the UE, providing the user data to the base station.

107. The method of the previous 2 embodiments, further comprising:
at the UE, executing a client application, thereby providing the user data to be transmitted; and
at the host computer, executing a host application associated with the client application.

108. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

109. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B1, B2, and B3 embodiments.

110. The communication system of the previous embodiment further including the base station.

111. The communication system of the previous 2 embodiments, further including the UE, wherein the UE is configured to communicate with the base station.

112. The communication system of the previous 3 embodiments, wherein:
the processing circuitry of the host computer is configured to execute a host application;
the UE is configured to execute a client application associated with the host application, thereby providing the user data to be received by the host computer.

113. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

114. The method of the previous embodiment, further comprising at the base station, receiving the user data from the UE.

115. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GS 5G System
5GC 5G Core network
5QI 5G QoS Identifier
ABS Almost Blank Subframe
AN Access Network
AN Access Node
AMF Access and Mobility Management Function
ARQ Automatic Repeat Request
AS Access Stratum
AWGN Additive White Gaussian Noise
BCCH Broadcast Control Channel
BCH Broadcast Channel
CA Carrier Aggregation
CC Carrier Component
CCCH SDU Common Control Channel SDU CDMA Code Division Multiplexing Access
CGI Cell Global Identifier
CHO Conditional Handover
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CU Central Unit
DAPS Dual Active Protocol Stack
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DU Distributed Unit
DUT Device Under Test
E-CID Enhanced Cell-ID (positioning method)
eICIC Enhanced Inter-Cell Interference Coordination
E-SMLC Evolved-Serving Mobile Location Centre
ECGI Evolved CGI
eMBB Enhanced Mobile BroadBand
eNB E-UTRAN NodeB (Evolved NodeB)
ePDCCH enhanced Physical Downlink Control Channel
EPC Evolved Packet core network
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC; 5G NodeB)
GNSS Global Navigation Satellite System
GSM Global System for Mobile communication
HARQ Hybrid Automatic Repeat Request
HO Handover
HSPA High Speed Packet Access
HRPD High Rate Packet Data
ICIC Inter-Cell Interference Coordination
LOS Line of Sight
LPP LTE Positioning Protocol
LTE Long-Term Evolution
MAC Medium Access Control
MBB Make-Before-Break
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MRO Mobility Robustness Optimization
MSC Mobile Switching Center
NCC Next Hop Chaining Counter
NG The interference/reference point between the RAN and the CN in 5G/NR
NG-C The control plane part of NG (between a gNB and an AMF)
NGC Next Generation Core
NGMN Next Generation Mobile Networks
NG-U The user plane part of NG (between a gNB and a UPF)
NG-RAN Next Generation Radio Access Network
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Packet Data Unit
PGW Packet Gateway
PHICH Physical Hybrid-ARQ Indicator Channel
PHY Physical layer
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
QoS Quality of Service
RA Random Access
RACH Random Access Channel
RAB Radio Access Bearer
RAN Radio Access Network
RANAP Radio Access Network Application Part
RAR Random Access Response
RAT Radio Access Technology
RLC Radio Link Control
RLM Radio Link Management
RNC Radio Network Controller
RNTI Radio Network Temporary Identifier
ROHC Robust Header Compression
RRC Radio Resource Control
RRM Radio Resource Management
Rx Receive
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RUDI Reduction in User Data Interruption
RWR Release with Redirect
S1 The interface/reference point between the RAN and the CN in LTE
S1-C The control plane part of S1 (between an eNB and a MME).

S1-U The user plane part of S1 (between an eNB and a SGW).
SCH Synchronization Channel
SCell Secondary Cell
SCS Subcarrier Spacing
SDU Service Data Unit
SFN System Frame Number
SGW Serving Gateway
SI System Information
SIB System Information Block
SN Sequence Number
SNR Signal to Noise Ratio
S-NSSAI Single Network Slice Selection Assistance Information
SON Self Optimized Network
SS Synchronization Signal
SSS Secondary Synchronization Signal
TBS Transport Block Size
TDD Time Division Duplex
TDOA Time Difference of Arrival
TOA Time of Arrival
TS Technical Specification
TSS Tertiary Synchronization Signal
Tx Transmit
TTI Transmission Time Interval
UE User Equipment
UL Uplink
UMTS Universal Mobile Telecommunication System
UPF User Plane Function
URLLC Ultra-Reliable Low-Latency Communication
USIM Universal Subscriber Identity Module
UTDOA Uplink Time Difference of Arrival
UTRA Universal Terrestrial Radio Access
UTRAN Universal Terrestrial Radio Access Network
X2 The interface/reference point between two eNBs
X2AP X2 Application Protocol
Xn The interface/reference point between two gNBs
XnAP Xn Application Protocol
WCDMA Wide CDMA
WLAN Wide Local Area Network Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device, the method comprising:
performing a dual active protocol stack, DAPS, handover;
determining a type of a handover report;
compiling the handover report of the determined type;
performing a fallback to a source cell;
transmitting a fallback indication message comprising an indication that the handover report is available;
receiving a request for the handover report; and
transmitting the handover report to an access node in response to receiving the request.

2. The method of claim 1, further comprising determining that there is a handover failure condition, wherein the handover report is transmitted after the handover failure condition is triggered.

3. The method of claim 1, wherein the type of the handover report is determined based on whether at least one failure condition is fulfilled during and/or after the DAPS handover.

4. The method of claim 3, wherein the at least one failure condition comprises at least one of a:
handover failure,
the fallback to the source cell,
a source radio link failure determined based on radio link monitoring, and
a retransmission problem toward a source access node in a RLC layer.

5. The method of claim 3, wherein the type of the handover report is a failed handover report if the at least one failure condition is fulfilled, and wherein the handover report includes information indicating the at least one failure condition or a type of failure associated with the DAPS handover.

6. The method of claim 3, wherein the type of the handover report is a successful handover report when no failure condition is fulfilled, and wherein the successful handover report indicates a failed radio link of the source cell after a switching of an uplink data transmission towards a target cell.

7. The method of claim 1, wherein compiling the handover report of the determined type comprises determining information to be included in the handover report.

8. The method of claim 7, wherein the information includes whether there was a failure of a source radio link during the DAPS handover and/or when the failure occurred during the DAPS handover.

9. The method of claim 7, wherein the information comprises at least one of:
a RSRP of the source cell,
a RSRQ of the source cell,
a SINR of the source cell,
a RSRP of a target cell and/or at least one neighboring cell,
a RSRQ of the target cell and/or the at least one neighboring cell,
a SINR of the target cell and/or the at least one neighboring cell,
a reason for a failure of a radio link towards the source cell,
an indication of whether a radio link monitoring timer or a counter were triggered during the DAPS handover,
an indication of whether an RLC retransmission counter is greater than zero,
an indication of a failed RACH towards the target cell,
an indication of whether a beam through which the wireless device accesses a target access node is a most optimal beam at a time of performing RACH,
an indication of beams used for RACH access, and
an indication of a beam quality measurement of the beams used for the RACH.

10. The method of claim 1, wherein transmitting the handover report to the access node comprises transmitting the handover report to at least one of a source access node, a target access node, or another access node such as a third access node.

11. The method of a claim 10, further comprising determining based on at least one criterion to perform the fallback to the source cell, wherein the at least one criterion is associated with an availability of a source radio link.

12. The method of claim 1, wherein the handover report is included in the fallback indication message.

13. The method of claim 1, wherein, if a failure condition occurred during or after the DAPS handover, the type of the handover report is a DAPS handover report that indicates a failure observed in the DAPS handover.

14. The method of claim 1, wherein a DAPS handover report indicates at least one of a radio link failure or that a maximum number of RLF retransmissions at the source cell has been reached.

15. The method of claim 1, wherein, if a failure condition occurred after the DAPS handover, the type of the handover report is a successful handover report with a new cause value indicating that a reason for a transmission of the successful handover report is a failed radio link of the source cell after a switching of an uplink data transmission towards a target cell.

16. A method performed by a network node operating as a source access node, the method comprising:
   determining to perform a dual active protocol stack, DAPS, handover of a wireless device to a target cell,
   transmitting a handover command message to the wireless device, the handover command message indicating the DAPS handover to the target cell,
   receiving a handover report from the wireless device,
   optimizing at least one allocated resource for a subsequent handover based on the handover report, and
   tuning a handover triggering parameter.

17. The method of claim 16, wherein the handover report indicates whether at least one failure condition was fulfilled during and/or after the DAPS handover.

18. A method performed by a network node operating as a target access node, the method comprising:
   receiving a handover request message from a source access node, the handover request message indicating a handover of a wireless device, wherein the handover comprises a dual active protocol stack, DAPS, handover;
   transmitting a handover request acknowledge message to the source access node;
   receiving a handover fallback indication from the wireless device, the handover fallback indication including an indication of an availability of a handover report; and
   transmitting a request for the handover report to the wireless device; and
   receiving the handover report from the wireless device.

19. The method of claim 18, wherein, if a failure condition occurred during or after the handover, a type of the handover report is a DAPS handover report that indicates a failure observed in the handover.

20. The method of claim 18, wherein, if a failure condition was after the handover, a type of the handover report is a successful handover report with a new cause value indicating that a reason for a transmission of the successful handover report is a failed radio link of a source cell after a switching of an uplink data transmission towards a target cell.

* * * * *